(12) United States Patent
Brady

(10) Patent No.: US 7,912,173 B2
(45) Date of Patent: Mar. 22, 2011

(54) REFERENCE STRUCTURES AND REFERENCE STRUCTURE ENHANCED TOMOGRAPHY

(75) Inventor: David Jones Brady, Durham, NC (US)

(73) Assignee: Duke University, Durham, NC (US)

( * ) Notice: Subject to any disclaimer, the term of this patent is extended or adjusted under 35 U.S.C. 154(b) by 534 days.

(21) Appl. No.: 12/000,450

(22) Filed: Dec. 12, 2007

(65) Prior Publication Data
US 2010/0322372 A1    Dec. 23, 2010

Related U.S. Application Data

(63) Continuation of application No. 10/388,480, filed on Mar. 17, 2003, now abandoned.

(60) Provisional application No. 60/414,362, filed on Sep. 30, 2002, provisional application No. 60/414,344, filed on Sep. 30, 2002.

(51) Int. Cl.
*G01N 23/00* (2006.01)
(52) U.S. Cl. .................. 378/2; 378/145; 250/363.06
(58) Field of Classification Search .............. 378/2
See application file for complete search history.

(56) References Cited

U.S. PATENT DOCUMENTS

| | | | | |
|---|---|---|---|---|
| 3,746,872 A * | 7/1973 | Ashe et al. | | 378/2 |
| 3,867,637 A * | 2/1975 | Braun et al. | | 378/2 |
| 4,075,483 A * | 2/1978 | Tancrell et al. | | 250/363.06 |
| 4,078,177 A * | 3/1978 | Tiemens | | 378/23 |
| 4,132,896 A * | 1/1979 | Klotz et al. | | 378/23 |
| 4,165,462 A * | 8/1979 | Macovski et al. | | 250/363.04 |
| 4,209,780 A * | 6/1980 | Fenimore et al. | | 382/278 |
| 4,383,733 A * | 5/1983 | Weiss et al. | | 359/462 |
| 4,506,374 A * | 3/1985 | Flynn | | 378/2 |
| 4,513,433 A * | 4/1985 | Weiss et al. | | 378/2 |
| 4,566,112 A * | 1/1986 | Linde et al. | | 378/2 |
| 4,577,341 A * | 3/1986 | Schwieker et al. | | 378/150 |
| 4,651,012 A * | 3/1987 | Clark et al. | | 250/505.1 |
| 4,778,997 A * | 10/1988 | Doring | | 250/363.1 |
| 4,891,844 A * | 1/1990 | Kiri | | 382/132 |
| 4,998,268 A * | 3/1991 | Winter | | 378/63 |
| 5,008,911 A * | 4/1991 | Harding | | 378/86 |
| 5,036,546 A * | 7/1991 | Gottesman et al. | | 382/321 |

(Continued)

OTHER PUBLICATIONS

Chou, C., "Fourier coded-aperture imaging in nuclear medicine", Science, Measurement and Technology, IEE Proceedings, 1994, vol. 141, issue 3, pp. 179-184, ISSN: 1350-2344.*

*Primary Examiner* — Sath V Perungavoor
(74) *Attorney, Agent, or Firm* — John R. Kasha; Kasha Law LLC

(57) ABSTRACT

A reference structure tomography device is provided which includes a reference structure configured to intercept and modulate energy in the form of waves or otherwise propagating from a source to a sensor, along longitudinal and traverse directions. The reference structure modulates or otherwise conditions the propagating wave to simplify an inversion process on the data set created by the interaction between the wave and the sensors. The reference structure can modulate a wave through multiple types of interactions with the wave including obscuring, defracting, defusing, scattering, and otherwise altering any characteristic of a portion of the wave. By selecting a reference structure that is compatible with the sensors, the number of measurements needed to resolve the source through the source wave is reduced. The reference structure can also increase the resolution of an imaging system. Thus, by reducing or altering the data collected by the sensors, the reference structure tomography device can improve the imaging abilities of the system.

85 Claims, 78 Drawing Sheets

U.S. PATENT DOCUMENTS

| | | | |
|---|---|---|---|
| 5,231,652 A * | 7/1993 | Harding | 378/86 |
| 5,245,191 A * | 9/1993 | Barber et al. | 250/363.04 |
| 5,468,970 A * | 11/1995 | Kocsis et al. | 250/505.1 |
| 5,606,165 A * | 2/1997 | Chiou et al. | 250/363.06 |
| 5,627,639 A * | 5/1997 | Mende et al. | 356/310 |
| 5,717,733 A * | 2/1998 | Kurbatov et al. | 378/71 |
| 5,772,598 A * | 6/1998 | Halling | 600/476 |
| 5,930,314 A * | 7/1999 | Lanza | 376/159 |
| 6,046,808 A * | 4/2000 | Fateley | 356/330 |
| 6,205,195 B1 * | 3/2001 | Lanza | 376/157 |
| 6,392,235 B1 * | 5/2002 | Barrett et al. | 250/363.06 |
| 6,583,420 B1 * | 6/2003 | Nelson et al. | 250/397 |
| 6,737,652 B2 * | 5/2004 | Lanza et al. | 250/363.06 |
| 7,375,338 B1 * | 5/2008 | Hugg et al. | 250/363.1 |
| 2001/0056234 A1 * | 12/2001 | Weinberg | 600/436 |
| 2002/0075990 A1 * | 6/2002 | Lanza et al. | 378/2 |
| 2003/0205676 A1 * | 11/2003 | Nelson et al. | 250/370.09 |
| 2006/0108509 A1 * | 5/2006 | Frangioni et al. | 250/208.1 |

* cited by examiner

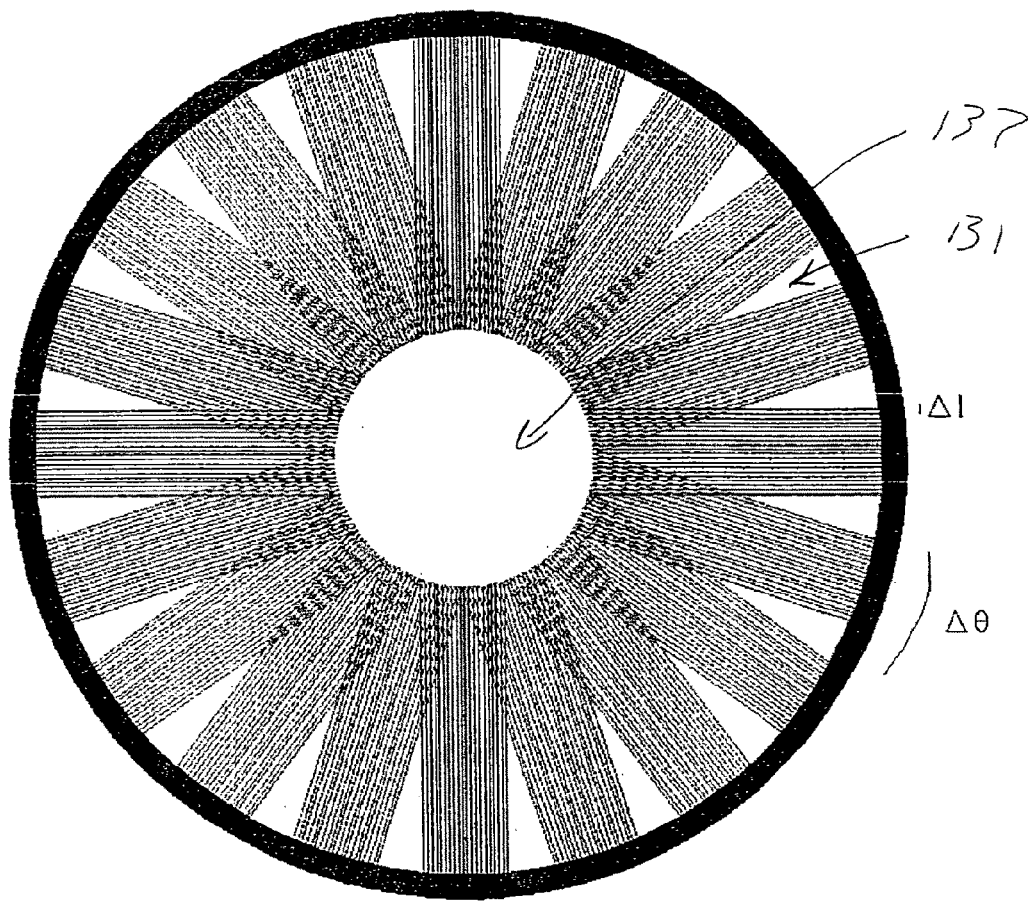
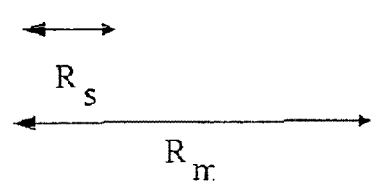
Figure 19

Fig 35

| 64 | 37 | 38 | 39 | 40 | 41 | 42 | 43 |
| 63 | 36 | 17 | 18 | 19 | 20 | 21 | 44 |
| 62 | 35 | 16 | 5  | 6  | 7  | 22 | 45 |
| 61 | 34 | 15 | 4  | 1  | 8  | 23 | 46 |
| 60 | 33 | 14 | 3  | 2  | 9  | 24 | 47 |
| 59 | 32 | 13 | 12 | 11 | 10 | 25 | 48 |
| 58 | 31 | 30 | 29 | 28 | 27 | 26 | 49 |
| 57 | 56 | 55 | 54 | 53 | 52 | 51 | 50 |

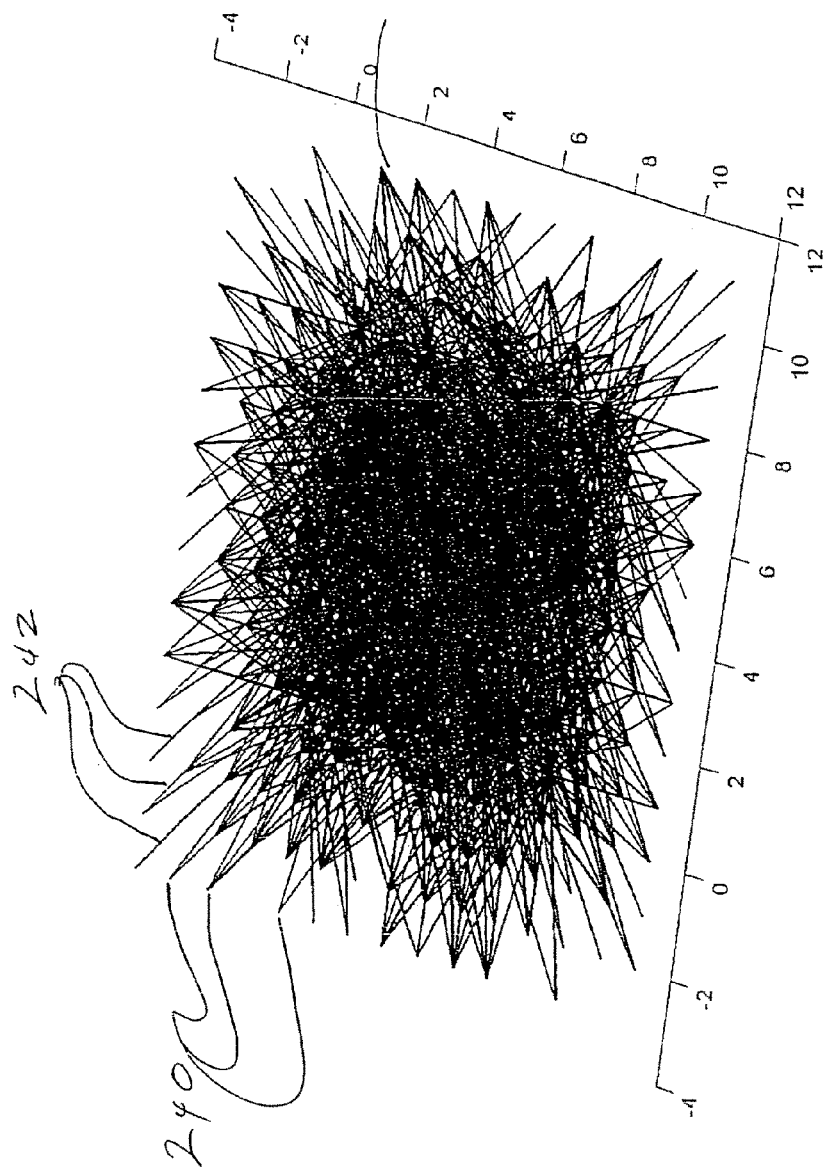

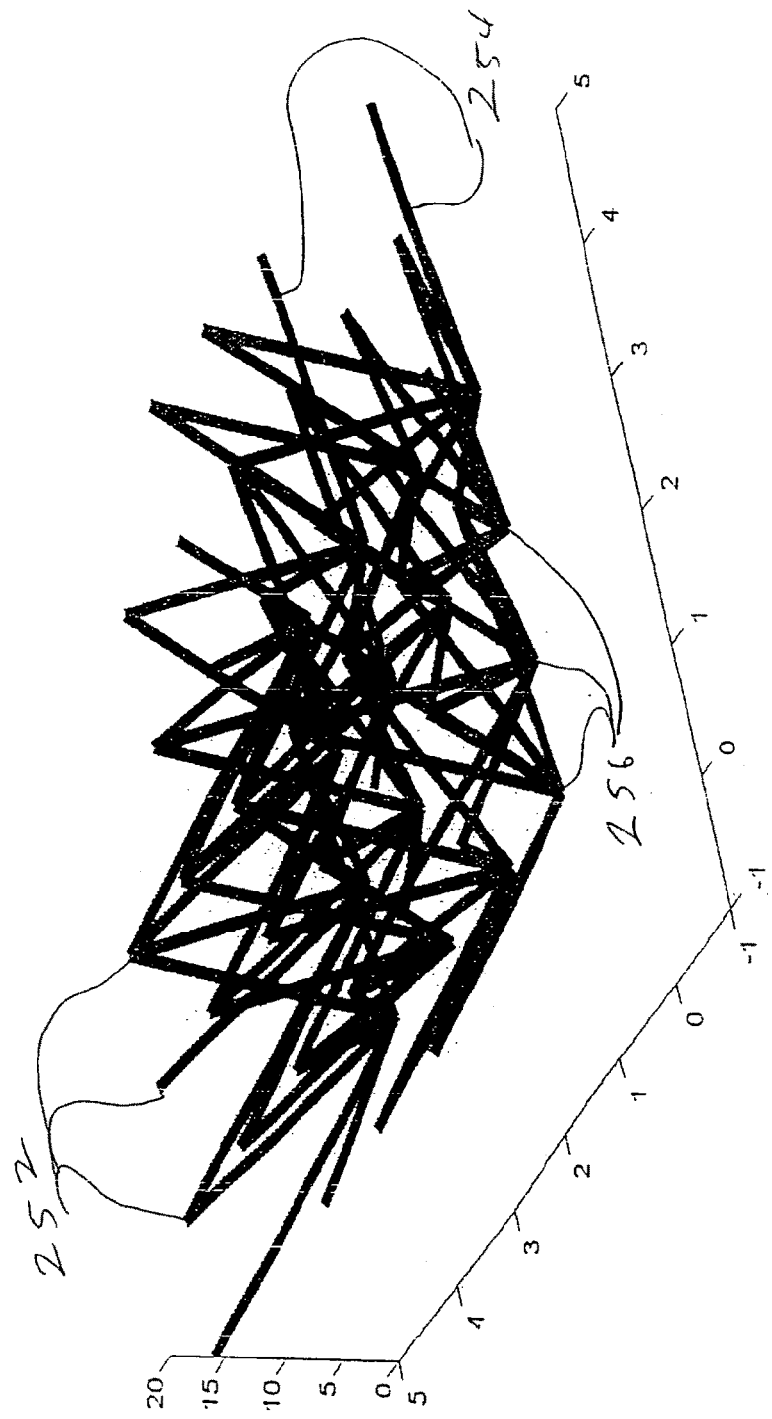

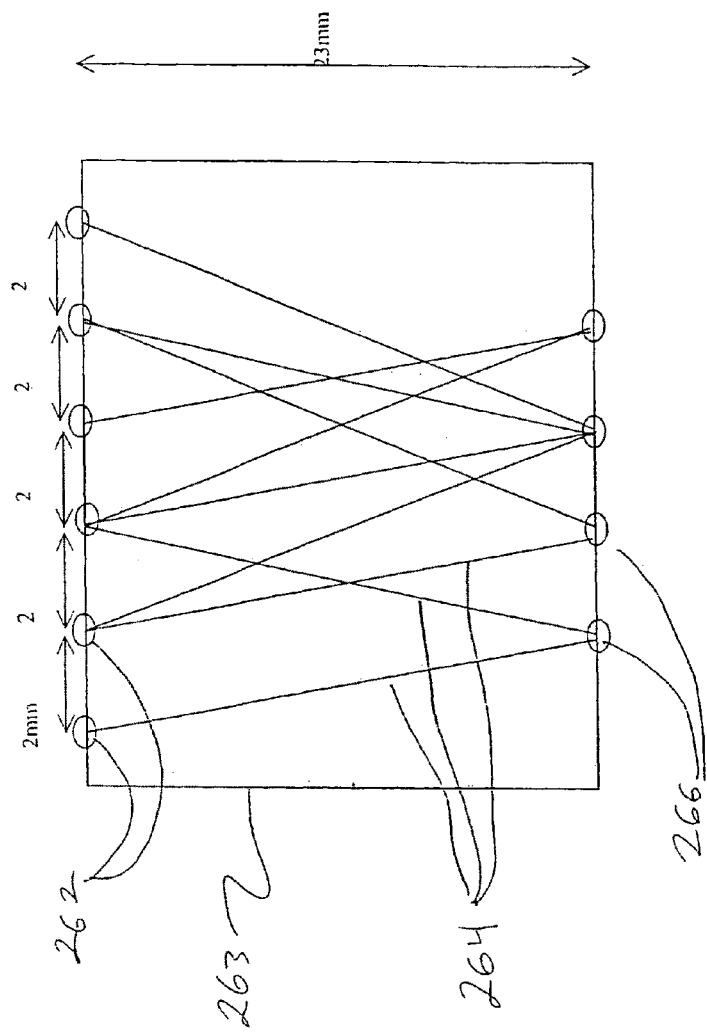

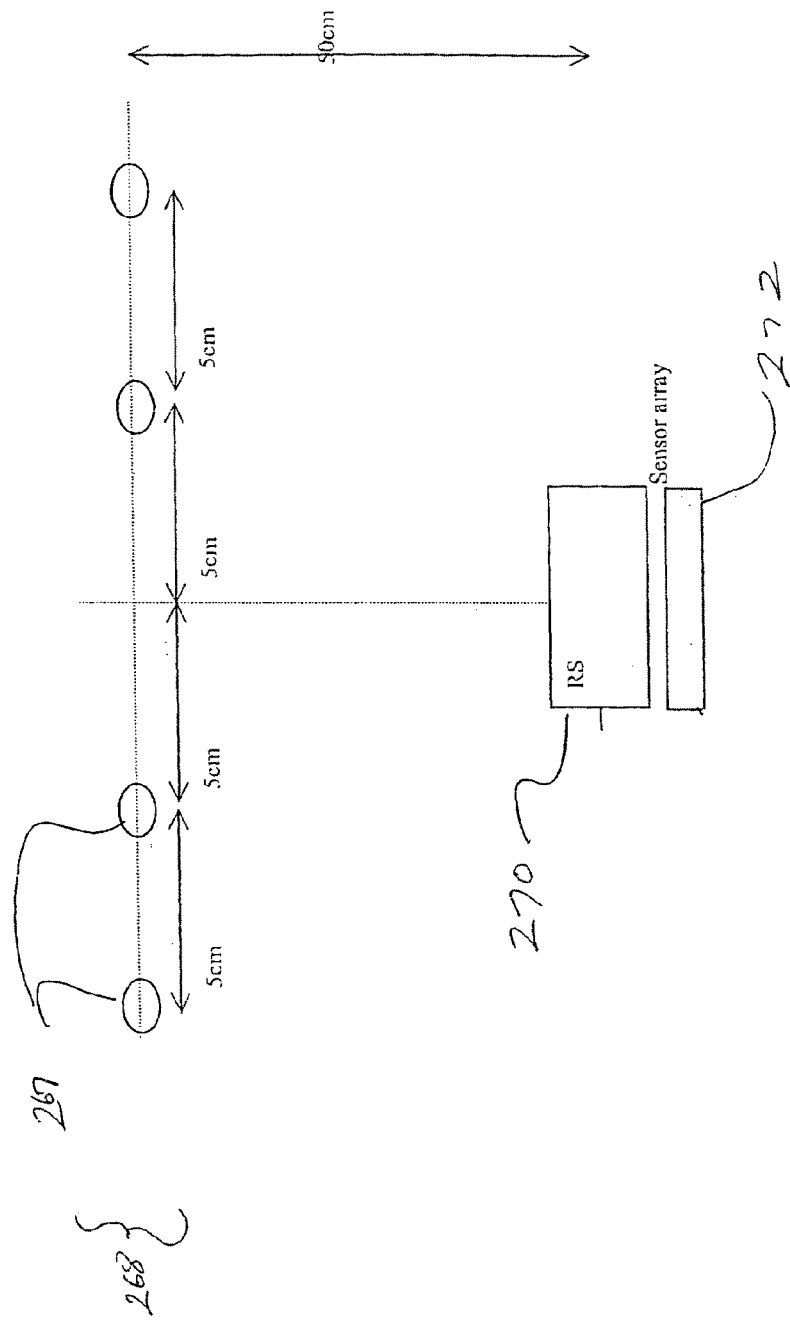

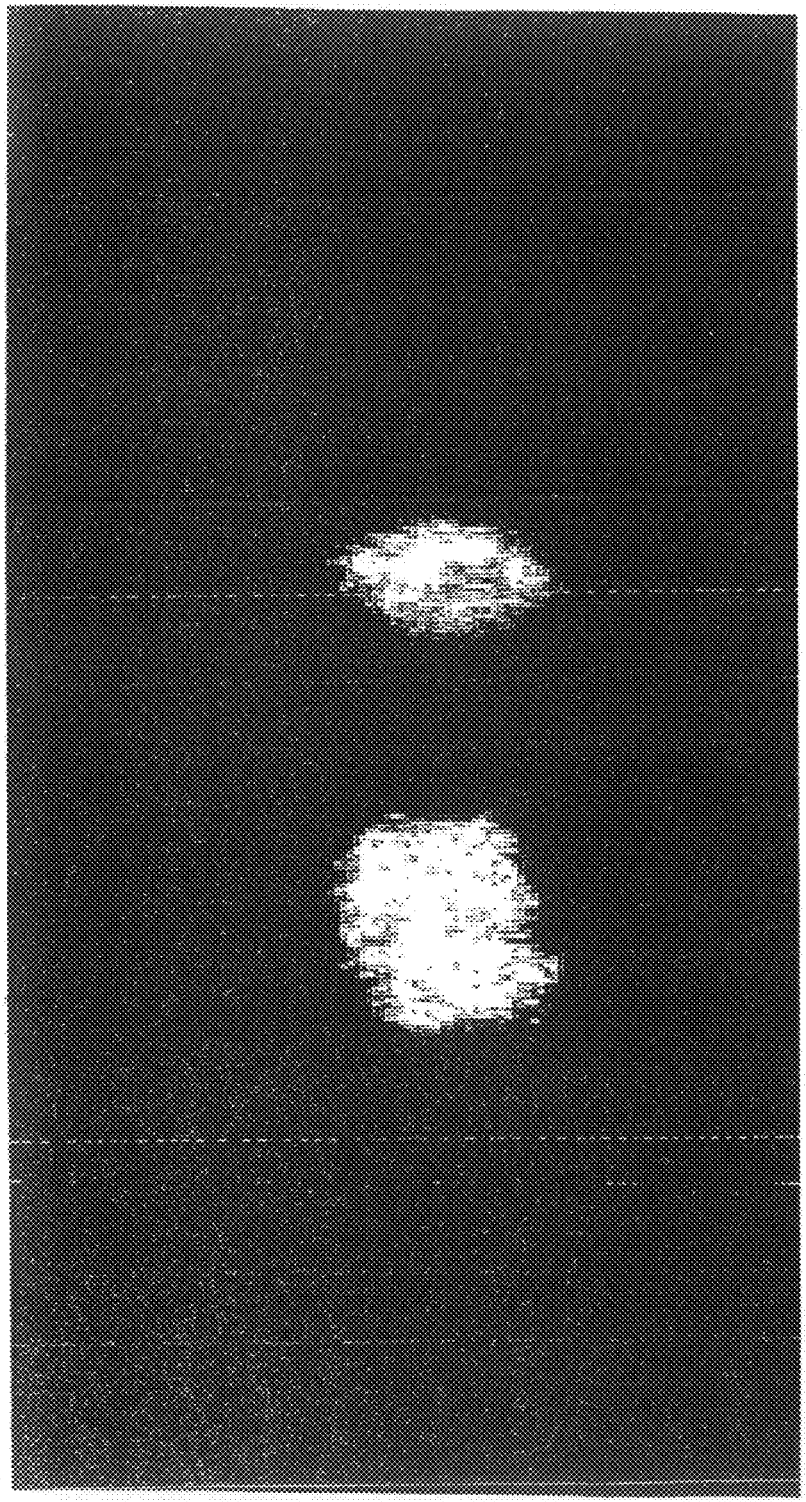

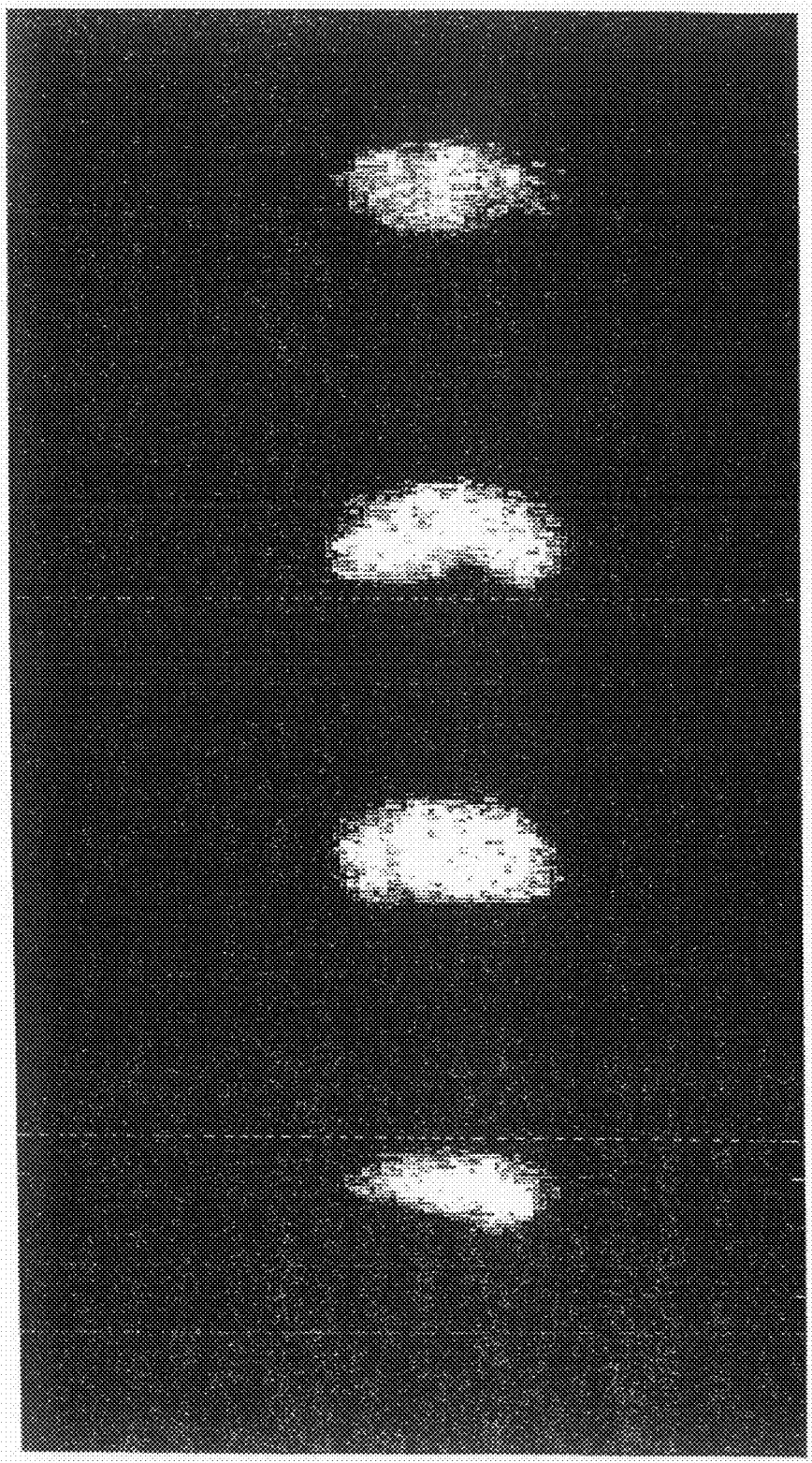

2242

REFERENCE STRUCTURES AND REFERENCE STRUCTURE ENHANCED TOMOGRAPHY

CROSS REFERENCE TO RELATED APPLICATIONS

This application claims priority to Provisional Patent Application No. 60/414,362, filed Sep. 30, 2002 and Provisional Patent Application No. 60/414,344, filed Sep. 30, 2002, and is a continuation of U.S. patent application Ser. No. 10/388,480 Mar. 17, 2003, now abandoned, entitled "REFERENCE STRUCTURES AND REFERENCE STRUCTURE ENHANCED TOMOGRAPHY" to David J. BRADY. The contents of all of the above-identified applications are incorporated herein by reference in their entirety.

BACKGROUND OF THE INVENTION

1. Field of the Invention

The present invention relates generally to sensors and imaging systems, and more particularly to tomographic systems.

2. Background of the Related Art

Tomography involves the measurement of a set of source projections from a source, and inverting the measurement to estimate source characteristics or variables. The projections typically consist of electromagnetic or acoustic energy, but can also include any form of energy, which can be caused to propagate through a medium. The most common method of tomographic imaging inverts a discrete set of projection measurements to estimate source distribution as a point wise projection in normal or hyperspectral space. The inverted set of projections can yield an image of the interior of the medium through which the projections passed. Tomography finds application in a wide range of detecting and imaging fields, such as medicine, seismology, and non-destructive testing. Tomography is a calculation intensive process done numerically by computers, and thus the process is also referred to as "computer tomography."

In most tomographic imaging systems, image reconstruction requires long computation times, due to the large number of data points and processing steps required. In addition, achieving multi-dimensional source reconstruction with traditional tomography requires the use of spatial and temporal scanning.

SUMMARY OF THE INVENTION

An object of the invention is to solve at least the above problems and/or disadvantages and to provide at least the advantages described hereinafter.

Therefore, the object of the present invention is to provide a reference structure tomography device and method that includes a multi-dimensional reference structure that is adapted to modulate electro-magnetic fields along both longitudinal and transverse directions.

To achieve at least the above objects, in whole or in part, provided is a source revolver, comprising a multi-dimensional reference structure configured to modulate source radiation in a pre-determined manner to produce a reference structure modulated signal comprising a plurality of source space projections, wherein the multi-dimensional reference structure comprises a longitudinal dimension, and an analyzer configured in accordance with said reference structure for resolving a source state from the reference structure modulated signal.

To achieve at least the above objects, in whole or in part, there is further provided a source imager, comprising a multi-dimensional reference structure configured to modulate source radiation to produce a reference structure modulated signal comprising a plurality of source space projections, wherein the multi-dimensional reference structure comprises a longitudinal dimension, a sensor array configured to detect the reference structure modulated signal, and a processor coupled to the sensor array and configured to derive source information from the detected reference structure modulated signal.

To achieve at least the above objects, in whole or in part, there is further provided a tomographic apparatus, comprising a source, a sensor, a multi-dimensional reference structure between the source and sensor for producing modulated radiation from source radiation, wherein the modulated radiation is received by the sensor and comprises a plurality of a source space projections and wherein the multi-dimensional reference structure comprises a longitudinal dimension, and an analyzer coupled to the sensor for analyzing the modulated radiation.

To achieve at least the above objects, in whole or in part, there is further provided a method of enhancing a sensor, comprising altering radiation received by the sensory by inserting a multi-dimensional reference structure into a path of the radiation, wherein the altered radiation comprises a plurality of source space projections, and wherein the multi-dimensional reference structure comprises a longitudinal dimension, and analyzing the sensors response to the altered radiation.

To achieve at least the above objects, in whole or in part, there is further provided a sensory system, comprising a multi-dimensional reference structure configured to receive unconditioned data radiated from a source and to produce condition data comprising a plurality of source space projections, wherein the multi-dimensional reference structure comprises a longitudinal dimension, a sensory configured to receive the conditioned data, and an analyzer configured to invert the conditioned data received by the sensor.

To achieve at least the above objects, in whole or in part, there is further provided a measurement system, comprising a source configured to produce source modulated radiation, a multi-dimensional reference structure comprising a longitudinal dimension for receiving the source modulated radiation and producing reference modulated wave radiation comprising a plurality of source space projections, and an analyzer in communication with the reference modulated radiation for analyzing the reference modulated radiation.

To achieve at least the above objects, in whole or in part, there is further provided a method of resolving a source state, comprising modulating source radiation such that a plurality of source space projections are created in a parallel fashion, and resolving the source state using of source space projections.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIGS. 19-20 are three-dimensional schematic representations of RST systems, in accordance with the present invention;

FIG. 35 is a grid showing how measurement pixels may be numbered in the mask and sensor geometry of FIG. 34;

FIGS. 36a-36c illustrate different views of a connectivity pattern for a reference structure, in accordance with the present invention;

FIG. 40 illustrates a connectivity pattern for the reference structure of FIG. 38

FIGS. 42-43 are schematic diagrams that illustrate imaging of a 4×1 LED array using a reference structure, in accordance with an embodiment of the present invention

DETAILED DESCRIPTION OF PREFERRED EMBODIMENTS

Figure 1:
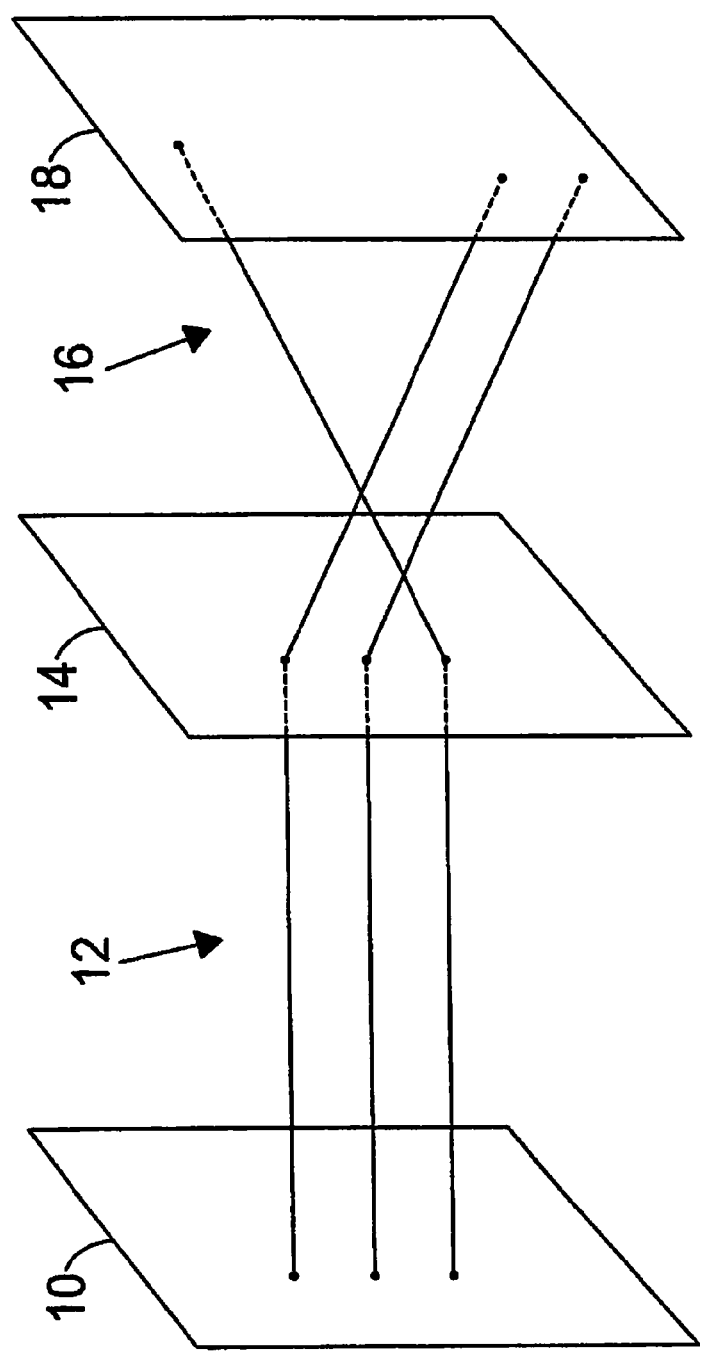
FIG. 1 is a schematic representation of a reference structure tomography (RST) system, in accordance with one embodiment of the present invention.

The present invention utilizes the modulation of a selected physical property or set of properties of energy propagating between a source and a receiver in such a way that the receiver produces an enhanced measurement. The utilization of this technique is hereinafter referred to as "Reference Structure Tomography" (RST).

As used herein, a "source" can be either a generator, scatterer or absorber of propagating energy, and may be described by a source distribution function. Accordingly, a source can either emit energy, or can receive and transmit, obscure, reflect, refract, diffract or otherwise interact with propagating energy. The propagating energy or projection is typically modeled as following a ray path through or from the source. A source projection is a sum or integral of properties associated with a subset of the points in the source. The inversion of source projections can be done through numerical methods executed by a computer.

RST uses reference modulations in the space between sources and sensors to encode propagating energy, also referred to as fields, radiated or scattered from the sources. The reference modulations are preferably achieved by using a reference structure.

RST preferably utilizes multi-dimensional reference structures to precondition projections for detection and/or subsequent inversion. Various RST embodiments will be described below. For example, "embedded detector RST" is an embodiment in which the detector elements are contained within the reference structure. "Adaptive RST" is an embodiment in which the reference structure changes or is changed in response to the state of the source or the measurement. "Impulse RST" is an embodiment in which the projection is similar to an impulse response function, and the impulse response function of a RST system is the measurement produced by an impulse in the source space as a function of the position of the impulse.

As used herein, the term "projection" is synonymous with the terms "radiating field," "ray," "wave," "radiation," and "propagating energy," etc. A reference structure may consist of a multi-dimensional distribution structure both transverse and longitudinal to primary directions of propagation for the projection. If the radiation space is two-dimensional, such as waves propagating along a surface, the reference structure may also be two-dimensional. If the radiation space is three-dimensional such as waves propagating through a volume, the reference structure may also be three-dimensional.

A reference structure can be thought of as conditioning or encoding the radiation. The goal of the encoding process is to condition source characteristics for computational estimation from sensor measurements. The most typical objective is the estimation of the source distribution over a multi-dimensional space from measurements over a lower dimensional space. For example, one may seek to estimate the source density in a plane from measurements on a curve or one may seek to estimate the source density in a volume from measurements over a surface. The simplest form of RST involves the estimation of sources from geometric projections modulated by obscurations.

Referring to FIG. 1, a schematic representation of a RST system is shown. In the schematic representation, a linear transformation space 14 receives source data 12 from a source space 10. The linear transformation space 14 transforms the source data 12. The transformed source data 16 propagates from the linear transformation space 14 and is received by a sensor space 18. This diagram is a generalized representation of a RST system, whereby the linear transformation space 14 may correspond to a reference structure, the source space 10 can correspond to a source, and the sensor space 18 can correspond to a sensor or sensor array. The source data 12 and the transformed source data 16 correspond to propagating energy, such as electromagnetic radiation or acoustic waves, before and after interaction with the linear transformation space 14, respectively.

Figure 2:
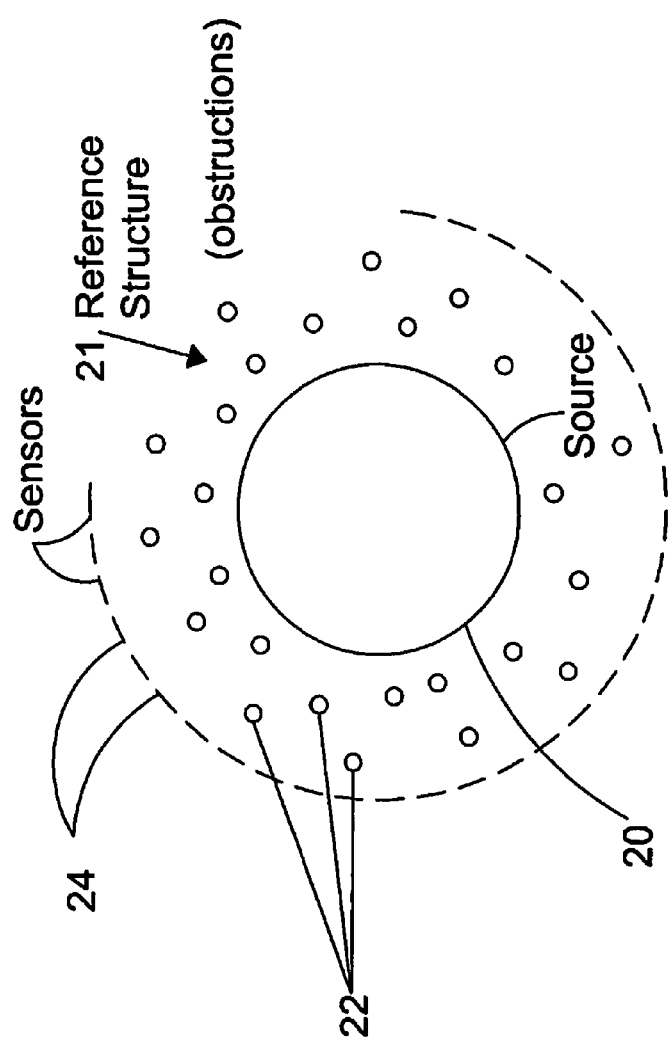
FIG. 2 is a schematic representation of a RST system, in accordance with another embodiment of the present invention.
Figure 3:
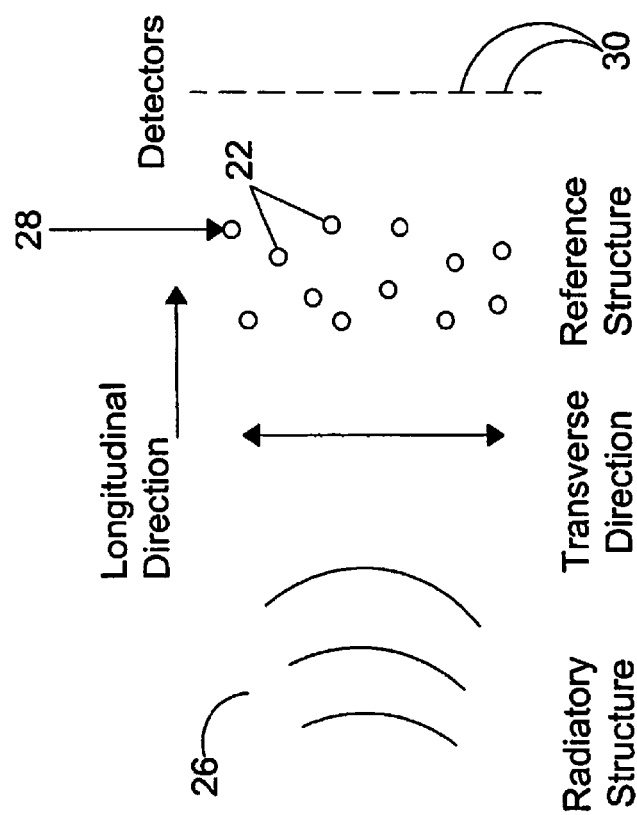
FIG. 3 is a schematic representation of a RST system, in accordance with another embodiment of the present invention.

FIGS. 2 and 3 are schematic representations of two examples of a RST system. In FIG. 2, a source 20 is surrounded by a reference structure 21, which consists of obstructions 22, and the reference structure 21 is surrounded by sensors 24. The circular geometry of FIG. 2 shows how a source 20 can be completely surrounded by the reference structure 21 and the sensors 24, suitable for a circular coordinate system.

In FIG. 3, a radiating field 26 is received by a reference structure 28, which is placed between the radiating field 26 and the detectors 30. The reference structure 28 consists of obstructions 22. The geometry of FIG. 3 has a transverse direction and longitudinal direction, and shows how a reference structure and detectors can be modeled in a rectilinear coordinate system.

In the above examples, a direct projection is a bundle of ray projections integrated across a range of angles. A ray projection may be considered a visibility projection integrated as the angular range approaches zero. A diffuse projection is a projection for points not distributed along a line, and a diffractive projection is a diffuse projection generated by diffractive wave propagation.

RST offers the advantage of extended depth of field and other data cube projections. In general, the term data cube originates in hyperspectral imaging, and means a two dimensional image viewed as a function wavelength or frequency forms a "data cube" consisting of a stack of images at different colors. Images in higher spaces, such as a three dimensional source viewed as a function of color, may form multi-dimensional or hyper data cubes. Generalizing to a higher level, one may view the data cube as the set of all spatially related measures of the state of a source. As used herein, the data cube refers to the cube describing the field intensity of a three dimensional source. Extended depth of field consists of creating a 2D image from a 3D source by integrating line integrals through the source (a 3D source consists of a stack of images. An extended depth of field image smashes all of these images into a single plane.

Extended depth of field or slices of the data cube as a function of space or color are conventional projections of the data cube. A projection is an integral of the form $m=\int h(r)S(r) dr$, where $S(r)$ is a density function describing the source at data cube position $r$ and $h(r)$ is a projection vector. For extended depth of field, h would be a delta function along a line. For monochromatic imaging, h would pick a color of the data cube. An unconventional projection would be something other than the projection that picked a slice or a line of the data cube.

As used herein, "diffractive field propagation" is propagation of the field according to a wave equation, i.e., normal propagation of an optical or acoustic field, and a "spatio-spectral source" is a source described by a data cube that includes both spatial and color axes.

The term "basis" is used herein to mean a set of vectors or functions that describe a source. For example, a source may be described by the amplitudes of impulse response functions sampled on a regular spatial grid. Alternatively, a source may be described by a Fourier series, in which case the basis consists of sine and cosine functions. A "non-standard basis" would be a description of a source using basis functions that are not regular sampling functions on a Euclidean space or that are not a simple Fourier basis.

Even if a RST mapping does not immediately enable multi-dimensional reconstruction, RST systems may map the source space onto the measurement space so as to immediately produce unconventional projections of the source space. A measurement of the visible ray projection of the source space, even in systems dominated by diffractive field propagation, is an example of such a system. Other examples include systems that project the spatio-spectral source data cube onto nonstandard basis.

If one seeks to reconstruct an arbitrary source distribution $S(r)$, RST enables reconstruction without scanning or with reduced scanning. Related art computer tomography scans an illumination and/or detector system to serially acquire projections. A reference structure sorts and creates projections such that complete data can be obtained in a single time step. The number of measurements made for a given source size and resolution is approximately the same in both cases. Another advantage of RST arises when the source can be represented by a set of basis functions with fewer components than the related art locally sampled basis. For example, if only one or a few source points are active, the source can be represented by a number of basis functions equal to the logarithm of the number of spatial resolution cells. In such cases, RST can reconstruct the source using many fewer measurements than conventional systems. RST can be more efficient because it is a multiplex technique. Multiplexing enables one to sort and find sources in a way that is more efficient than measuring all possible source states. RST also offers the possibility of revealing more information about a measured space by increasing the complexity of the energy received by the sensors.

Multiplex sensing consists of measurements that depend jointly on multiple source variables. A projection which depends on the state of a source at multiple points is a multiplex measurement. Tomography relies on multiplex sensing and can be implemented using detector elements external to a reference structure that is integrated between the source and detector elements, or by using detector elements wholly or partially embedded in the reference structure. RST may be implemented with static or time varying reference structures.

Figure 4:
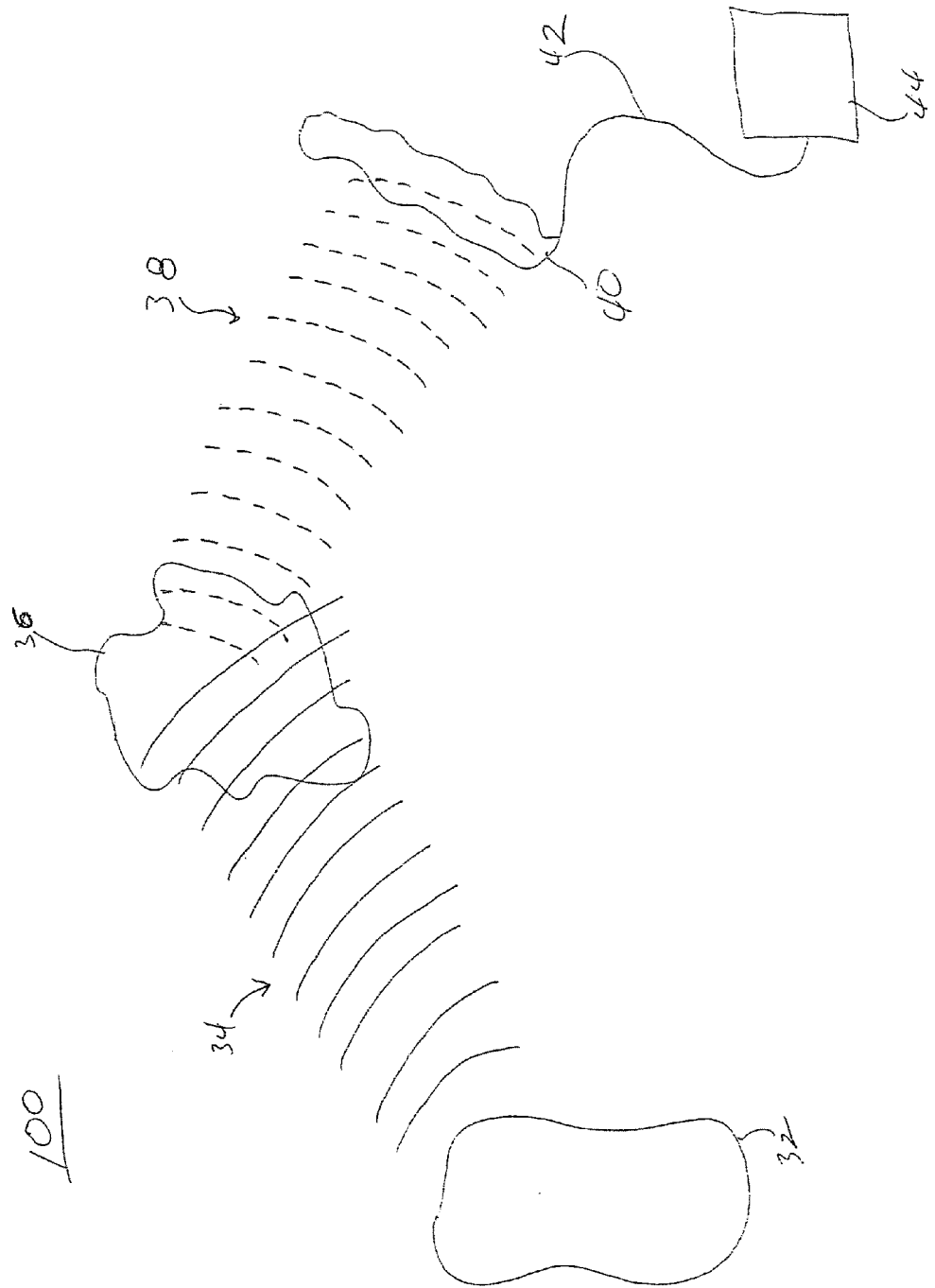
FIGS. 4-7 are schematic diagrams of various RST devices, in accordance with the present invention.

FIG. 4 is a schematic diagram of another embodiment of a RST system 100. The RST system of FIG. 4 includes a source 32 from which a source wave 34 emanates. A reference structure 36 receives the source wave 34, and a reference structure modulated wave 38 propagates from the reference structure 36. The reference structure modulated wave 38 is received by a sensor 40. The sensor 40 produces a signal in accordance with the reference structure modulated wave 38 and directs that signal to a processor 44 through a signal line 42 between the sensor 40 and the processor 44.

In operation, the RST system 100 is configured so that the reference structure 36 receives a source wave 34 from the source 32, and provides a reference structure modulated wave 38 which is received by the sensor 40. The reference structure 36 modifies the source wave 34 in accordance with an interaction between the source wave 34 and the reference structure 36. Thus, the reference structure modulated wave 38 is modulated based on a combination of the characteristics of the source 32 from which the source wave 34 originated and the reference structure 36. The processor 44 is configured to invert the response of the sensor 40 using a predetermined transformation function of the reference structure 36 to characterize the source 32.

Figure 5:
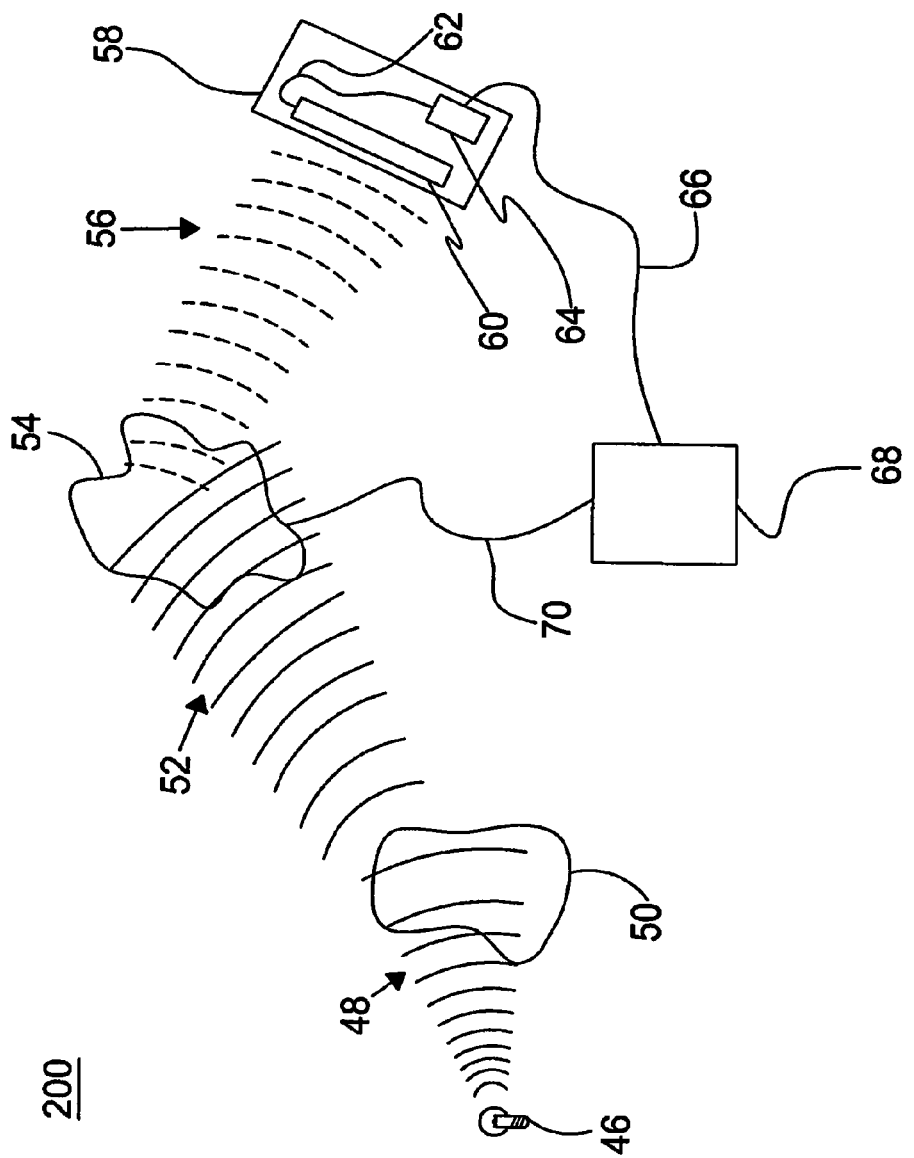

FIG. 5 is a schematic diagram of a RST system 200 with an active reference structure 54, in accordance with another embodiment of the present invention. The active reference structure 54 receives the source wave 52 and a reference structure modulated wave 56 propagates from the active reference structure 54. The active reference structure 54 also receives a signal from a reference structure driver 68 through a signal line 70 between the active reference structure 54 and the reference structure driver 68. The reference structure modulated wave 56 is received by an analyzer 58. The analyzer 58 includes a sensor 60, which is connected to a processor 64 through a signal line 62. The analyzer 58 is coupled via a signal line 66 to the reference structure driver 68. In operation, the active reference structure 54 receives a feedback signal from the analyzer 58 and the reference structure driver 68. The active reference structure 54 can alter its characteristics in accordance with variations in the source wave 52 as detected by the sensor 60 from the reference structure modulated wave 56.

The RST system 200 also includes a wave generator 46, which generates an illumination wave 48. The illumination wave 48 is received by the source 50 and the source wave 52 then propagates from the source 50. Accordingly, a source wave 52 is not necessarily originally generated by the source 50, but can be instead a wave which can either be generated by the source 50, or can be received and reflected, transmitted, or otherwise propagated from the source 50.

Figure 6:
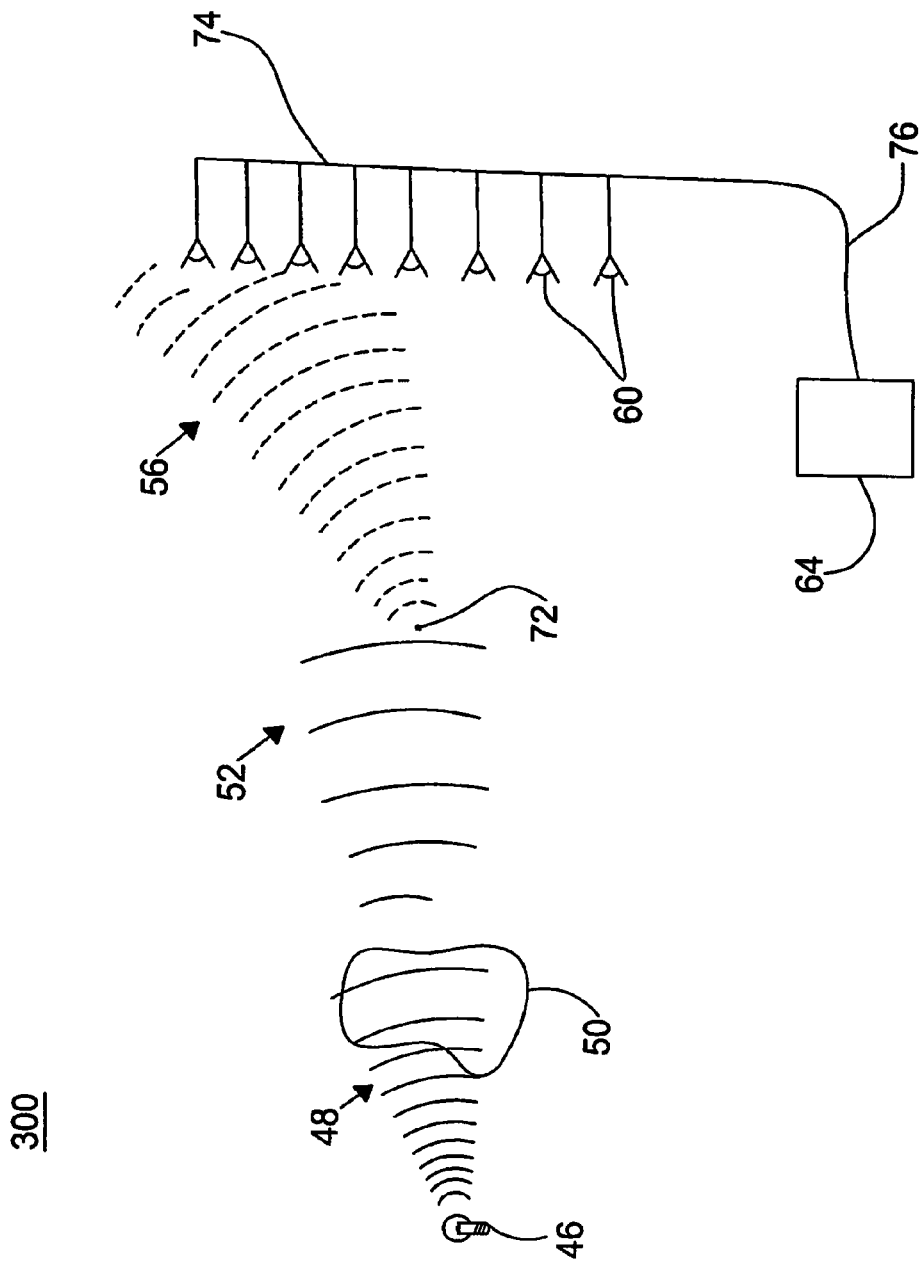

FIG. 6 is a schematic diagram of a RST system 300, in accordance with another embodiment of the present invention, utilizing the wave generator 46, illumination wave 48, source 50 and source wave 52 of FIG. 6. In this embodiment, a point type reference structure 72 is used from which a reference structure modulated wave 56 propagates. The reference structure modulated wave 56 is received by a plurality of detectors 60, which form a sensor array 74 with sampling points corresponding to each of the detectors 60. The sensor array 74 has a signal line 76 coupled to a processor 64. In operation, the discrete sampling points (detectors 60) of the sensor array 74 of the RST system allow the reference structure modulated wave 56 to be discretely sampled.

Figure 7:
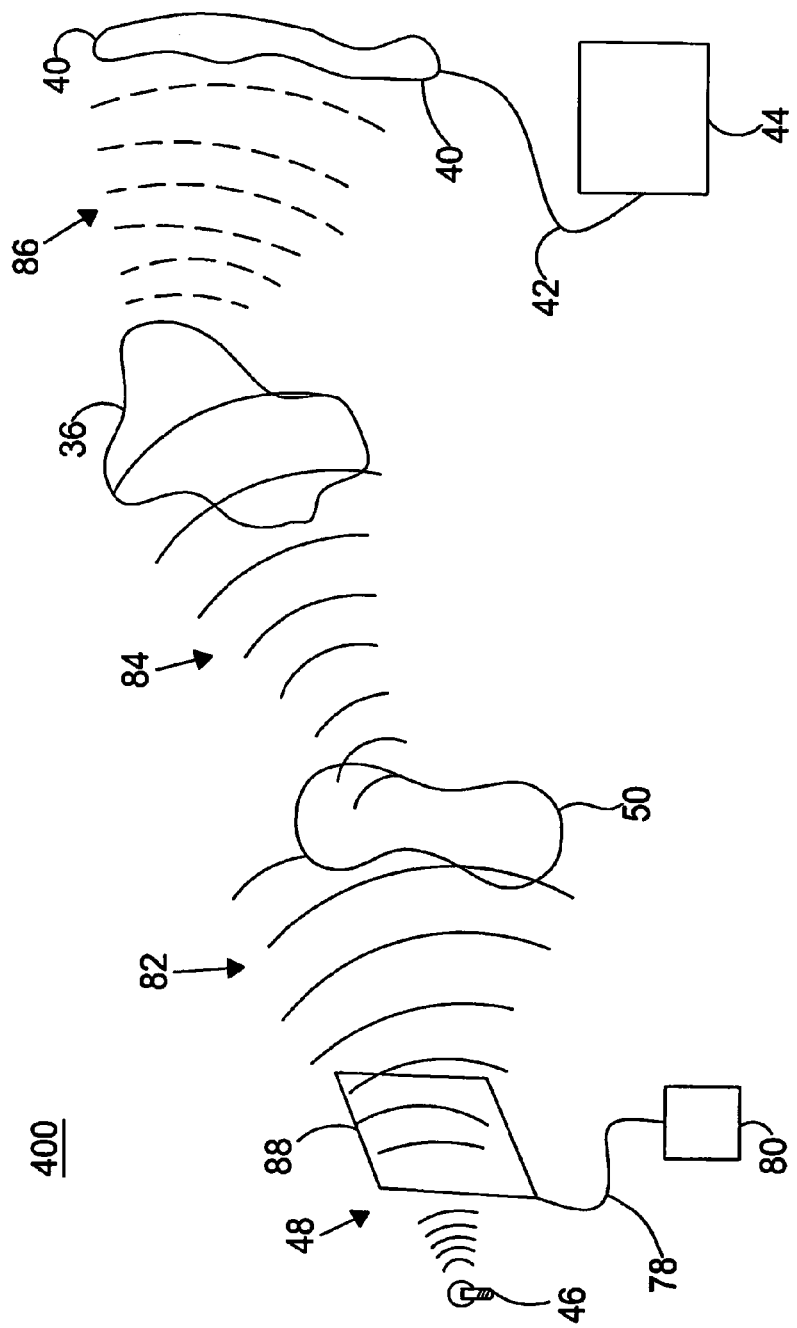

FIG. 7 is a schematic diagram of a RST system 400 with a source wave modulator, in accordance with another embodiment of the present invention. In addition to the wave generator 46, and illumination wave 48, this embodiment includes a source wave modulator 88 from which a modulated illumination wave 82 emanates to be received by the source 50. A source wave 84 from the modulated illumination wave 82 propagates from the source 50 and is received by the reference structure 36. A reference structure modulated wave 86 then propagates from the reference structure 36 to be received by a sensor 40. The source wave modulator 88 is modulated by a modulator driver 80 through a signal line 78. Accordingly, the source wave modulator 88 can modulate the illumination wave 48, so that the source 50 receives a modulated illumination wave.

Multiplicative Visible Projection RST

In this context, "visible" means detectable by the sensor and "visible projection" means that each sensor detects along the lines that are not obscured to it from the source. As discussed above, computer tomography consists of the measurement and numerical inversion of ray projections, and can be enhanced by the inclusion of a reference structure. A RST system may measure ray projections, but these projections will depend jointly on the source and the reference structure. Multiplicative reference structures are structures which either completely obscure or completely transmit the energy of the ray projection.

Figure 8:
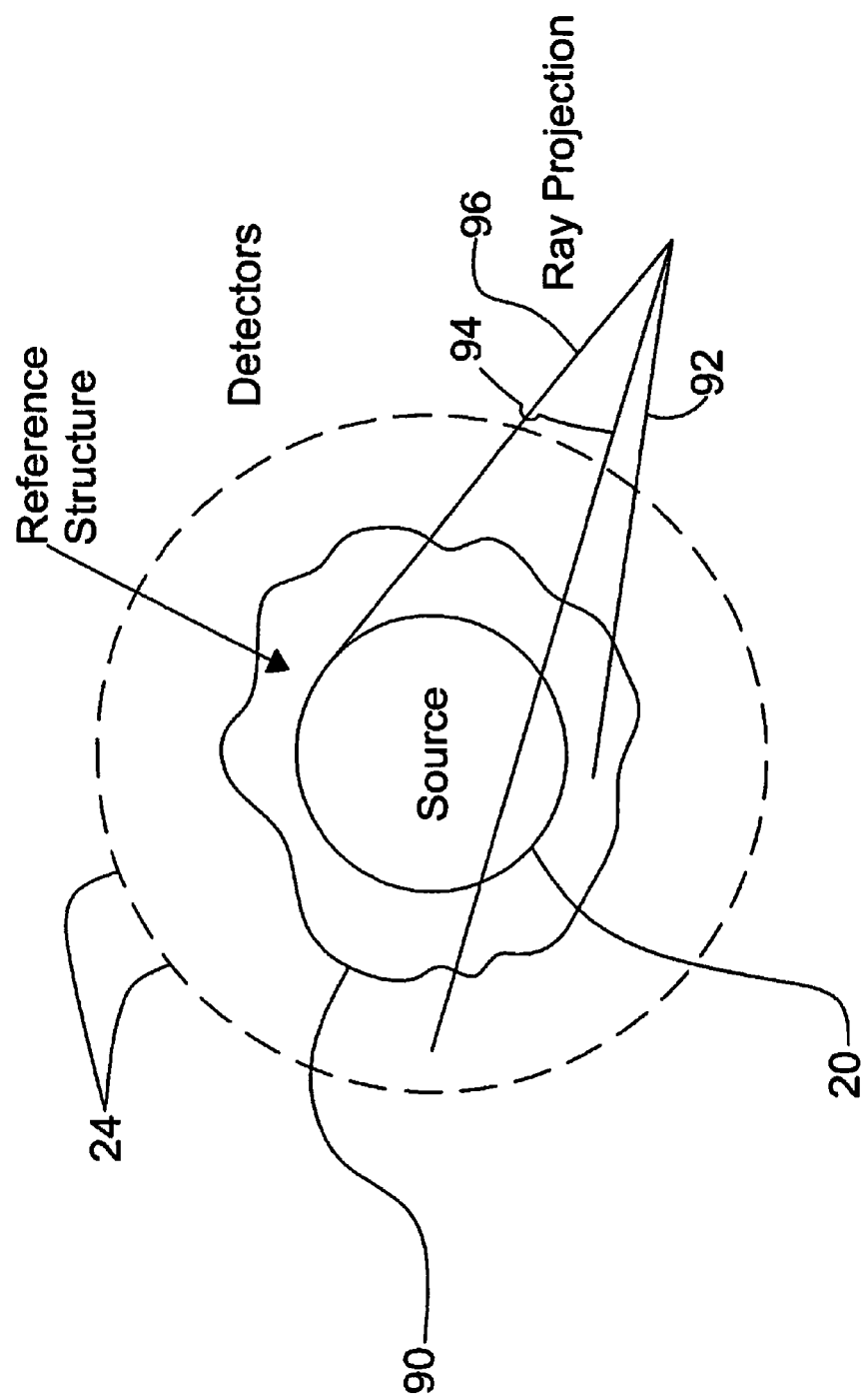
FIG. 8 is a schematic illustration of a basic structure for RST imaging, in accordance with the present invention.

For example, FIG. 8 is a schematic illustration of the basic structure for a RST imaging system, for the case of ray projections. In FIG. 8, a source 20 is surrounded by a reference structure 90, and the reference structure 90 is surrounded by detectors 24. In operation, the detectors 24 receive energy from the source 20, as represented by ray projections 92, 94, 96.

For the geometry shown in FIG. 8, Assuming the energy travels as represented by the ray projections, the state of the $i^{th}$ detector is $$m_i = \int_{\substack{\text{detector} \\ \text{area}}} \int_{\substack{\text{detector} \\ \text{acceptance} \\ \text{angle}}} \int_{\substack{\text{ray} \\ \text{extent}}} T_i(\vec{\theta}, \vec{\rho}) S(\vec{\rho} + \alpha i_{\vec{\theta}}) d\alpha d\vec{\theta} d\vec{\rho}, \qquad (1)$$

where $T_i(\vec{\theta},\vec{\rho})$ is the transmittance of the reference structure for rays incident at angle $\vec{\theta}$ relative to a ray normal to the detector, $\vec{\rho}$ is a transverse position on the detector surface, and $\alpha$ is a distance along the ray in direction $i_{\vec{\theta}}$. Note that $T_i(\vec{\theta},\vec{\rho})$ is the x-ray transform of the reference structure (the Radon transform in 2D).

$S(\rho)$ is the state of the source described as a function of position in space (i.e. a source density function.) In conventional tomography, S would be the source, e.g., if you look at a computer tomographic image of bone and tissue, S is the 3D function describing the intensity of the image as a function of position. $\alpha$ is a scalar parameter of integration. An x-ray projection is the integral of S along a line through the source. In 2D, the set of all line integrals of S is the Radon transform. It is not quite the Radon transform in 3 and higher dimensions, but is related. The Radon transform is invertible for S, which forms the basis for 2D computer tomography. Computer tomography often reconstructs sources in 2D slices using Radon transforms. One obtains these transformations in computer tomography by scanning the illumination to get projections of the source along lines. Reference structure tomography (RST) uses the reference structure to get discrete groups of line or other projections without scanning, and "integration along the ray extent" means integration from one end of the ray to the other. The ray extent would be the length of the ray or the space spanned by it, and the state of the $i^{th}$ detector is the amplitude of the signal it is currently receiving.

Figure 9:
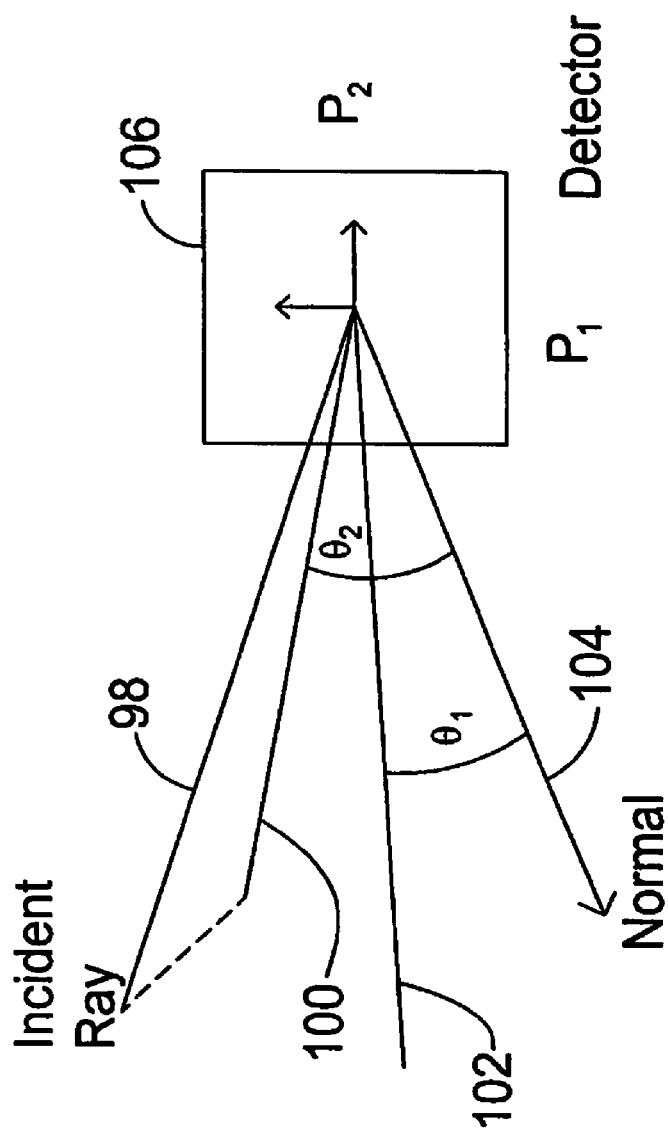
FIG. 9 illustrates the ray geometry of FIG. 8.

FIG. 9 illustrates the ray geometry of FIG. 8. In FIG. 9, a detector 106 has dimensions $P_1 \times P_2$ and receives ray projections 98, 100, and 102. The normal vector to the surface of the detector 106 is 104. The angle between the normal vector 104 and ray projection 98 is $\theta_2$, and the angle between the normal vector 104 and ray projection 102 is $\theta_1$.

In the example shown in FIG. 9, the need for a reference structure is not immediately apparent because $m_i$ contains sufficient information to reconstruct the source space even if $T(\bar{\theta},\bar{\rho})=\delta(\bar{\theta}-\bar{\theta}_p)\delta(\bar{\rho}-\bar{\rho}_p)$, i.e., if each measurement corresponds to a particular ray. However, the reference structure may reduce the number of time steps and number of detectors needed to characterize the source for purposes of numerical inversion. Note that the measurements $m_i$ constitute a discrete linear transformation of the source state and that this transformation is invertible.

Figure 10:
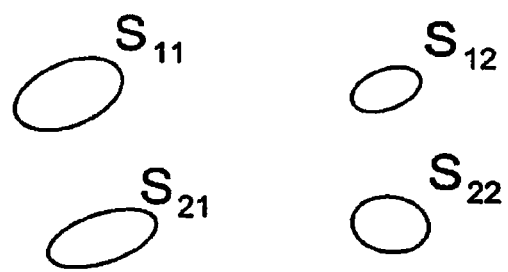
FIG. 10 illustrates a point source geometry.

An embodiment of visible projection RST may include a source consisting of a 2×2 array of point sources of light. The geometry of such point sources is illustrated in FIG. 10, and are labeled $S_{11}$, $S_{12}$, $S_{21}$, $S_{22}$, corresponding to their position in an array. The sources may be measured, for example, by a detector array/reference structure combination, such as the one illustrated in FIGS. 11-15. In FIGS. 11-15, a reference structure containing obstructions 111 lies between the point sources $S_{11}$, $S_{12}$, $S_{21}$, $S_{22}$ and detectors 107, 108, 109 and 110.

Figure 11:
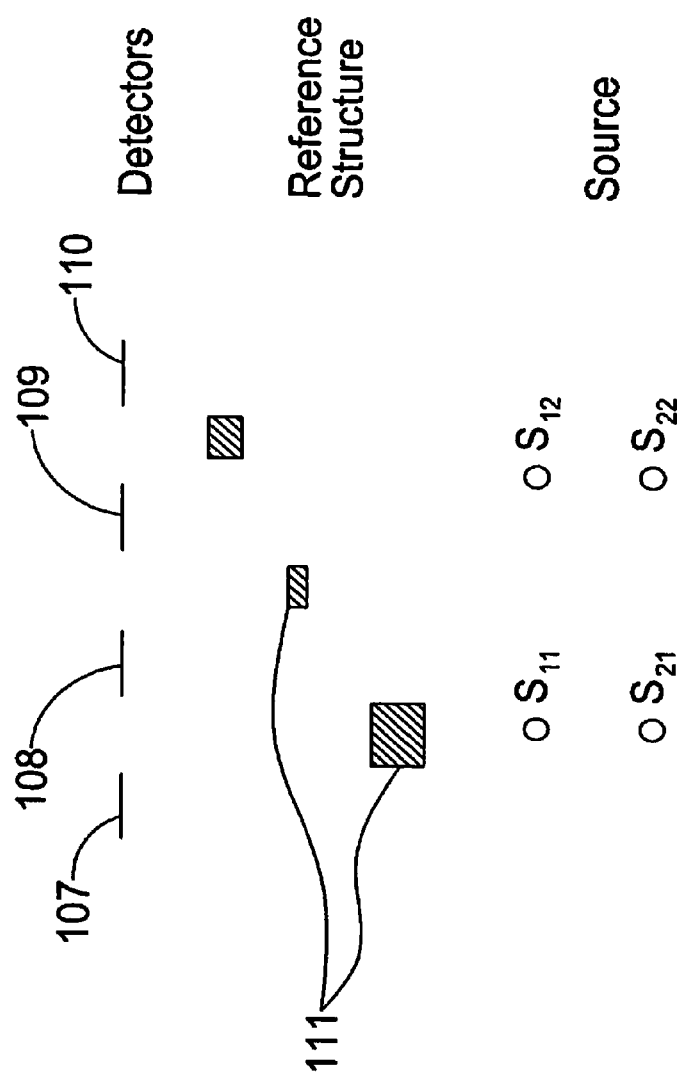
FIGS. 11-15 are schematic diagrams illustrating a reference structure obscuring various point sources, in accordance with the present invention.
Figure 12:
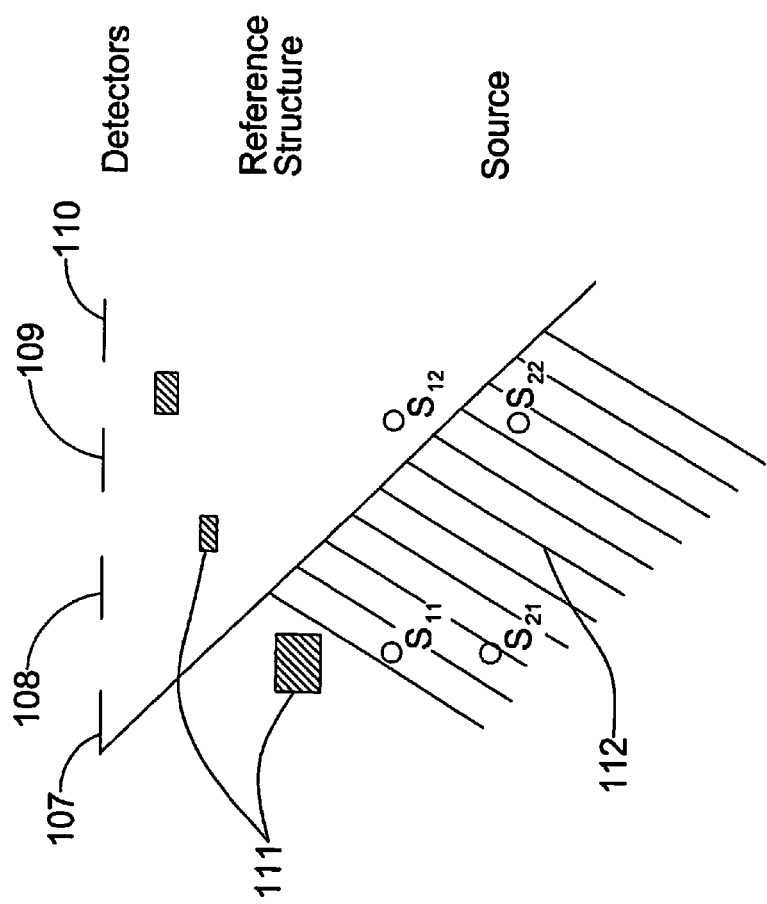
Figure 13:
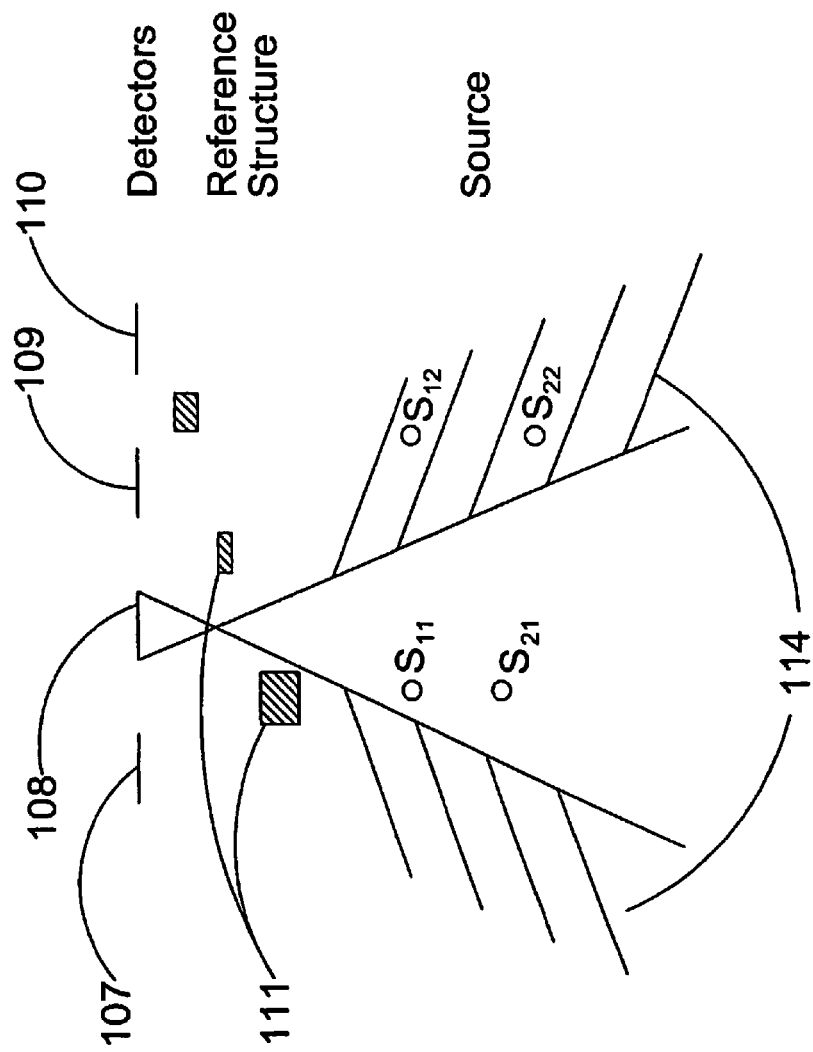
Figure 14:
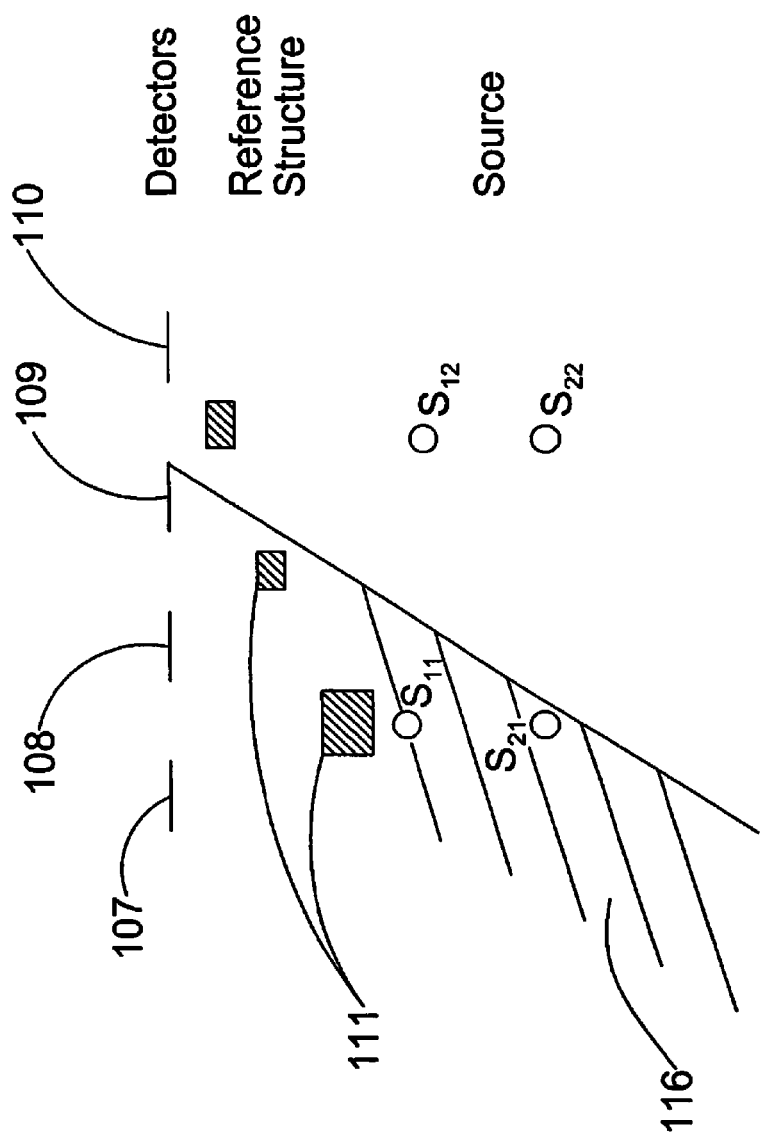
Figure 15:
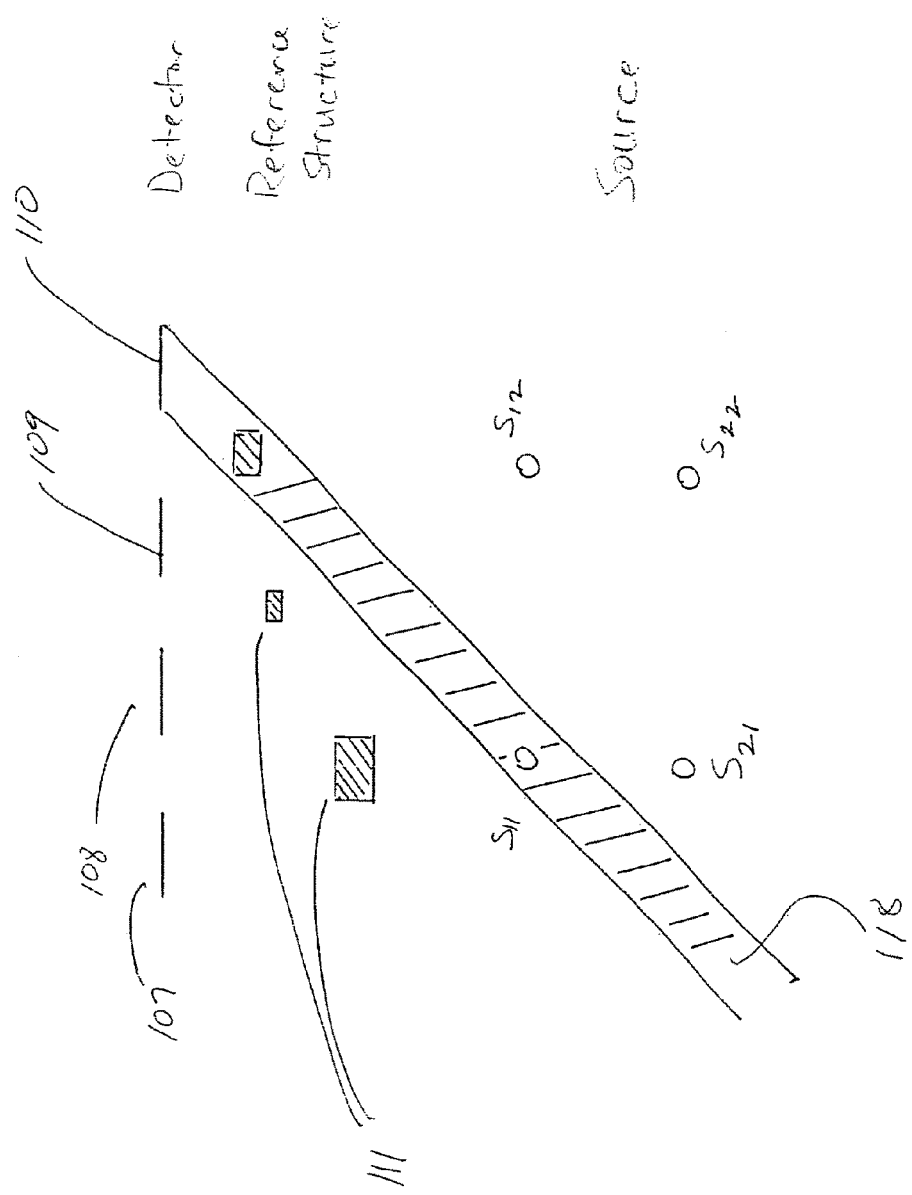

As illustrated in FIG. 12, the reference structure of FIG. 11 obscures all point sources from the first detector 107 except for point source $S_{12}$ because it lies outside the obscured area 112. FIG. 13 shows how the second detector 108 can detect only source points $S_{21}$ and $S_{21}$ because they lie outside the obscured area 114. FIG. 14 shows how the third detector 109 can detect only points $S_{12}$ and $S_{22}$ because they lie outside the obscured area 116. Finally, FIG. 15 shows how the fourth detector 110 can detect $S_{12}$, $S_{21}$ and $S_{22}$, but not $S_{11}$, because they lie outside the obscured area 118.

For a chosen geometry of detectors, reference structure and point sources, it is possible to model the detector and reference structure system's response to a source or sources with a matrix. For the system illustrated in FIGS. 11-15, the source-to-measurement transformation may be represented in matrix form as m=Ts where $$T = \begin{bmatrix} 0 & 1 & 0 & 0 \\ 1 & 0 & 1 & 0 \\ 0 & 1 & 0 & 1 \\ 0 & 1 & 1 & 1 \end{bmatrix} \quad (2)$$

If the reference structure is designed such that T is nonsingular, than this transformation may be inverted to estimate the source from the measurements. The process of inversion consists of multiplying the measurement vector by the inversion matrix. This is called "algebraic inversion" and is always possible. In practice, more efficient inversion algorithms may be available and preferred. In the example of FIGS. 11-15 the inversion $T^{-1}$ of T is $$T^{-1} = \begin{bmatrix} 0 & 1 & 1 & -1 \\ 1 & 0 & 0 & 0 \\ 0 & 0 & -1 & 1 \\ -1 & 0 & 1 & 0 \end{bmatrix} \quad (3)$$

Where the matrix $T^{-1}$ is the linear transformation, it is preferable to design the reference structure such that the linear transformation from the source descriptors to the measurement is well conditioned for the estimation of desired source parameters.

A "source descriptor" describes the actual state of the source, however, a measurement is what is actually measured. A linear inversion or some other mathematical algorithm is used to estimate source descriptors or functions of source descriptors from the measurement. These estimates are what the source calls "source parameters," also known as "source estimates" or "estimation parameters".

As an example to illustrate the difference between source description and source parameters, the source descriptor could be "the state of the source is heads" or the "state of the source is tails". The measurement could be a picture of the coin. Based on the measurement, one could estimate whether or not the state of the source is heads or tails. If the image is blurry or noisy, this estimate may be subject to error. The process of RST consists of using a reference structure to code the source radiation such that measurements can be used to compute estimations of source descriptors. A linear transformation such as the matrix T described above is "well-conditioned" if it has an inverse matrix $T^{-1}$. This is the case if T is nonsingular and if the ratio of the largest eigenvalue or singular value of T to the smallest is not large. The matrix in the above example is well conditioned.

Multiplicative Diffuse RST

Multiplicative diffuse RST takes advantage of wave phenomena such as diffraction, refraction, scattering, diffusion, phase, frequency, etc. Visible projection RST neglects diffraction. Accordingly, under visible projections, a measurement point sums all source points based on their visibility from the measurement point. The visibility is proportional to the density of the ray through the reference structure from the measurement point to the source point. Under diffuse RST, radiation from source points may diffract around obstructions. In this case, the state of a measurement may depend on source points that are not visible from a source point.

As an example, visible projection corresponds to looking at an object through a forest. Light from the object may be sensed only if the object is unobscured by trees. However, if the same object were sensed through the forest by listening to sound made by it, the object can be sensed even if it is obscured by the trees because sound waves diffract around the trees. The signal diffracted by the trees still has some spatial sensitivity, i.e., the object may be detected through the trees differently depending on the object's and the detector's position relative to the trees). Using this diffuse spatial pattern to find or image the person through the trees is diffuse RST.

Diffuse RST does not function with rays, visible RST does. Neither diffuse nor visible RST are likely to rely on Radon transforms or any other well known transformation. They can be designed to rely on some well-known mappings, which we have done in the case of the motion sensor reported below, but in general the mapping and its inverse may be an arbitrary linear transformation, such as transformations T shown above. A reference structure relying on such wave characteristics will generate more complicated mappings between the source and the measurement, and can thus yield more information about the source. Such mappings may be represented as $$m_i = \int_{detector\ area} \int_{source} T_i(\vec{r},\vec{\rho})S(\vec{r})d\vec{r}d\vec{\rho} \quad (4)$$

Figure 16:
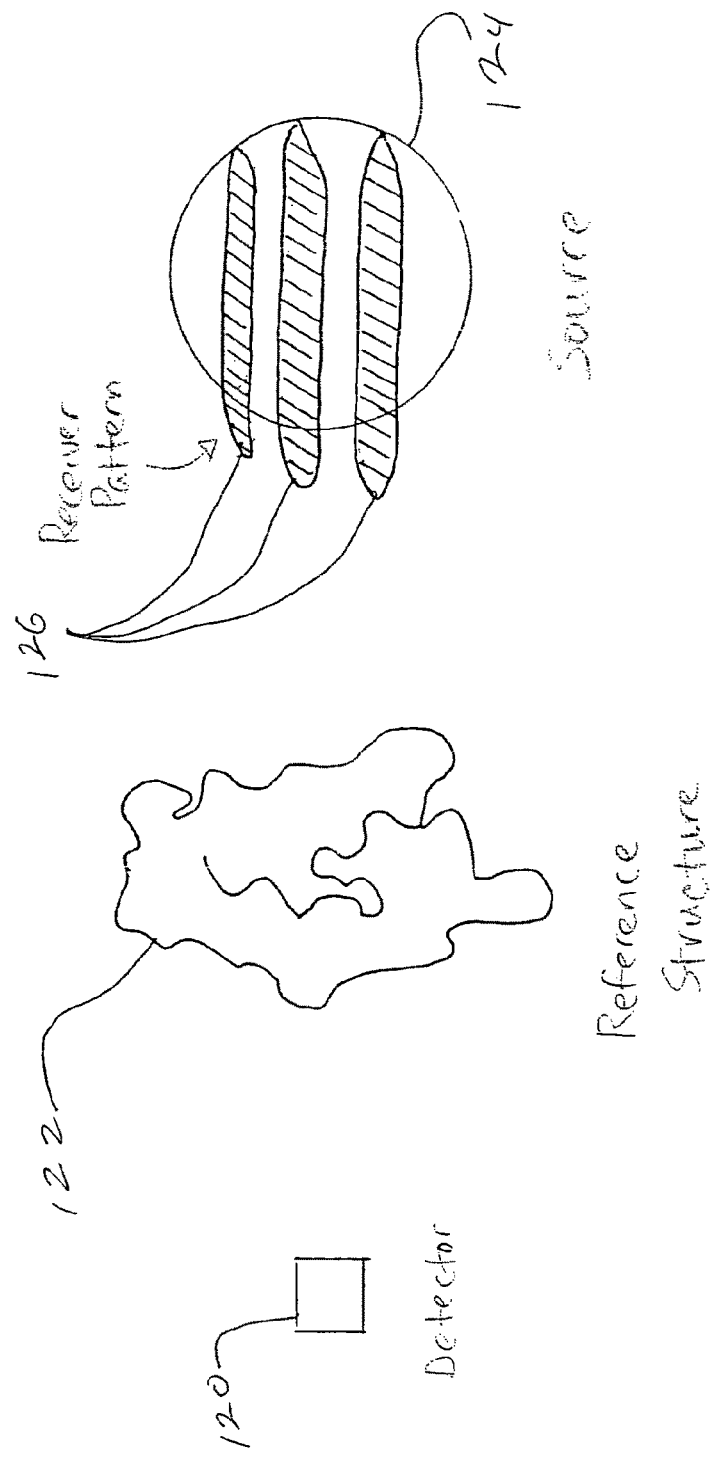
FIG. 16 is a schematic diagram of a RST system, in accordance with another embodiment of the present invention.

In FIG. 16, a reference structure 122 is disposed between a source 124 and a detector 120. A receiver pattern 126 is shown superimposed over the source 124. It should be noted that the receiver pattern 126 will not have rectilinear boundaries in the diffuse case.

Referring to FIG. 16, which is a schematic diagram of a RST system in which receiver patterns for diffuse propagation, analogous to those shown above for the 2×2 source of FIGS. 10-15, are shown. $\vec{r}$ is a position variable over the source space 124. $\bar{\rho}$ is used as in Equation 1 to refer to position on the sensor. The sensor is a finite area device that integrates the field over the area to produce a discrete number. $\bar{\rho}$ in Eq. (4) integrates over the area of the detector.

$T_i(\vec{r},\bar{\rho})$ is the receiver pattern 126 for position $\bar{\rho}$ on the ith detector. $T_i(\vec{r},\bar{\rho})$ is a probability that the source signal radiated from point $\vec{r}$ is detected by the ith detector. The order of integration in Eq. 2 is over the source variable $\vec{r}$ on the inner integral followed by the detector position $\bar{\rho}$ on the outer integral. The order of integration can be flipped, however and one achieves a simpler and more intuitive equation by performing the integral over $\bar{\rho}$ first, which yields $$m_i = \int \tilde{T}_i(\vec{r}) S(\vec{r}) d\vec{r} \qquad (5)$$

where $\tilde{T}_i(\vec{r}) = \int T_i(\vec{r},\bar{\rho}) d\bar{\rho}$ is the receiver pattern averaged over the detector area. One may interpret receiver pattern 126 to represent this average receiver pattern on the ith detector without loss of generality.

A mapping is a transformation from a distribution on one space to a distribution on another space. Eq. (4) is a mapping from the source distribution defined over $\bar{\rho}$ in the modified Eq. (4) to the sensor state defined over the discrete positions indexed by i. Eq. (4) could describe either visible or diffuse RST, the difference between the two cases is that visible RST assumes that the receiver pattern is based on the "ray visibility" through the reference structure, diffuse RST allows the field radiated by the reference structure to diffuse through the structure. For example, the source field may consist of sound waves. The detectors can hear the sound even though the source may be visibly obscured because sound does not propagate in straight lines. However, the reference structure can still modulate the propagation of the sound waves such that a receiver pattern is produced and the source can be estimated.

$T(\bar{\theta},\bar{\rho})$ in Eq. 1 is not the same function as $T_i(\vec{r},\bar{\rho})$ in Eq. (4). In visible reference structure tomography, the mapping from the source to the sensor is based simply on the visibility through the reference structure from the sensor point to the source point. $T(\bar{\theta},\bar{\rho})$ is the visibility from the sensor point $\bar{\rho}$ through the reference structure in direction $\bar{\theta}$. Under diffuse RST, calculation of the mapping from the source to the sensors requires detailed analysis of field propagation through the reference structure. $T_i(\vec{r},\bar{\rho})$ describes the results of this analysis between the source point $\vec{r}$ and the sensor point $\bar{\rho}$, but we do not consider the details of this diffractive and refractive analysis here.

Eq. (1) is a triple integral because we use a simple algorithm for relating the reference structure to the mapping between the source and the sensor in visible RST (the visibility through the reference structure determines the mapping). Eq. (4) is only a double integral because we have not related the receiver pattern to the physical characteristics of the reference structure. Position in the source space in Eq. (1) is $\vec{r} = \bar{\rho} + \alpha i_{\bar{\theta}}$, the integral over $\alpha$ and $\theta$ in equation 1 corresponds to the integral over r in Eq. (4).

Referring to FIG. 16, the receiver pattern 126 shown on the source 124 is a probability density where signals or rays emitted from the corresponding source points are sensed by the detector 120 after modulation by the reference structure 122. As with the visible projection case, it is preferred to implement mappings that enable well-conditioned estimation of source variables. Note that the receiver pattern 126 is nonconvex (e.g., along lines through the receiver pattern one encounters multiple disjoint regions of high and low probability of detection. A convex region is a region such that all lines between points contained in the region are also contained in the region. A connected region is a region such that there exists at least one path between any two points in the region which is also in the region. A circular receiver pattern is both convex and connected. The cone associated with the receiver pattern for a pixel in a focal system is nonconvex but is connected.) Nonconnected receiver patterns may be desirable because they enable high-frequency and high resolution sensing without localizing the receiver pattern to a point.

While conventional optics, such as lenses, can be used as reference structures, these devices will not produce receiver patterns at the level of complexity obtained with multiple dimensional modulations. Reference structures which are modulated non-monotonically in multiple dimensions are necessary to produce complex nonconvex receiver patterns. Non-monotonic modulation is a modulating signal that contains multiple local minima and maxima (it does not increase or decrease monotonically). In the context of simple thin lens design, a lens does not modulate a wavefield in depth and modulates the optical path length monotonically up to some maximum and then monotonically back down to a minimum. A reference structure will include multiple minima and maxima in the modulating refractive, diffractive or absorptive structure along lines through the reference structure.

Additive RST

Tomographic imaging systems can be based on particular models for the source/detector mapping. Under the multiplicative RST model discussed above, it is assumed that projections consist of a linear modulation on propagation through the source and the reference structure individually, but that the reference structure modulates the source signal multiplicatively. This model is appropriate when the reference structure strongly modulates the source signal, as when the reference structure consists of obscuring structures or apertures in an opaque mask. This is the case in the 2×2 example of FIGS. 11-15.

Visible multiplicative and additive RST are based on different approximations to the transmission model $$t(\vec{\rho}, \vec{\theta}) = \exp\left(-\int_{\substack{ray \\ extent}} [T(\vec{\rho} + \alpha i_{\vec{\theta}}) + S(\vec{\rho} + \alpha i_{\vec{\theta}})] d\alpha\right), \qquad (6)$$

where $t(\bar{\rho},\bar{\theta})$ is the signal transmitted by the combination of the source and reference structure to the measurement point $\bar{\rho}$ along the ray direction $\bar{\theta}$. Across the detector, the signal resulting from $t(\bar{\rho},\bar{\theta})$ is $$m_i = \int_{\substack{detector \\ area}} \int_{\substack{detector \\ acceptance \\ angle}} t(\vec{\rho}, \vec{\theta}) d\vec{\theta} d\vec{\rho} \qquad (7)$$

The multiplicative approach uses the separation $$t(\vec{\rho}, \vec{\theta}) = \exp\left(-\int_{ray\ extant} [T(\vec{\rho} + \alpha i_{\vec{\theta}})] d\alpha\right) \exp\left(-\int_{ray\ extant} [S(\vec{\rho} + \alpha i_{\vec{\theta}})] d\alpha\right) \quad (8)$$

and defines $$\vec{T}(\vec{\rho}, \vec{\theta}) = \exp\left(-\int_{ray\ extent} [T(\vec{\rho} + \alpha i_{\vec{\theta}})] d\alpha\right) \quad (9)$$

as the visibility of the reference structure. The approximation $$\exp\left(-\int_{ray\ extent} [S(\vec{\rho} + \alpha i_{\vec{\theta}})] da\right) \approx 1 - \int_{ray\ extent} [S(\vec{\rho} + \alpha i_{\vec{\theta}})] da \quad (10)$$

the yields equation 1. The additive approach makes the alternative approximation $$t(\vec{\rho}, \vec{\theta}) \approx 1 - \int_{ray\ extent} [T(\vec{\rho} + \alpha i_{\vec{\theta}}) + S(\vec{\rho} + \alpha i_{\vec{\theta}})] da \quad (11)$$

The additive approach as represented by Eq. (11) is not useful unless the reference and source signals are nonlinearly combined as in Eq. (13) below. This occurs, for example, when a coherent field is detected by a square law detector.

The most likely example of a weak modulation reference structure is a volume hologram based on 3D absorption or phase modulation. 3D imaging using volume holograms is condensed in, for example: G. Barbastathis, M. Balberg, and D. J. Brady, "Confocal microscopy with a volume holographic filter," *Optics Letters*, vol. 24, pp. 811-813, 1999; G. Barbastathis and D. J. Brady, "Multi-dimensional tomographic imaging using volume holography," *Proceedings of the Ieee*, vol. 87, pp. 2098-2120, 1999; or G. Barbastathis and D. J. Brady, "Volume holographic imaging of three-dimensional objects," *Proceedings of SPIE—The International Society for Optical Engineering*, vol. 3633, pp. 170-181, 1999, all of which are incorporated herein by reference in their entirety. The difference between RST and previous work is that the hologram is designed to measure tomographic projections based on dbResponse.9 rather than focal images.

In some cases, an additive reference structure, where the reference structure weakly modulates the source signal, may be preferred. Weak modulation is attractive when the additive mapping, represented by Eq. (12) below is desired. This mapping is attractive when the detector signal is proportional to the intensity of the radiation field, as represented in Eq. (13) below.

In the case of an additive reference structure, the reference structure signal will add to the source, yielding the mapping:

$$m_i = \int_{detector\ area} \int_{detector\ acceptance\ angle} \int_{ray\ extent} [T(\vec{\rho} + \alpha i_{\vec{\theta}}) + S(\vec{\rho} + \alpha i_{\vec{\theta}})] d\alpha d\vec{\theta} d\vec{\rho} \quad (12)$$

Figure 17:
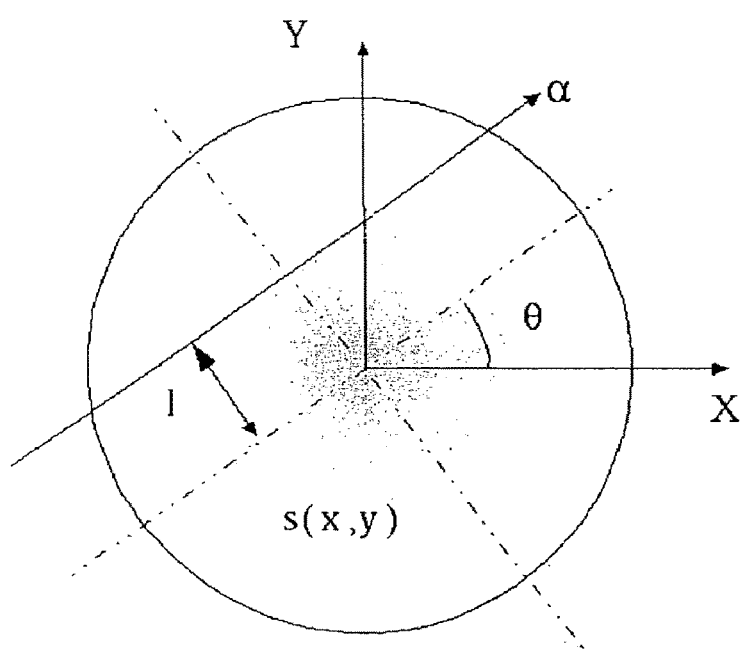
FIG. 17 illustrates a geometry for analysis of spatial scaling vs. resolution for two-dimensional RST, in accordance with the present invention.

$i_{\vec{\theta}}$ represents a unit vector pointing in the direction of the angle vector $\vec{\theta}$. As illustrated in FIG. 17, $\vec{\theta}$ is a simple angle in the plane in 2D, but becomes a two dimensional position on the unit sphere in 3D (in mathematical terms $\vec{\theta}$ is a point in $S^n$, the n dimensional sphere). It is not really necessary to make a distinction between $i_{\vec{\theta}}$ and $\vec{\theta}$, but in common usage in 3D $\vec{\theta}$ might be the ordered pair $(\theta, \phi)$ and $i_{\vec{\theta}} = \sin\theta \cos\phi i_x + \sin\theta \sin\phi i_y + \cos\theta i_z$.

The geometry of additive and multiplicative modulation is the same and the difference lies in the reference structures modulation properties and the detection model illustrated in Eq. (13) below. Multiplicative RST is probably much more useful for optical applications, but additive RST is more useful in extending the utility of x-ray crystallography.

The additive mapping is most useful in cases where the source is considered as a coherent field and the detection process is nonlinear, as is the case with intensity detectors. In this case the measurement can be described as $$\vec{m}_i = |m_i|^2 = |\mu_R + \mu_S|^2 \quad (13)$$
$$= |\mu_R|^2 + |\mu_S|^2 + \mu_S^* \mu_R + \mu_R^* \mu_S$$

where $\mu_R$ is the field due to the reference structure and $\mu_S$ is the field due to the source. If the reference structure is designed to produce a scattered or radiated field of a known frequency or known basis, it is possible to filter on this frequency or basis to isolate $\mu_S$ from the measurement, essentially achieving self-referencing structural holography.

Some of the advantages of RST are that it enables reconstruction of sources without scanning and that it may allow efficient reconstruction of sources with fewer measurements. Current tomographic and holographic systems use a priori knowledge of the probing field, as in illumination or measurement from a particular direction or sequence of directions in tomography or interference with a reference wave in holography. RST uses the reference structure to eliminate the need for special illumination and for scanning sequences. In this sense, reference structure modulated measurement of a source may be termed self-referencing. In particular, the coherent (additive RST case) or incoherent (multiplicative RST case) field radiated by the source provides its own interferometric (additive case) and/or projective (multiplicative case) reference fields by structuring source radiation patterns. Because a source in a reference structure modulated measurement does not need to be scanned as a function of time, the source space might also be termed "self-revealing."

As an example, many diffractive scattering systems rely on the Fourier transform relationship between far-field scattering patterns and a near-field structure. In this case, it may be assumed that $\mu_S = \tilde{S}(\vec{k})$ and $\mu_R = \tilde{R}(\vec{k}) e^{j\vec{k}\cdot\vec{d}}$, where $\vec{d}$ is the separation between the center of the reference structure and the center of the source and $\vec{k}$ is a wave number proportional to the direction between the source and the detector and the illumination wavelength. It is then possible to filter on a frequency proportional to $\vec{d}$, if $\vec{d}$ is less than the coherence length of the illumination. For example, this relationship forms the basis for heavy atom decoding in x-ray crystallography. On molecular scales, the coherence length would have to extend to several nanometers for molecular reference structure tomography. For example, see: E. delaFortelle and G. Bricogne, "Maximum-likelihood heavy-atom parameter refinement for multiple isomorphous replacement and multi-wavelength anomalous diffraction methods," in *Macromolecular Crystallography, Pt A*, vol. 276, *Methods in Enzymology*, 1997, pp. 472-494; R. W. Grosse-Kunstleve and A. T. Brunger, "A highly automated heavy-atom search procedure for macromolecular structures," *Acta Crystallographica Section D-Biological Crystallography*, vol. 55, pp. 1568-1577, 1999; U. Heinemann, G. Ming, and H. Oschkinat, "High-throughput three-dimensional protein structure determination," *Current Opinion in Biotechnology*, vol. 12, pp. 348-354, 2001; or T. V. Ohalloran, S. J. Lippard, T. J. Richmond, and A. Klug, "Multiple Heavy-Atom Reagents for Macromolecular X-Ray Structure Determination—Application to the Nucleosome Core Particle," *Journal of Molecular Biology*, vol. 194, pp. 705-712, 1987, all of which are incorporated herein by reference in their entirety.

The measurement term of particular interest in this case is $$\mu_R^* \mu_S = \tilde{R}^*(\vec{k}) \tilde{S}(\vec{k}) e^{-j\vec{k}\cdot\vec{d}} \quad (14)$$

In the ideal case, where $\tilde{R}(\vec{k})$ is equal to a constant, the measurement is simply proportional to $\tilde{S}(\vec{k})e^{-j\vec{k}\cdot\vec{d}}$ and the source distribution can be obtained by filtering about the carrier $\vec{d}$. (Filtering in this context refers to considering only a window centered on $\vec{d}$ as representative of the source density $S(\vec{r})$ in the inverse Fourier transform of the measurement.) To obtain this situation, the reference structure must be a very strong point scatterer. Since any point scatterer is unlikely to scatter sufficient power to enable reconstruction, heavy atom methods use diffuse arrays of point scatterers to generate a reference signal. In heavy atom methods a discrete set of strong point scatterers is embedded in a target molecule. In this case, $$\vec{R}(\vec{\kappa}) = \sum_{\substack{strong \\ scatterers}} e^{j\vec{k}\cdot\vec{d}_i}.$$

Formally, one estimates $\tilde{S}(\vec{k})e^{-j\vec{k}\cdot\vec{d}}$ in this case by dividing Eq. (14) by $\tilde{R}(\vec{k})$, although other methods are likely in practice. Additive reference structure tomography is a generalization of heavy atom methods to weaker and more distributed scatterers and to novel sensor modalities in optics, acoustics and other propagating field modalities. In the case of x-ray crystallography, additive RST might consist, for example of binding unknown target molecules to known reference structure molecules to enhance x-ray determination of molecular structure.

An example of a benefit of RST is for scan-free multi-dimensional imaging, as shown in the simple 2×2 sensor example of FIGS. 11-15, where RST can achieve multi-dimensional source reconstruction without the spatial and temporal scanning associated with conventional tomography. In contrast to conventional tomography, RST can sort and filter radiation to obtain all projections in a single time step. The reference structure determines the spatial sampling rate and limits the resolution of the source reconstruction, but this limit is not necessarily worse than the restrictions imposed by conventional sampling.

As noted above, RST is used to estimate sources on multi-dimensional spaces without scanning, to estimate sources on unusual bases, such as modal densities as a function of time and to estimate sources using fewer measurements than naïve system design might suggest. To understand the sensor efficiency application, consider a source distributed over $N_P$ discrete spatial sampling points or resolution cells. The dynamic range, meaning the number of different discrete values that the source distribution in each cell can assume, is $D_p$. If the state of each cell is independent, the number of different states this source can assume is $D_p^{N_P}$. Now suppose that we wish to estimate this source using $N_m$ measurements of dynamic range $D_m$. The number of measurement states exceeding the number of possible source states is a necessary but not sufficient condition for discrimination of each source state. For the source described above this requirement implies that $N_m \log D_m \geq N_p \log D_p$. Conventional tomographic and imaging systems satisfy this requirement by making at least on measurement per resolution cell or pixel.

Reference structures enable the receiver pattern 126 illustrated in FIG. 16 to be implemented with multiple spatial resolutions and to combine source points in coded patterns. Receiver pattern programming enables RST to improve sensor efficiency over conventional systems in cases where the state of different resolution cells are not independent. Few sources exhibit such independence in practice, in general, the state of a given cell is influenced by the states of adjacent cells. For example, in an image of a face, the presence of an eye in one region of the image implies that another eye will appear elsewhere in the image. The lack of independence of different regions of the image is the basis of image compression algorithms, which commonly reduce the raw image data by 1-3 orders of magnitude. Reference structure tomography can be used to implement such compression directly in the physical sensor, so that the amount of data sensed and processed is substantially reduced with little or no cost to system performance.

It is possible to quantify the efficiency of a sensor system by defining the number of possible sources $N_S$. For a random source, $N_S = D_p^{N_P}$, but for common sources $N_S$ is dramatically less than this limit. We define the efficiency of a given sensor system to be $$\xi = \frac{\log N_S}{N_m \log D_m} \quad (15)$$

and say that a sensor is efficient if $\xi = 1$. In general the number of sources may be limited in a variety of ways. For example, the source may consist of a discrete set of objects or patterns. To illustrate the use of RST to achieve efficient sensing, we assume here that the source consists of one point radiator occupying one of $N_p$ resolution cells. This situation often occurs in motion imaging systems, in which at most one resolution cell is changing as a function of time. The problem is easily generalized to any finite number of occupied cells, however. A single occupied cell produces at most $N_p$ states. A conventional sensor with $N_m = N_p$ yields the sensor efficiency $$\xi = \frac{\log N_p}{N_p \log D_m} \ll 1.$$

Under certain configurations, it is possible to use reference structures to shape the spatial response pattern of, for example, a microphone for multi-dimensional acoustic imaging or the response of a pyroelectric detector for infrared tracking and identification. Such a sensor may be capable of finding a single source among $N_p$ possible locations in $\log_2(N_p)$ measurements, thus achieving $\xi=1$. An RST measurement on such a source measurement consists of a weighted sum of the resolution cell densities of the forth $m_i=\Sigma_{j=1}^{N_p}\alpha_{ij}s_j$, where $s_j$ is the density in the jth cell and $\alpha_{ij}\in\{0,1\}\cdot\{s_j\}$ is the discretized source density and $\{\alpha_{ij}\}$ is the discretized receiver pattern created by the reference structure.

Given that only zero or one resolution cells are active, the following sequence of measurements determines the density of the occupied cell. $\alpha_{1j}=1$ measures the total density of the source, which in this case is the density of the occupied cell. For i=2 to $\log_2 N_p+1$:

$$\alpha_{ij} = \begin{cases} 1 & \text{odd}\left(\text{floor}\left(\frac{j}{2^{i-2}}\right)\right) \\ 0 & \text{even}\left(\text{floor}\left(\frac{j}{2^{i-2}}\right)\right) \end{cases} \quad (16)$$

The address of the occupied cell is the binary number $$\left(\frac{m_{\log_2 N_p}}{m_1}\right)\left(\frac{m_{\log_2 N_p^{-1}}}{m_1}\right)\left(\frac{m_{\log_2 N_p^{-2}}}{m_1}\right)\ldots\left(\frac{m_3}{m_1}\right)\left(\frac{m_2}{m_1}\right) \quad (17)$$

Thus $\log_2 N_p+1$ measurements are required if $N_p$ is a power of two, and $\log_2 N_p+2$ measurements are required if $N_p$ is not a power of two.

Multi-Dimensional Source Reconstruction Using RST

When multi-dimensional imaging, rather than sensor efficiency, is the goal, RST systems are designed such that the number of measurement points is equal to or greater than the number of source resolution cells. FIG. 17 illustrates a geometry for analysis of spatial scaling vs. resolution for two-dimensional RST. In the analysis, the source 128 is described by a density function s(x,y). As stated above, computed tomography imaging is commonly implemented by digital inversion of a sampled set of ray projections of the density function through the object to be imaged. In conventional implementations, these projections are sampled using a temporal sequence of illumination and reconstruction geometries. These projections are measured and interpreted in the context of a source and illumination model.

The most common interpretation model assumes that each ray projection is a simple integral of the source density along the ray path. Such a model can suggest the assumption that s(x,y) represents a florescence signal from a point located at (x,y), and that the florescence from each point source radiates out from the source at an angle θ without interaction with the rest of the source. Under this assumption, projections through the source are of the form $$g(l,\theta)=\int s(l\cos\theta-\alpha\sin\theta, l\sin\theta+\alpha\cos\theta)d\alpha \quad (18)$$

As illustrated in FIG. 17, l is the shortest distance from the origin to the ray and θ is the angle the ray forms with respect to the x axis.

Taking the Fourier transform of Eq. (18) with respect to l results in $$G(u_l,\theta) = \int\int\int S(u,v)e^{j2\pi(u(l\cos\theta-\alpha\sin\theta)+(l\sin\theta+\alpha\sin\theta)v)} \quad (19)$$

-continued
$$e^{-j2\pi v_l l}du\,dv\,dl\,d\alpha$$
$$= S(u=u_l\cos\theta, v=u_l\sin\theta)$$

where S is the Fourier transform (FT) of s, meaning that the FT of a projection is the slice of the FT of the source. If "l" space is sampled uniformly along an aperture of length $R_s$ with sampling period $\Delta l$, then the resolution along slice in the reconstructed Fourier space G is $\Delta u_l=2\pi/R_s$ and the range in the (u,v) Fourier space spanned by G is $U=4\pi/\Delta l$ Measurements of $g(l,\theta)$ are also sampled in angle. Many sampling algorithms may be considered, but we can estimate the resolution and span obtained in a given geometry by assuming that $g(l,\theta)$ is sampled uniformly in θ with a sampling period $\Delta\theta$. In this case, samples in the Fourier space are polar sampled on a disk of radius $2\pi/\Delta l$. The maximum sampling period on the disk is the greater of $2\pi/R_s$ and $2\pi\Delta\theta/\Delta l$. To obtain quasi-uniform 2D sampling, we set $\Delta\theta=\Delta l/R_s$.

Many algorithms have been developed for mathematical inversion from the projections $g(l,\theta)$ to estimate the source distribution s(x,y). Formally, one imagines inversion based on using the projection slice theorem (Eq. 19) for various θ to fill the estimated Fourier space followed by inverse Fourier transform. The reconstruction space will produce as many sample points as there are projections. In conventional computed tomography systems these projections are obtained by illuminating the source with parallel bundles of rays incident at sampled angles θ. Alternative bundles, such as fan-beam and cone-beam variations may be used, but all require sequential scanning.

Figure 18:
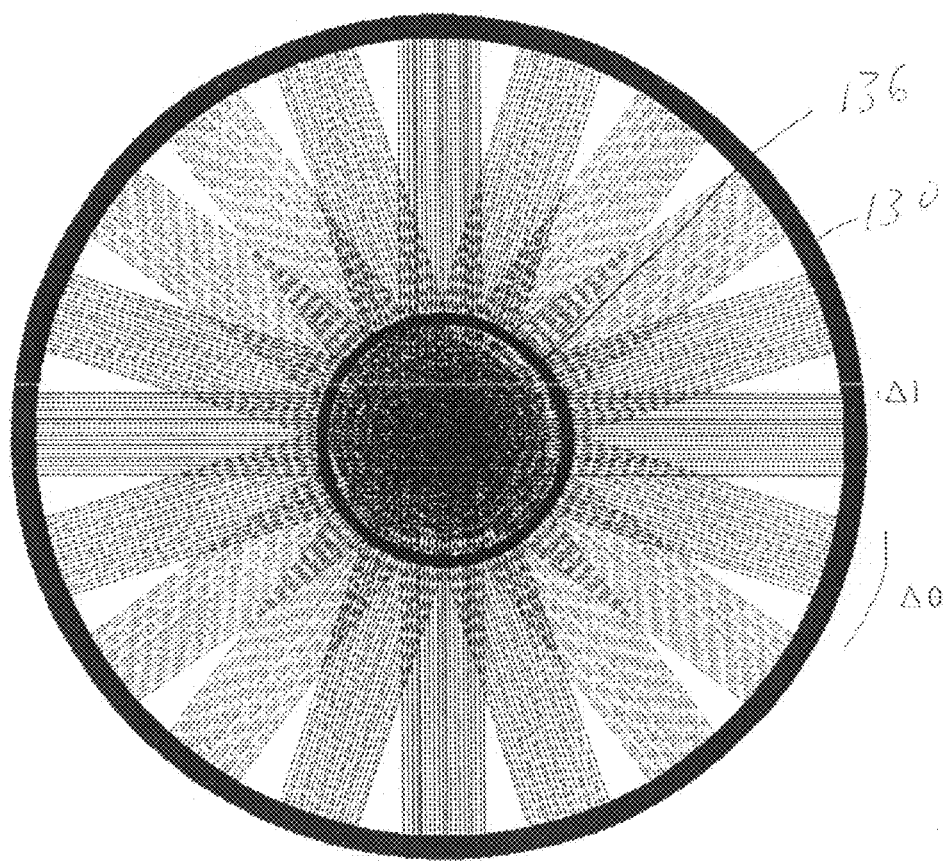
FIG. 18 illustrates a measurement circle.

A reference structure can eliminates to scan in obtaining tomographic projections. Referring to FIG. 18, a radiation source lies within a circle 136 of radius $R_s$, which lies within a measurement circle 130 of radius $R_m$. Rays 132 passing through the source space and incident on the measurement circle are also illustrated. The rays are shown in bundles for values of l spaced by $\Delta l$ relative to each other, where l is defined as in FIG. 17. The angular displacement from one bundle of rays to the next is $\Delta\theta$, where θ is also defined as in FIG. 17. The separation $\Delta l$ between the sampling rays corresponds to the pixel spacing on the measurement circle. Note that the sampling rays cross in the region adjacent to the source. We can insure that the only one ray is incident on each sensor point by setting $$\tan\left(\frac{R_s}{R_m}\right) \leq \Delta\theta.$$

Assuming that $R_m \square R_s$, we find that the rays can be separated so long as $R_m > R_s^2/\Delta l$. As discussed above, $\Delta l$ is the approximate resolution of the tomographically reconstructed estimate of the source. Assuming that signals propagate from source fluorescence or scattering points in straight rays, a reference structure in the form shown in FIG. 19 will sample tomographic projections on the appropriate $\Delta l$, $\Delta\theta$ lattice for reconstruction using Eq. (19). The reference structure would consist of the circular center well 137 of radius $R_s$ surrounded by a circular absorbing medium 131 of radius $R_m$. Holes would be cut through the absorbing medium on spacings of $\Delta l$. Bundles of holes spanning the $R_s$ radius of the inner circle would be formed as shown in the figure. These bundles would be spaced on angular displacements of $\Delta\theta$. Detectors at the ends of each hole would measure the transmittance or radiance of the source along the corresponding ray path, thus sampling g(l,θ) as in Eq. (18).

Figure 20:
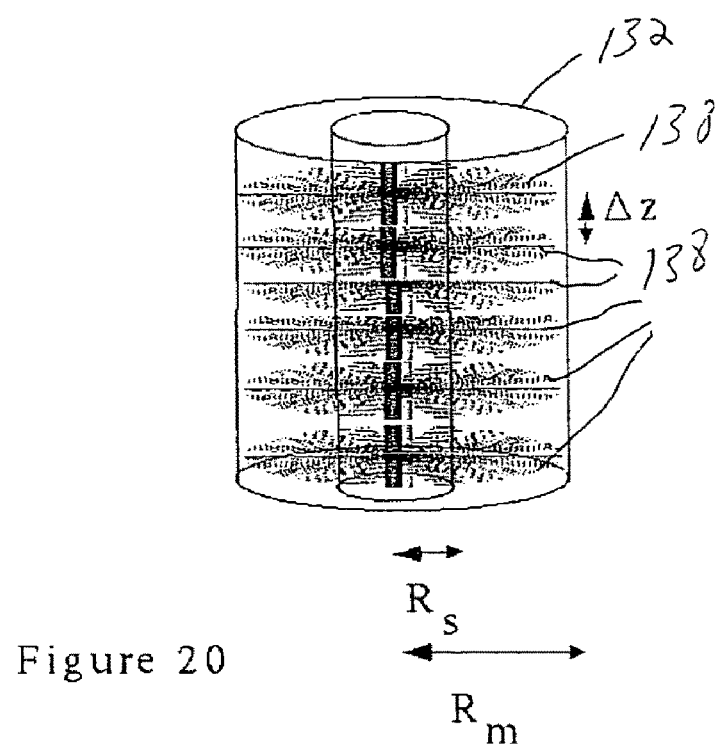

FIG. 19 illustrates that it is possible to build a 2D reference structure that can reconstruct a 2D source tomographically without scanning as long as the radius of the reference structure is greater the square of the radius of the source divided by the spatial resolution of the reconstruction. This argument can be extended to higher dimensions by extending ray projections as in FIGS. 18 and 19. For a three dimensional source, for example, one may consider layered slices of the 2D ray bundles as shown in FIGS. 18 and 19, fan-beam or cone-beam sampling geometries or other ray clusters. FIG. 20 shows a reference structure analogous to FIG. 19 for a 3D source. The structure consists of layers of 2D reference structures 138 spaced by Δz. As in FIG. 19, the black rays in the figure would be holes between detectors on the measurement cylinder. The outer measurement cylinder 132 is of radius $R_m$. The inner cylinder 139 would be a hollow container for the source under measurement of radius $R_s$. Separation of the rays requires that the hole diameters be less than Δz and Δl and that $R_m > R_s^2/\Delta l$, as above.

An alternative approach to constructing a 3D reference structure which yields both better light efficiency and a smaller reference structure relies on the 3D radon transform. Under this approach measurement points on the surface of the reference structure measure the signal radiated by planes of the source. The measured function takes the form $$g(l,\bar{\theta}) \int s(li_{\bar{\theta}} - \alpha i_{\bar{\theta}\perp 1} - b i_{\bar{\theta}\perp 2}) d\alpha d\beta \quad (20)$$

Figure 21:
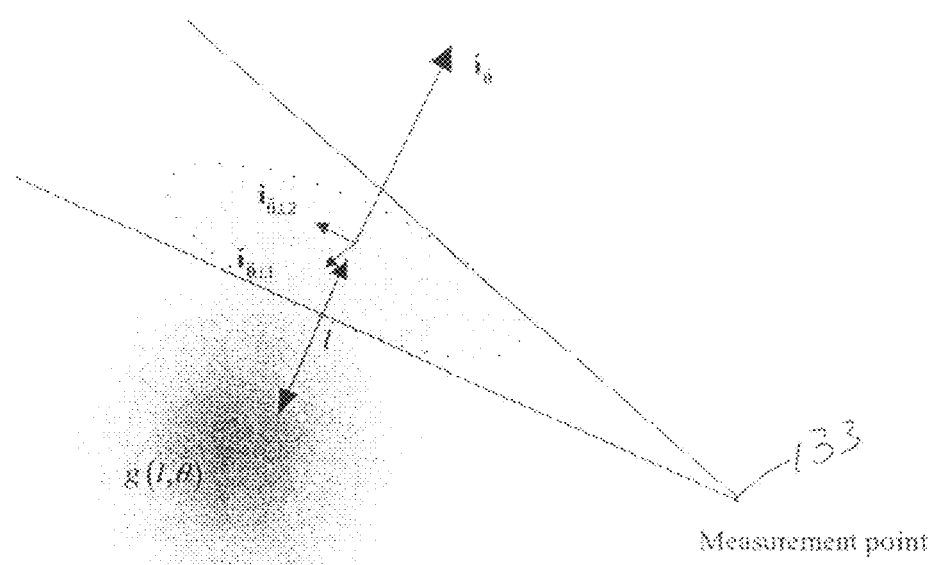
FIG. 21 is a schematic illustration of a RST system that utilizes spherical geometry and obscuring sphere, in accordance with one embodiment of the present invention.

As used previously in this description $i_{\bar{\theta}}$ is a unit vector in the direction of the angles $\bar{\theta} = (\theta, \phi)$ on the unit sphere. $i_{\bar{\theta}\perp 1}$ and $i_{\bar{\theta}\perp 2}$ are unit vectors in three dimensions orthogonal to $i_{\bar{\theta}}$ and to each other. The geometry of the integration of Eq. (20) is illustrated in FIG. 21. A detector at the measurement point 133 with an unobstructed view of the plane spanned by $i_{\bar{\theta}\perp 1}$ and $i_{\bar{\theta}\perp 2}$ a distance 1 away from the origin measures $g(l,\bar{\theta})$ as in Eq. (20). Again taking the Fourier transform with respect to 1, we find the 3D version of the projection slice theorem $$G(u_l, \bar{\theta}) = \int \int \int S(\bar{u}) e^{j2\pi l(\bar{u} \cdot i_{\bar{\theta}} - u_l)} e^{j2\pi \alpha \bar{u} \cdot i_{\bar{\theta}\perp 1}} e^{j2\pi \alpha \bar{u} \cdot i_{\bar{\theta}\perp 2}} du dv dl d\alpha d\beta \quad (21)$$

$$= S(\bar{u} = u_l i_{\bar{\theta}})$$

One uses a reference structure to measure $g(l,\bar{\theta})$ by mapping leaving conic sections of the form shown in FIG. 21 unobscured for measurement points on the surface of a sphere of radius $R_m$. The cross section of the point of the cone at the measurement point determines the reconstruction resolution Δx. If one uses a sampling scheme that full populates the outer sphere with sampling points, equality between the number of data points on the measurement sphere and the number of reconstructed source points will require $R_m^2 > R_s^3/3\Delta x$. Many sampling schemes may approach this limit.

As an example of reference structure design for 3D Radon transform sampling, we assume that we sample points on the measurement sphere at the following angular coordinates:

$$^m\phi_{ij} = j\frac{\Delta x}{R_m \sin(^m\theta_i)} \quad j = 0, 1, 2 \ldots \frac{2\pi r_m \sin(^m\theta_i)}{\Delta x} \quad (22)$$

$$^m\theta_i = i\frac{\Delta x}{R_m} \quad i = 0, 1, 2 \ldots \frac{\pi R_m}{\Delta x}$$

Figure 22:
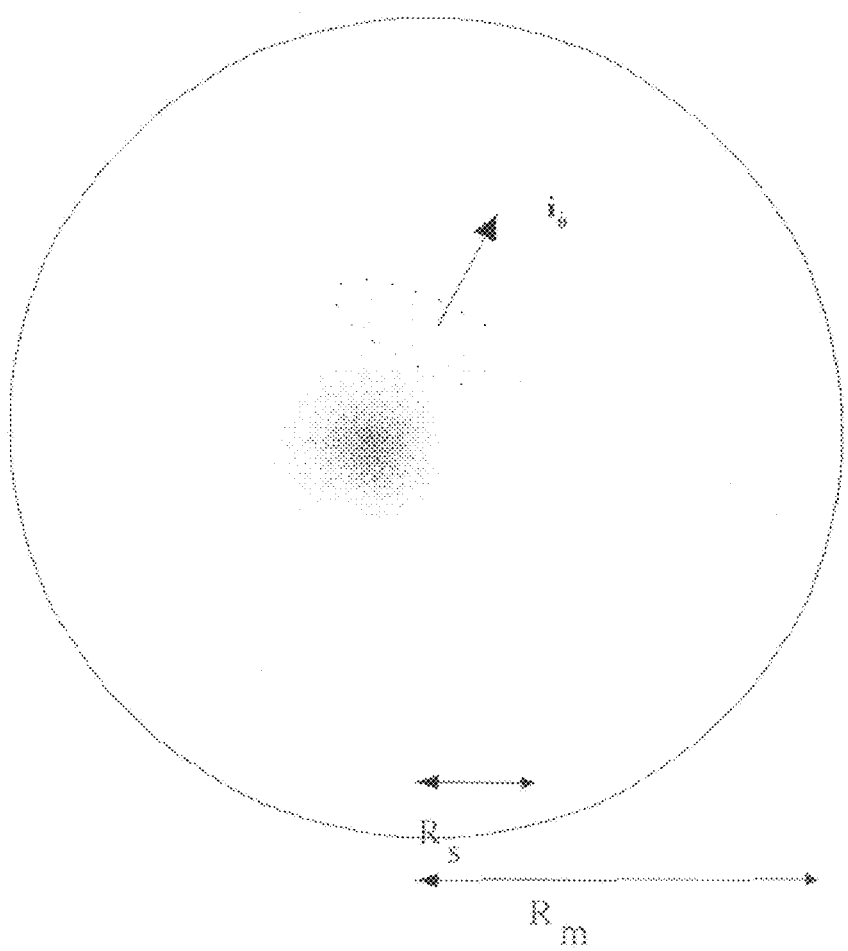
FIG. 22 is a schematic illustration of a reference structure formed around clear polygons in accordance with the present invention.
Figure 23:
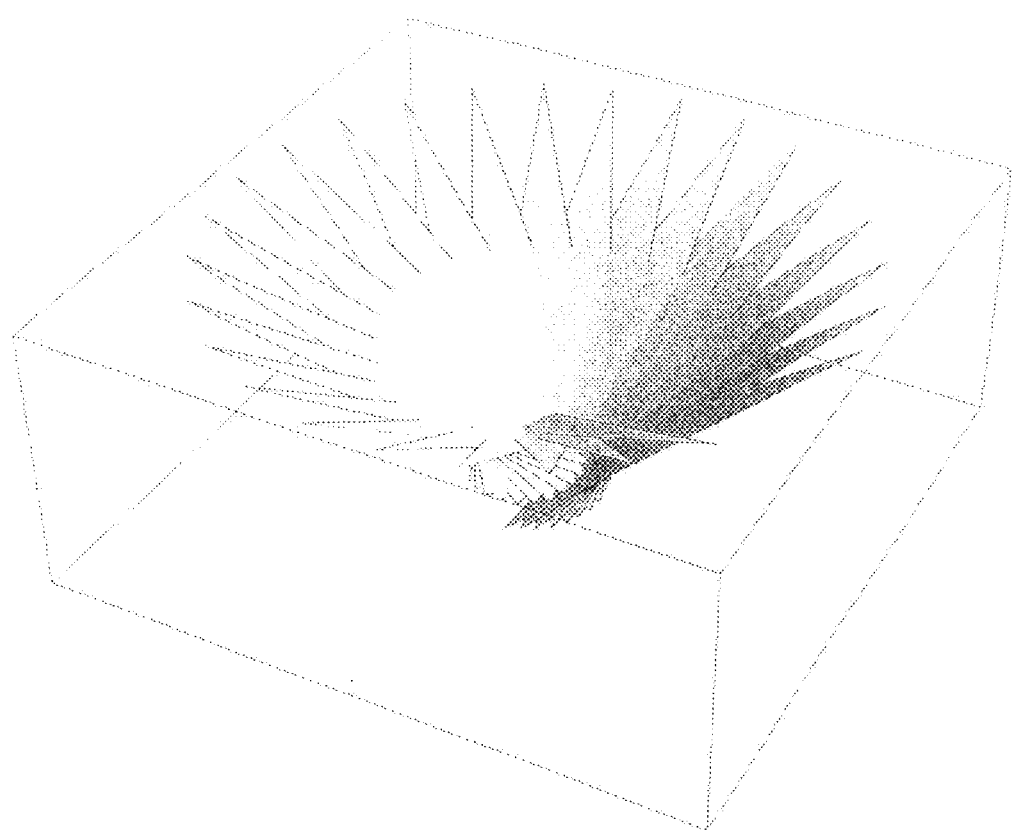
FIG. 23a shows channels for $\Delta x = R_s/100$, in accordance with the present invention.
FIG. 23b is a schematic representation of stacked reference structure, in accordance with the present invention.

$^m\phi_{ij}$ and $^m\theta$ are angular positions on the measurement sphere. This strategy produces approximately $4\pi R_m^2/\Delta x$ samples. We assign samples on the measurement sphere to samples in the 3-dimensional $(l,\bar{\theta})$ space on which we sample g $(l,\bar{\theta})$ according to some algorithm. For example, setting $$\phi_{ij} = {}^m\phi_{ij} \quad (23)$$

$$\theta_i = {}^m\theta_i + \cos^{-1}\left(\frac{R_s}{R_m} \frac{{}^m\phi_{ij}}{2\pi}\right) \quad 0 < \theta_i < \pi$$

$$l = R_s \frac{{}^m\phi_{ij}}{2\pi}$$

would sample using a reference structure formed around clear polygons as shown in FIG. 22. The transmissive region formed in the figure would be a non-absorbing channel through which source radiation over a plane of the source is visible to a detector at an outer vertex. FIG. 23a shows channels for $\Delta x = R_s/100$, which produces over a million sample points on a measurement sphere approximately 6 radii out from the source volume.

The sampling scheme described by Eq. (23) produces a radially sampled Fourier space of $\bar{u}$ over $S(\bar{u})$. Samples are obtained at evenly spaced radii along rays at the sampled angular values. The Fourier space sample frequency is $1/R_s$ and the radius of the band volume covered is approximately $1/\Delta x$.

Photon Efficiency and RST

While Radon transform-based reference structures illustrate that reference structures can be constructed to enable scan-free multi-dimensional sensing, the light efficiency of these structures is relatively poor. In the ray based structures the power detected by the sensors is only $$\frac{1}{\sqrt{N_p}}$$

of total radiated energy, with the remainder of the energy absorbed by the reference structure. As used previously, $N_p$ is the number of resolution elements in the source. The 3D planar sampling reference structures obtain somewhat better performance, detecting approximately $$N_p^{-\frac{1}{3}}$$

of the radiated power.

Reference structures can be designed to provide multiplex coverage with a larger system response function, which improves photon efficiency. Radon based transforms described designed such that only $\sqrt{N_p}$ source cells are detected by each detector in the 2D case and $$N_p^{\frac{2}{3}}$$

are detected in the 3D case. In general, signals from all the source cells are radiated to each detector element and unwanted signals must be obscured or absorbed to enable Radon-based coding. One could overcome the poor photon efficiency implicit in this absorption by increasing the number of detector elements, perhaps by making the reference structure itself from detector elements, or by designing the reference structure to be as transmissive as possible.

Alternative transformations, such as Hadamard or Fourier-transform based schemes might be implemented on the source space to improve photon efficiency. Hadamard and Fourier systems measure approximately half of the power incident on each detector element. We describe these approaches further below when considering detailed implementations.

Implementation Examples

Transmission Mask Based Reference Structures

Figure 23B:
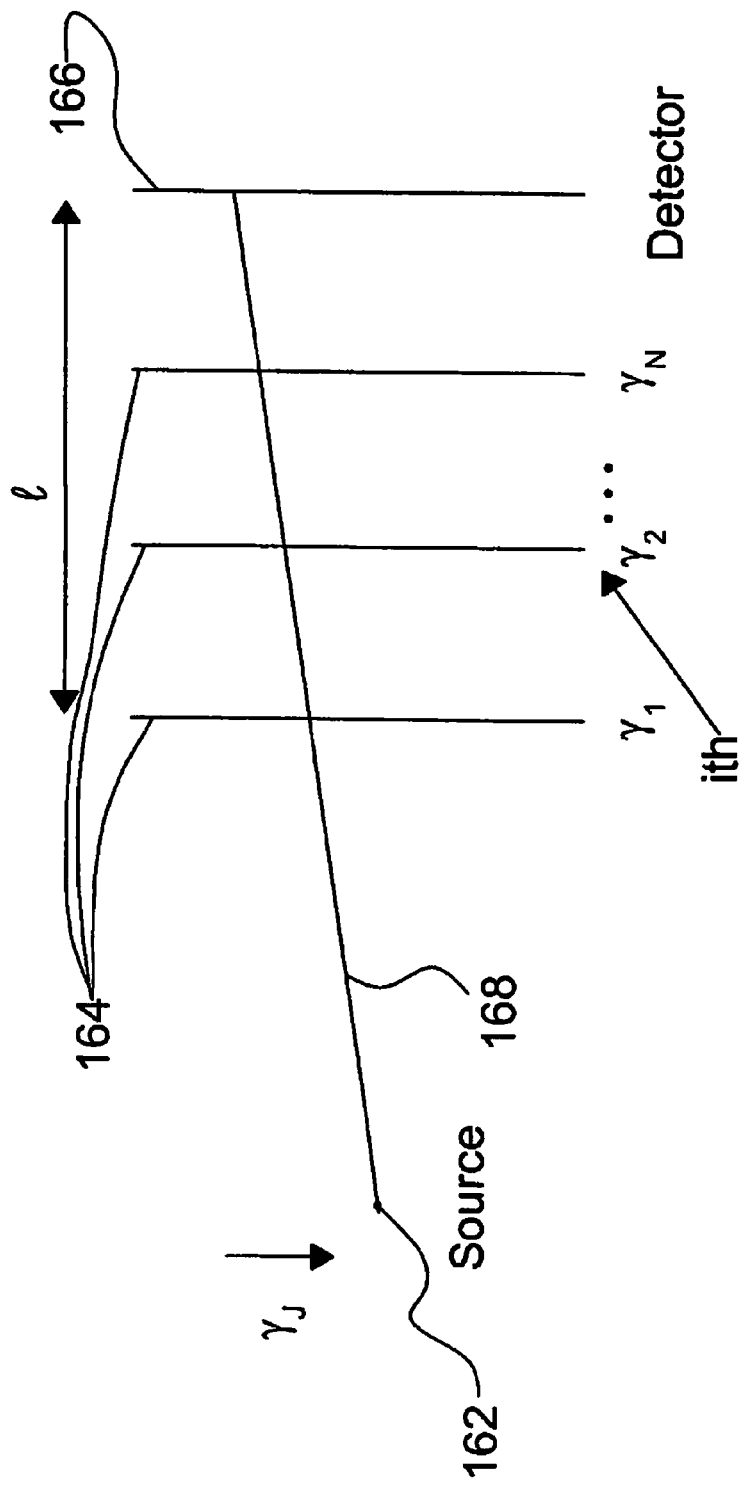

For such stacked reference structures, a point source, as viewed through the masks, can be analyzed as follows. The transmittance of the $i^{th}$ mask is $t_i(x)$, as shown in the schematic representation of FIG. 23b, where the source 162 projects a signal ray 168 through a series of masks 164 to a detector 166. For the $i^{th}$ mask, the signal 168 received on the detector 166 as a function of position along the detector 166 surface is $$m(x) = \prod_i t_i\left(x - l_i \frac{(x_s - x)}{(R - l_i)}\right) \quad (24)$$

where R is the range to the source. As an example, let $t_i(x) = 1 + \cos(Kx)$ and $l_i = i\Delta$. Then $$m(x) = \prod_i \left(1 + \cos\left(Kx\left(1 + \frac{i\Delta}{R}\right) - K\frac{i\Delta x_s}{R}\right)\right) \quad (25)$$

Figure 24:
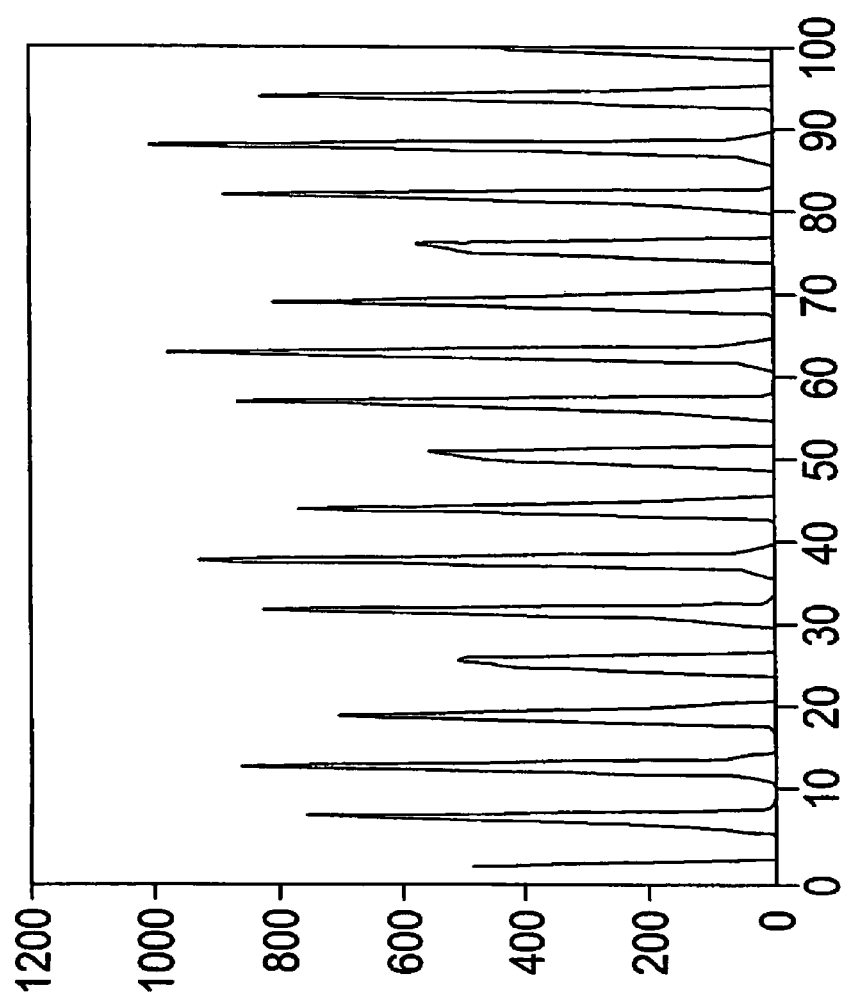
FIGS. 24-29 are transmission graphs of the reference structure of FIG. 23.
Figure 25:
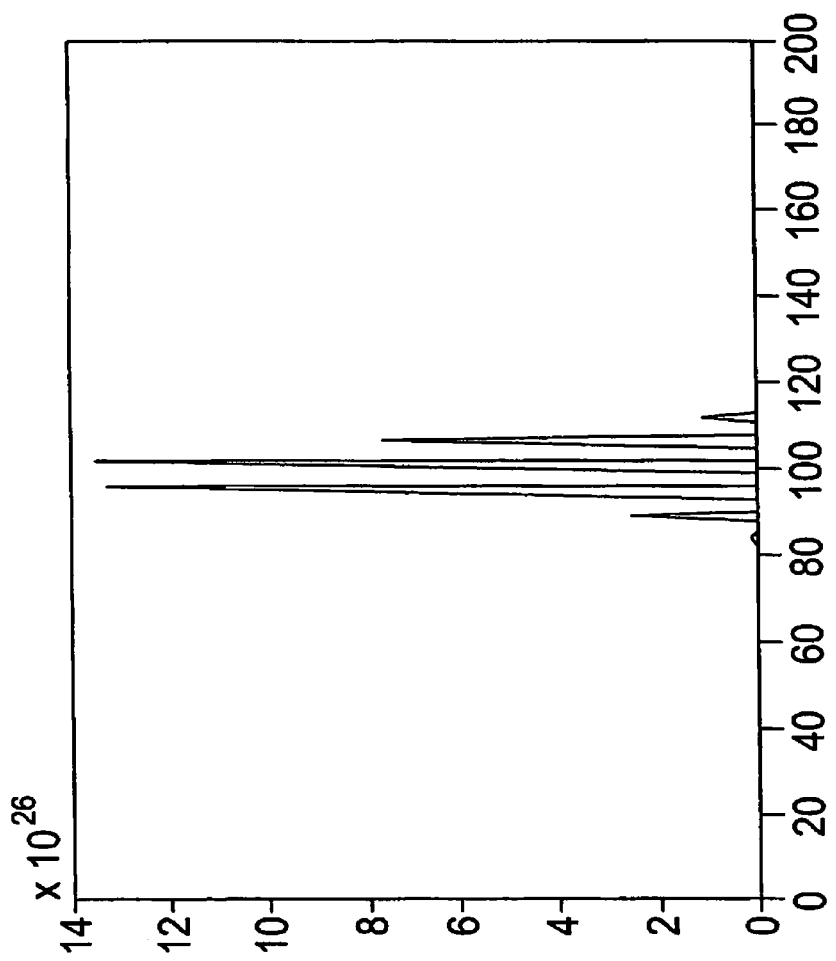
Figure 26:
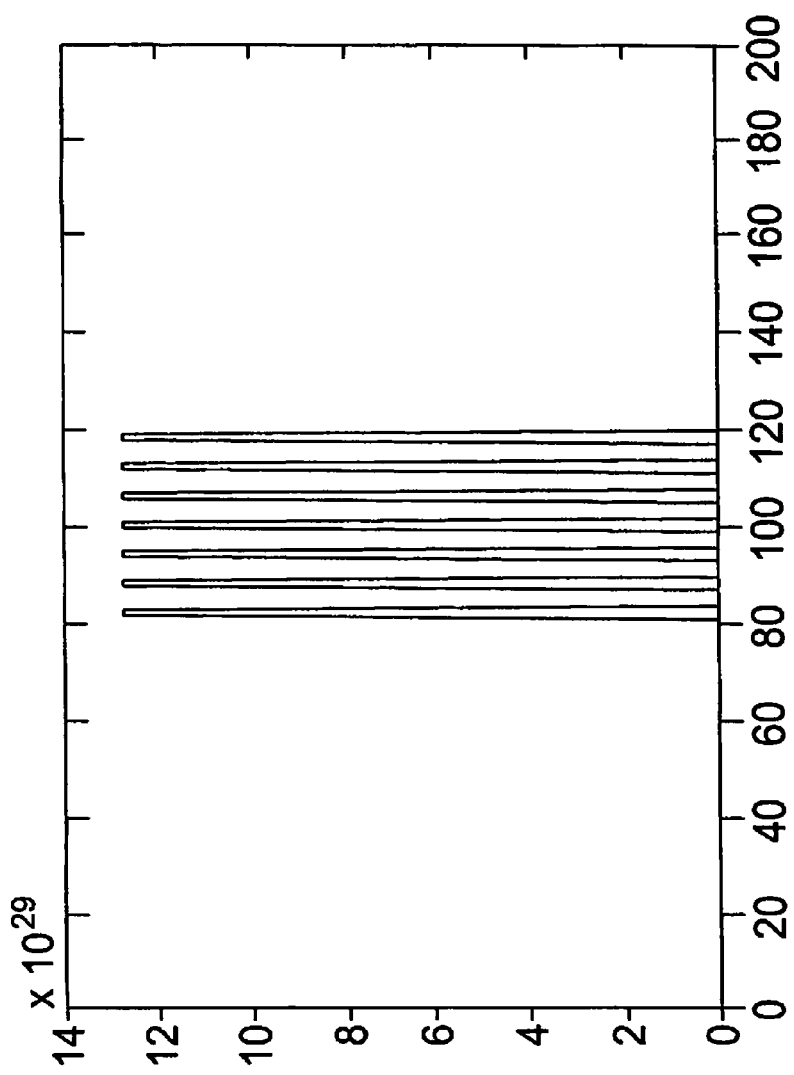
Figure 27:
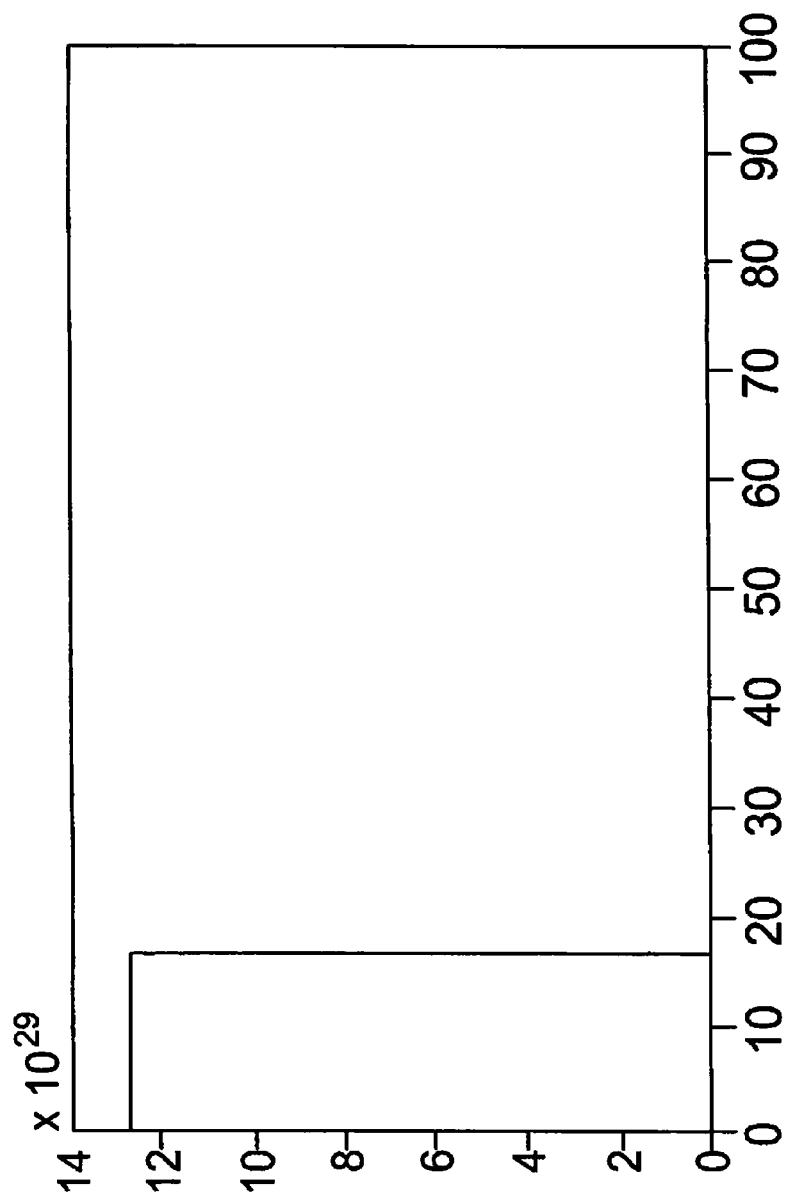
Figure 28:
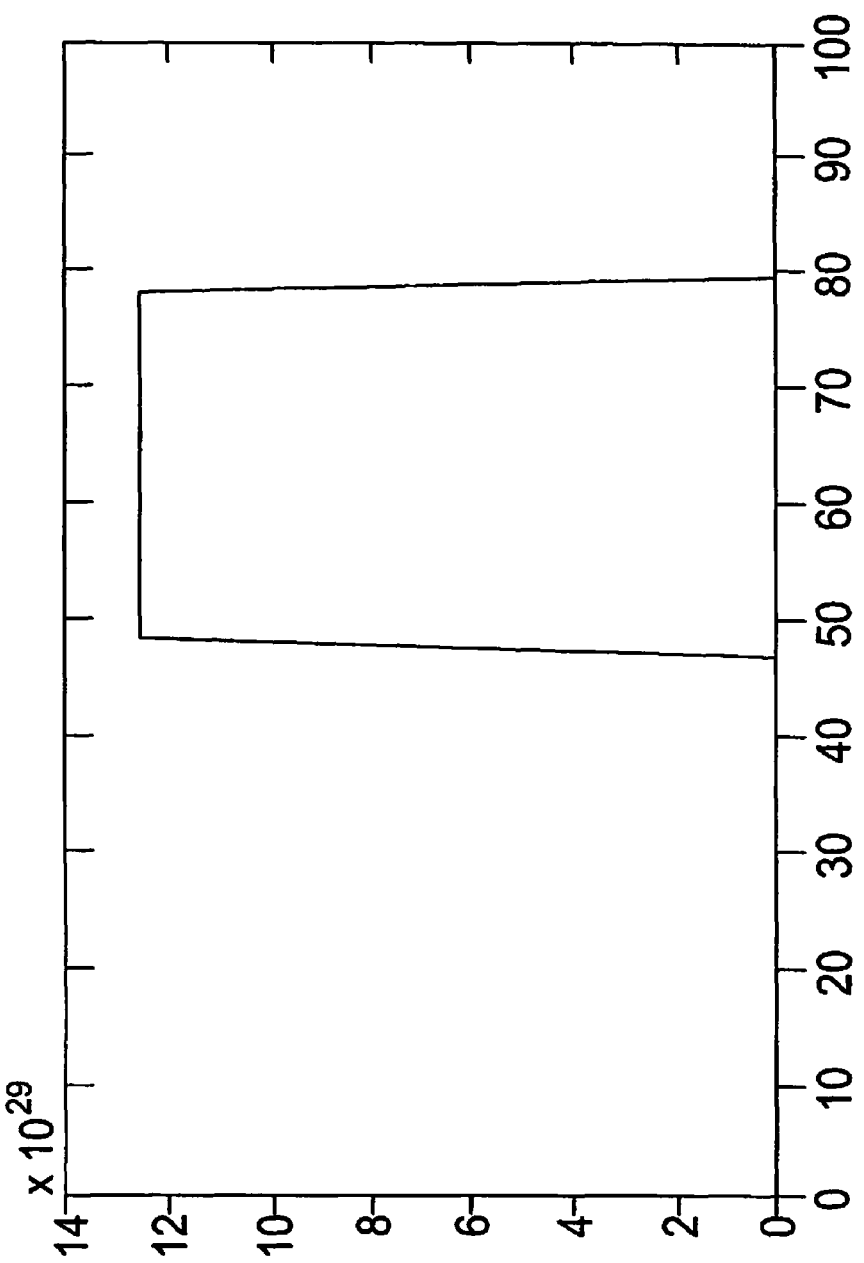
Figure 29:
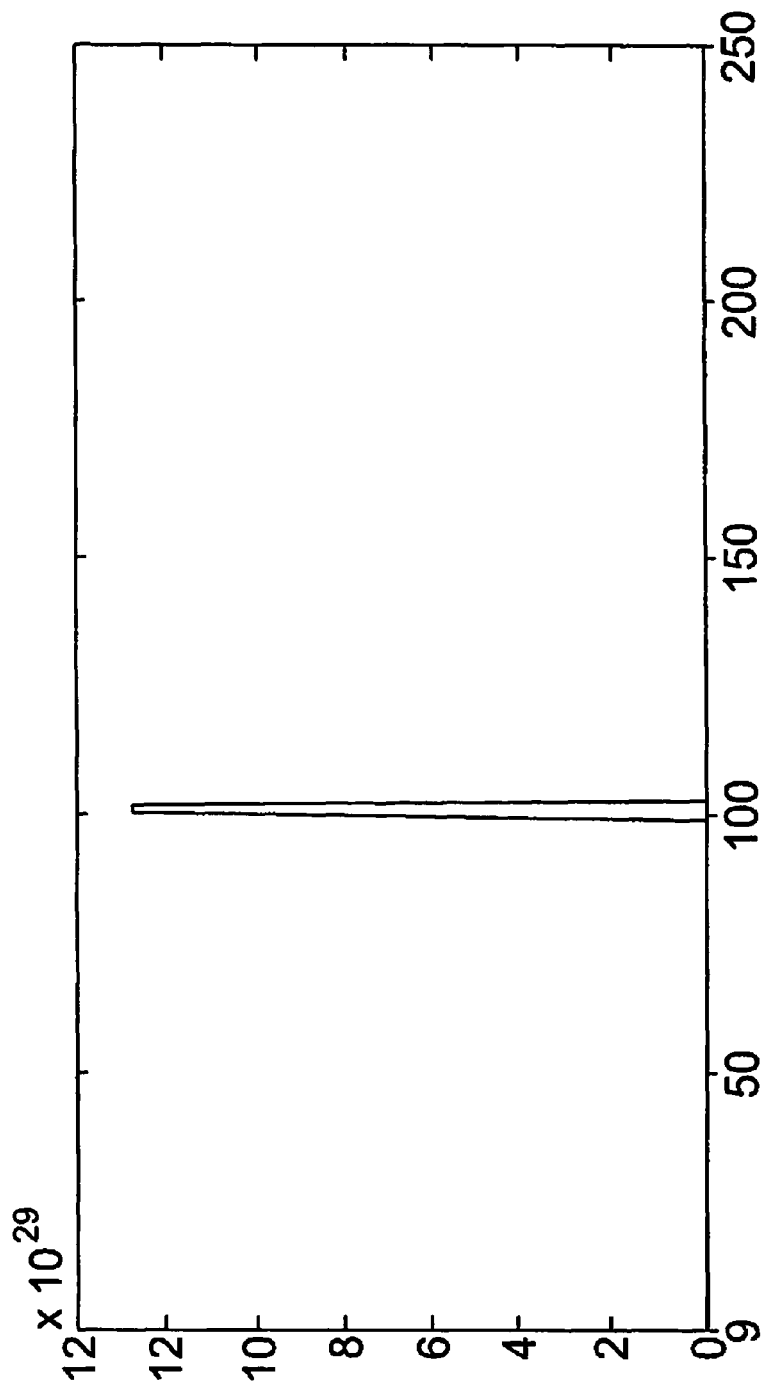

FIG. 24 is a graph that illustrates the transmission of the $i^{th}$ mask for Kxs=100, R=1000 delta with 10 masks m(x) for Kx=1:100. FIG. 25 is a transmission graph of the same system with the number of masks increased from 10 to 100. FIG. 26 is a transmission graph utilizing the same parameters used to generate the graph of FIG. 25, but where the cosine function has been replaced with a rectilinear function. FIG. 27 is a transmission graph of an RST system with x fixed at 0 and a function of $x_s$ for a fixed x. FIG. 28 is a transmission graph of an system with x fixed at 0, and with $Kx_s=1:100$, R=1000 delta and 10 masks m(x) for Kx=0. FIG. 29 is a transmission graph of an RST system, with Kxs=−100:100, R=100 delta and 10 masks m(x) for Kx=0.

Plane Wave Model for a Layered Mask Reference Structure

Figure 30:
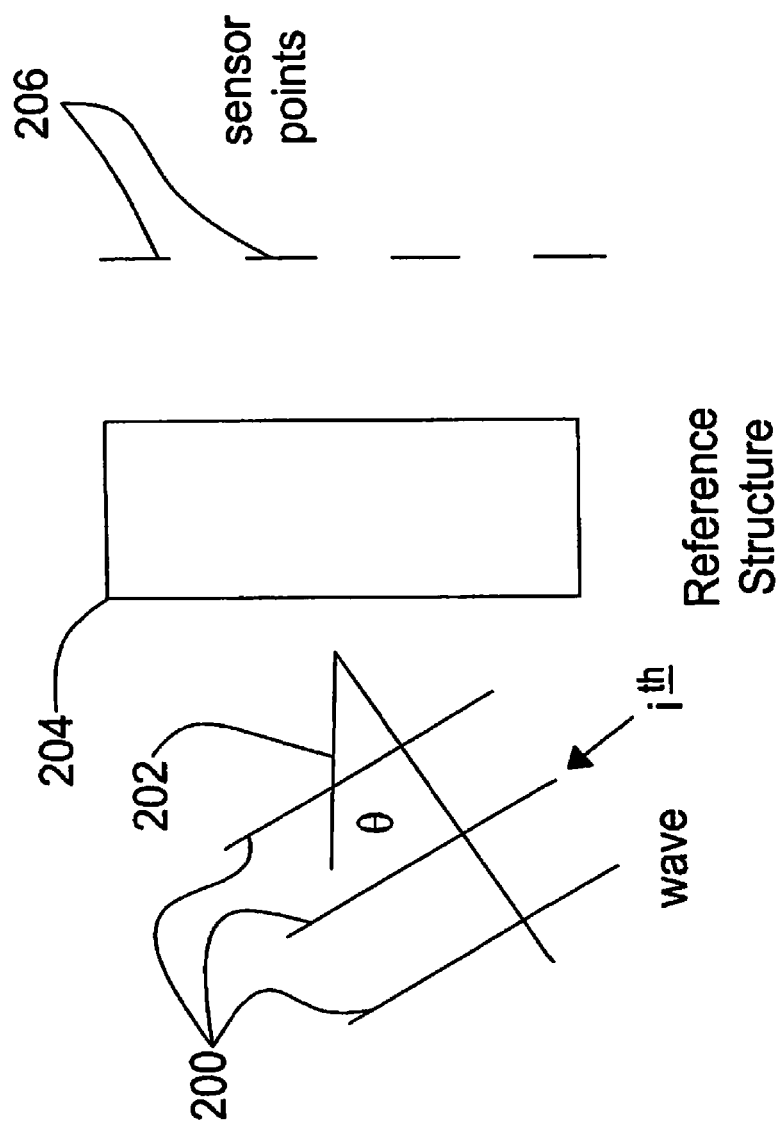
FIG. 30 is a schematic diagram of a plane wave motion sensor, in accordance with the present invention.

FIG. 30 is a schematic diagram of a plane wave motion sensor model, including a motion sensor as a mapping from plane waves onto measurements. In FIG. 30, a plane wave incidence signal 200 is received by a reference structure 204 at an angle of θ to the normal 202 to the surface of the reference structure 204. Sensor points 206 are disposed behind the reference structure 204 and configured to receive any signal from the reference structure 204. In this configuration, it is preferred that the reference structure 204 consists of N layers of transmittance masks and that the incident signal 200 is f(θ). The incidence signal 200 detected on the $i^{th}$ sensor element is $$m_i = \prod_{n=1}^{N} \int\int_{pixel\_i} f(\theta) t_n(x - nl\sin\theta) d\theta dx \quad (26)$$

where $0 \leq t_n(x) \leq 1$.
For the example, where $$t_n(x) = \sum_m \alpha_m rect\left(\frac{x - m\Delta}{\Delta}\right)$$

where $\alpha_m \ni \{0,1\}$, then $$m_i = \prod_{n=1}^{N} \int\int_{pixel\_i} \sum_m f(\theta)\alpha_{nm} rect\left(\frac{x - m\Delta - nl\sin\theta}{\Delta}\right) d\theta dx \quad (27)$$

Figure 31:
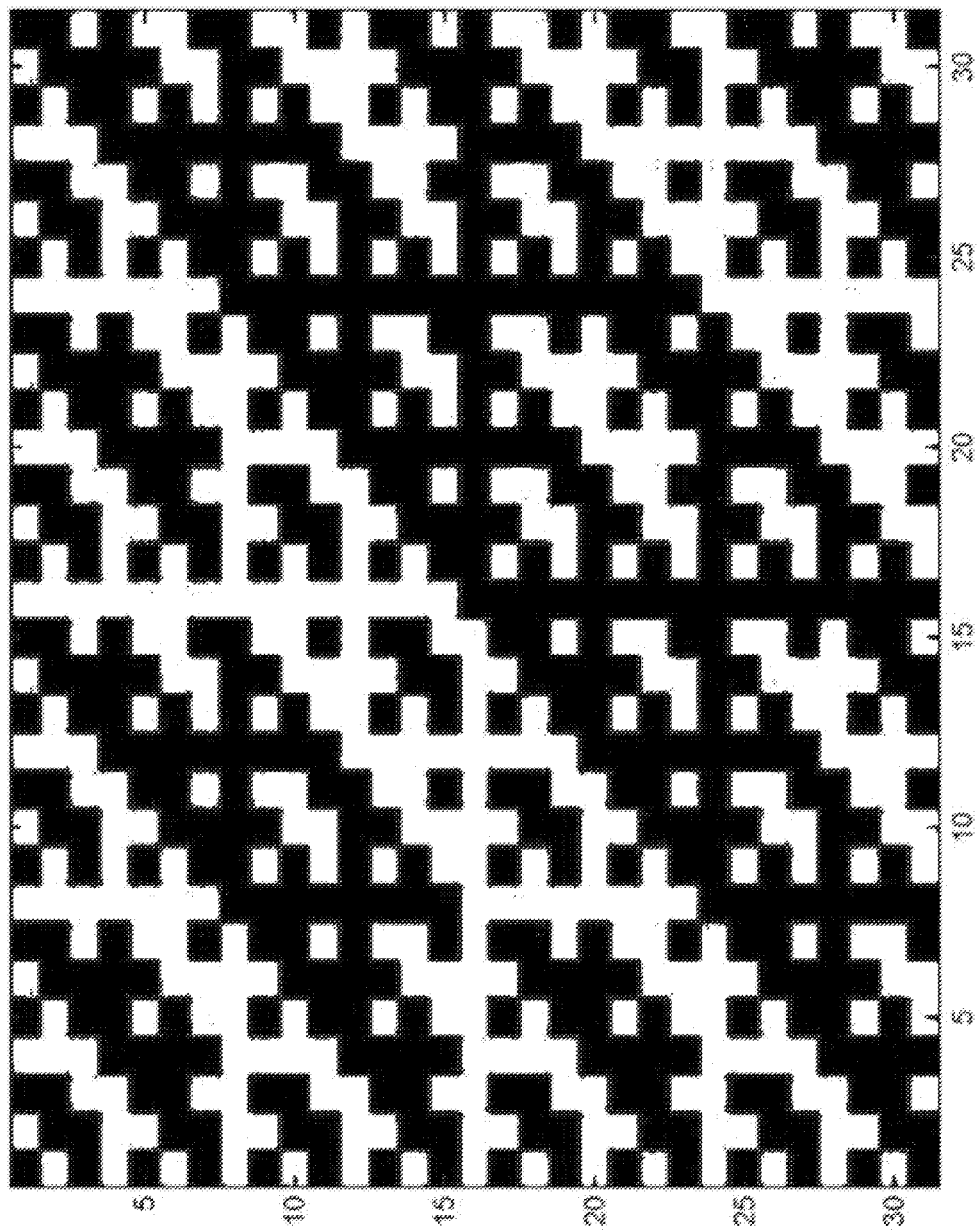
FIG. 31 illustrates a connection matrix for the plane wave motion sensor of FIG. 30.

For picking the transmittance functions, it is assumed that it is possible to model the reference structure 204 based on a reduced Hadamard S matrix (eliminating the dc row and column). Then, 31 angles build the connection matrix shown in FIG. 31.

Figure 32:
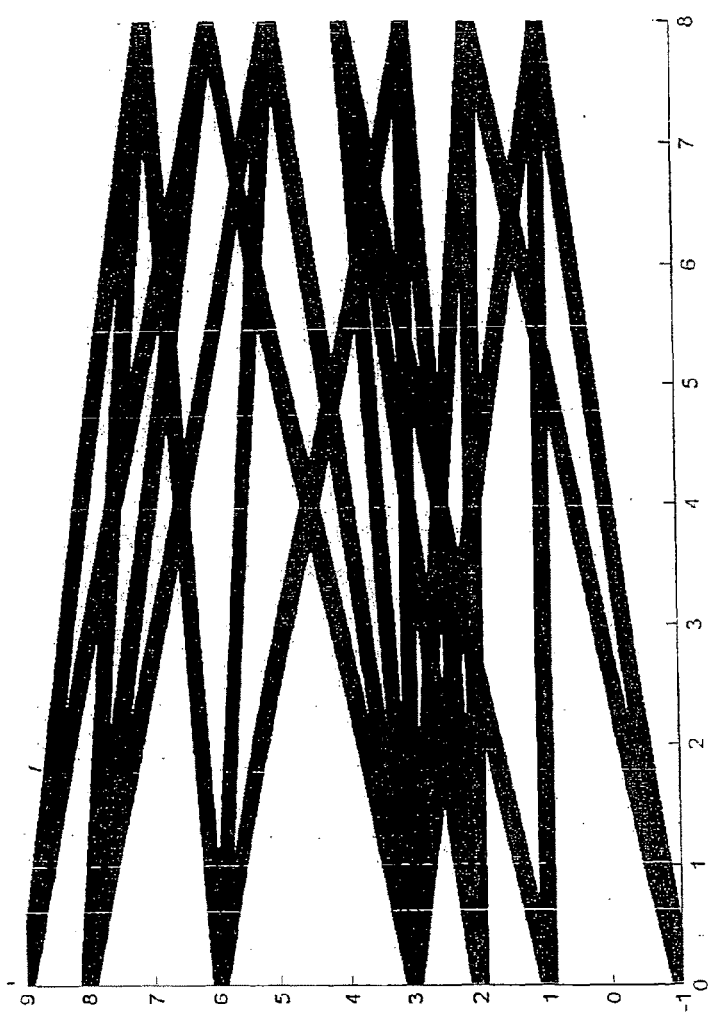
FIGS. 32-33 are graphs that show the 3-dimensional output of the connection matrix of FIG. 31, in accordance with one embodiment of the present invention.
Figure 33:
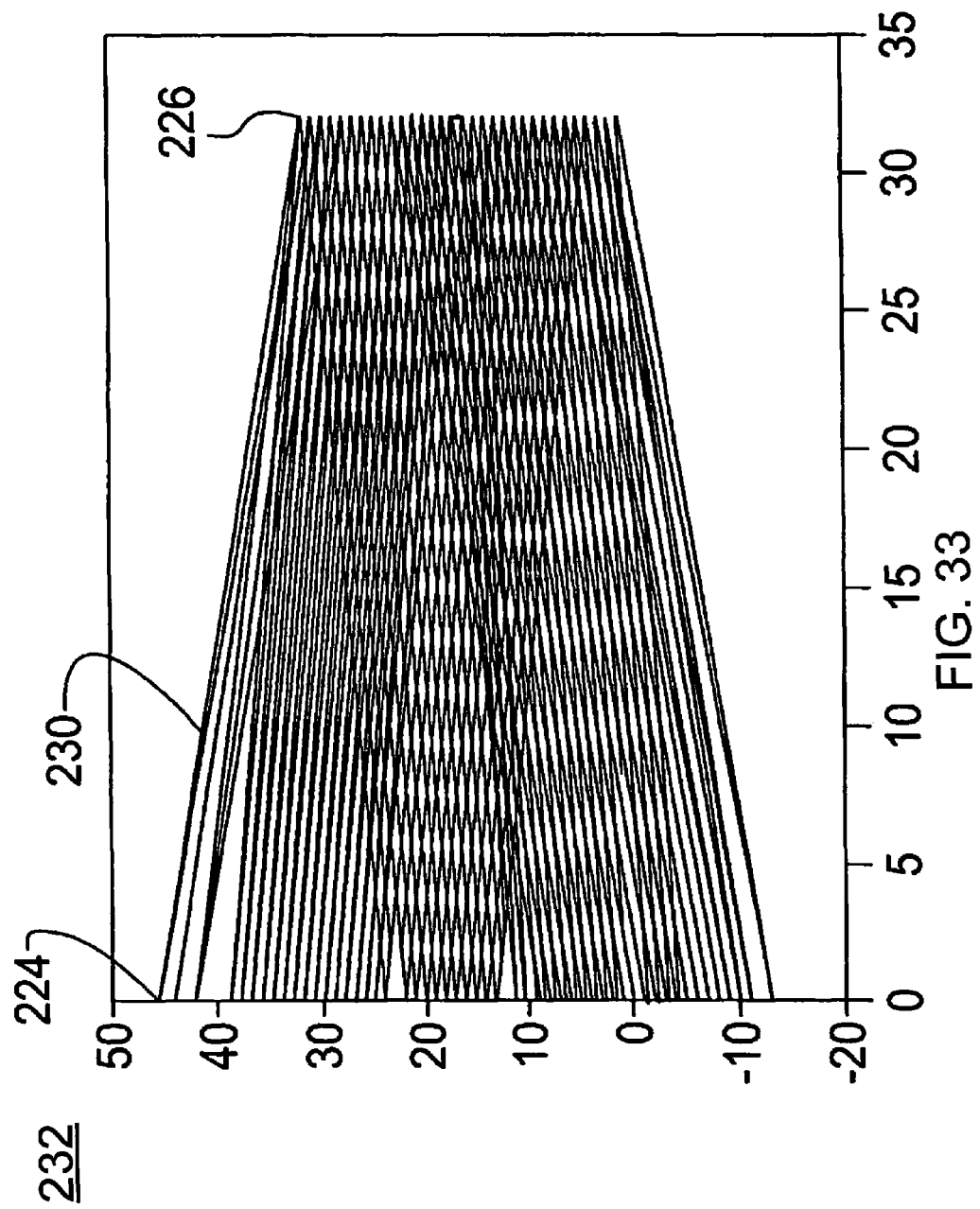

As an example of an embodiment of a reference structure for plane wave detection designed to detect a source consisting of 8 angularly resolved picture elements on a side (64 total), consider a sensor plane which consists of an 8 by 8 grid of pixels. Since any measurement pixel could measure any incident ray, the first screen of the layered reference structure must be of size 16 by 16. FIGS. 32 and 33 are graphs that show the 3D output of such a configuration by sampling longitudinally with masks.

Figure 34:
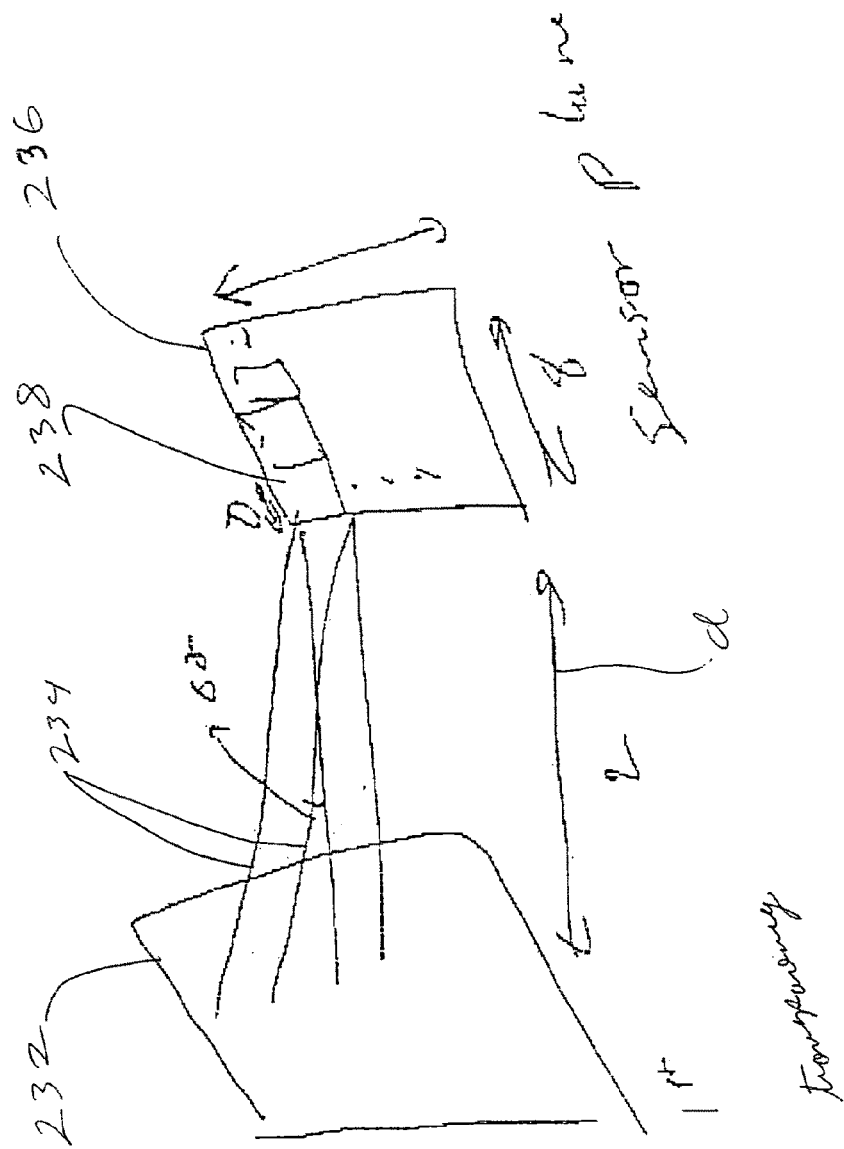
FIG. 34 is a schematic diagram of mask and sensor geometry, in accordance with one embodiment of the present invention.

FIG. 34 is a schematic diagram of mask and sensor geometry and shows a transparency 232 and a sensor assembly 236, where the sensor assembly 236 includes and 8×8 array of sensors 238 of D×D dimensions. Ray projections 234 are received by sensors 238 from the transparency 232. As illustrated in FIG. 34, the distance from the sensor 236 plane to the entrance aperture of the transparency 232 must be sufficient to separate rays 234 onto adjacent channels or sensors 238, i.e. L>Δ/Δθ.

In this example, the dimensions D of each sensor 238 correspond to pixel spacing of 1 mm. If 1 cm resolution at a range d of 1 meter is desired, then Δθ=0.01. If an 8×8 grid with the center pixel removed is preferred, the reference structure with transparency 232 will correspond to a 16 mm square input aperture and a reference structure thickness of 10 cm. FIG. 35 is a grid showing how the measurement pixels are numbered in the sensor assembly 236 of FIG. 34. The grid position as a function of pixel number for an n×n array can be determined, for example, with the computer program listed in Appendix A.

Figure 36A:
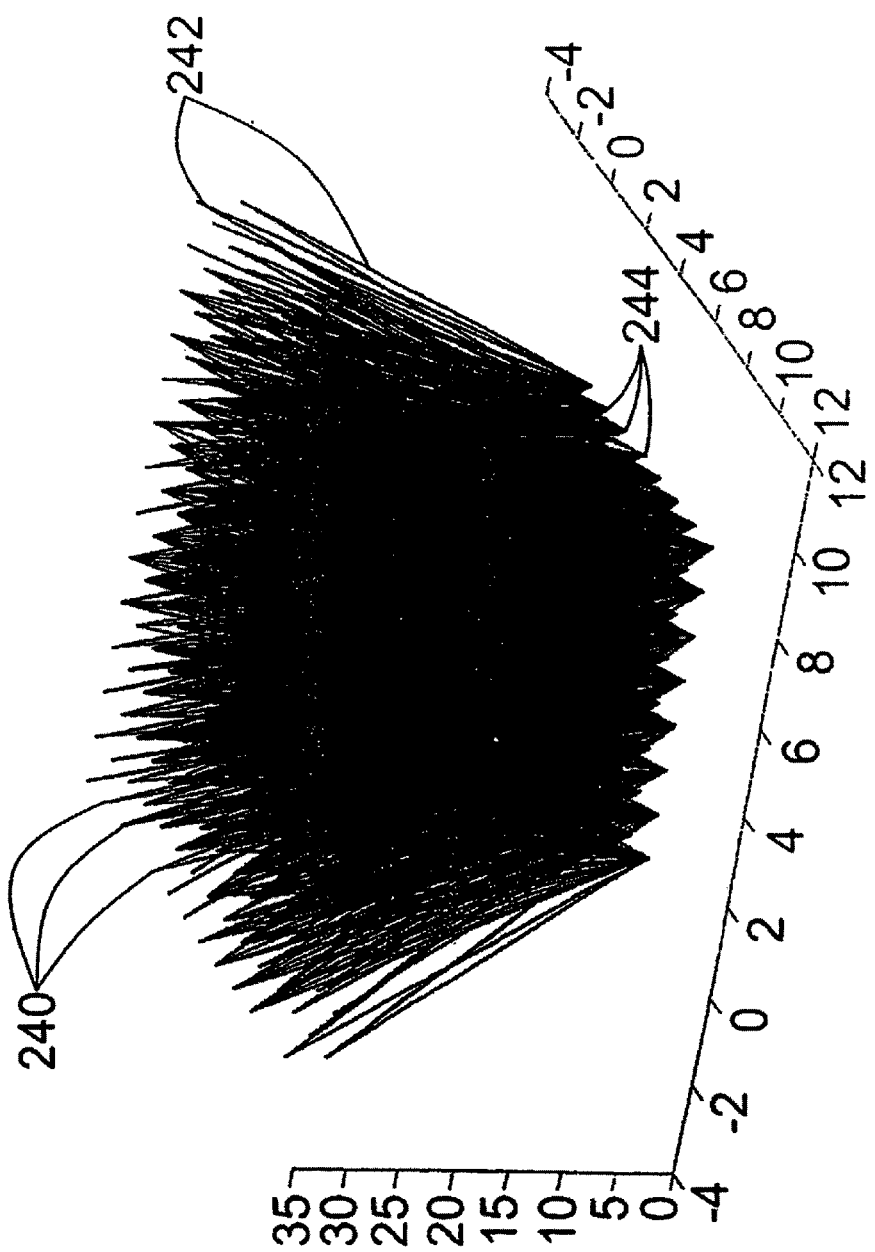
Figure 36B:
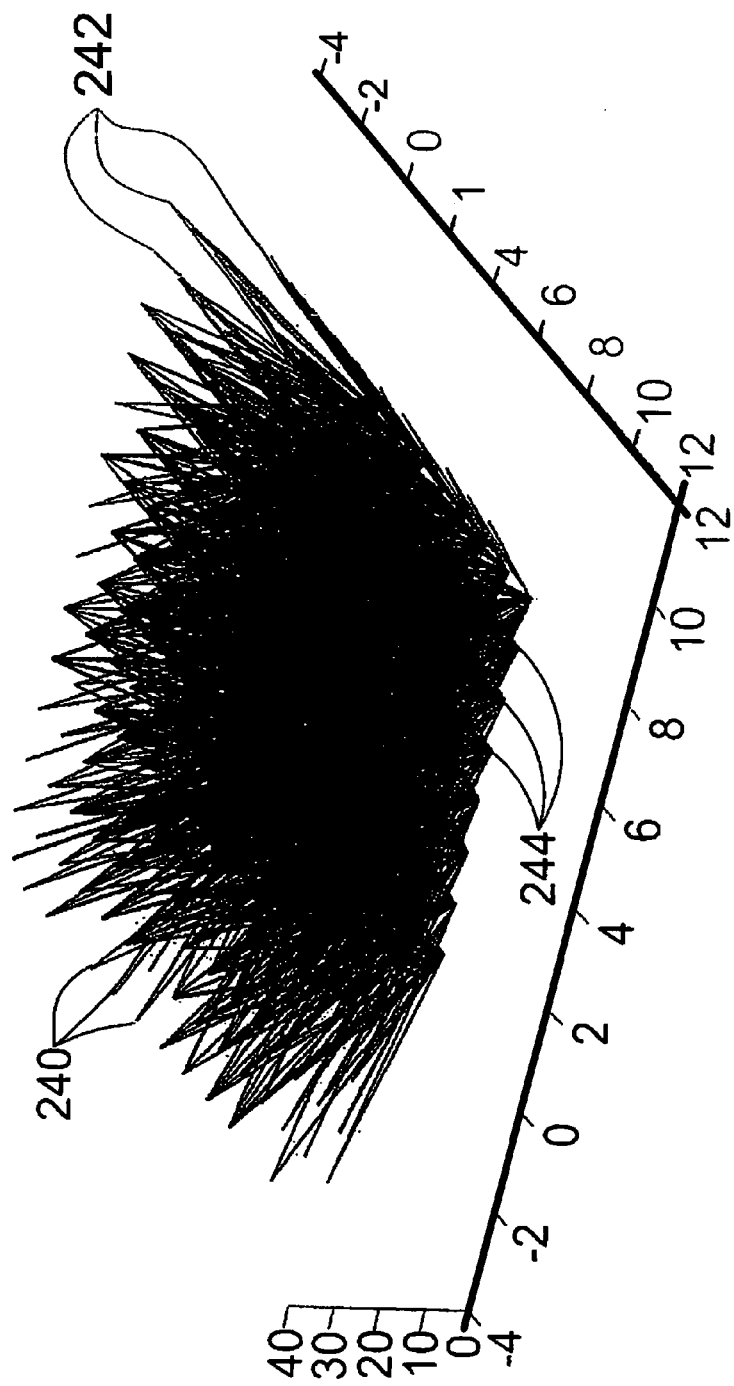

Connectivity can be assigned using the algorithm listed in Appendix A. Different views of the connectivity pattern of the reference structure for the reduced Hadamard connectivity are illustrated in FIGS. 36a-36c at various angles of view where each connectivity pathway 242, runs between a reference structure entrance 240 and a reference structure exit 244.

Figure 37:
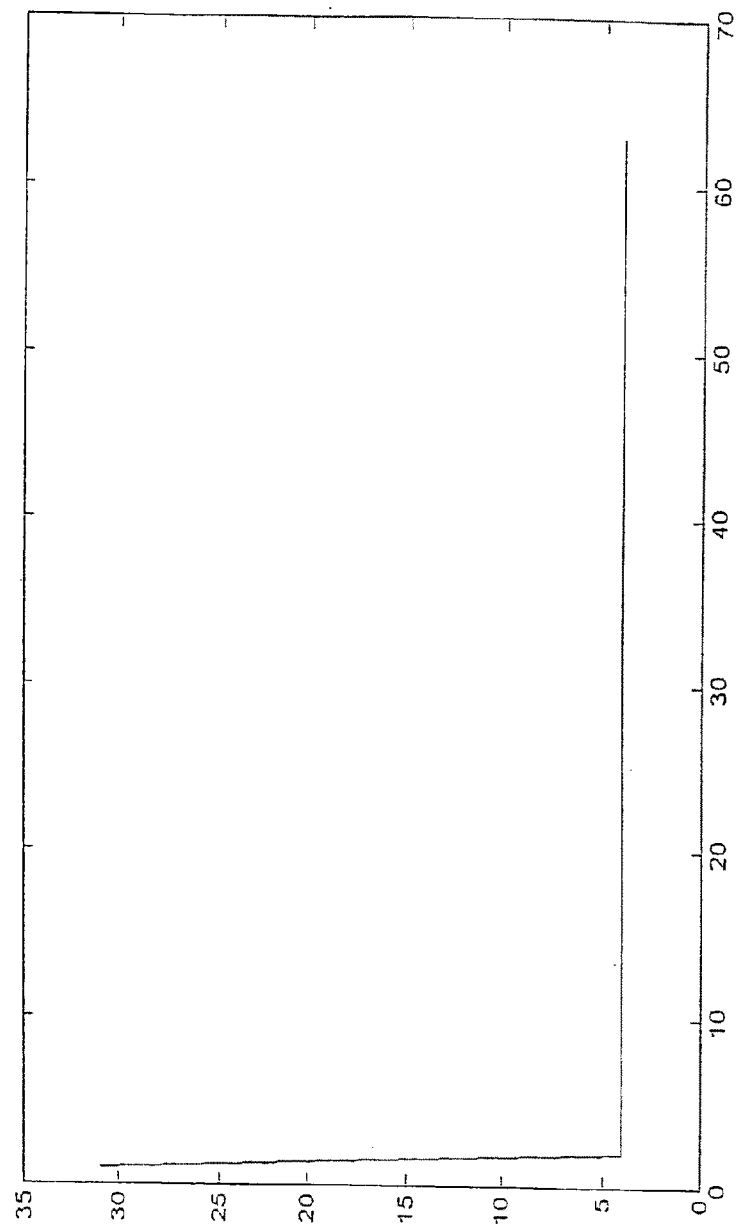
FIG. 37 is a graph of the singular value spectrum associated with the connectivity patterns of FIGS. 36a-36c.

FIG. 37 is a graph which shows the singular value spectrum associated with this interconnection pattern.

Figure 38:
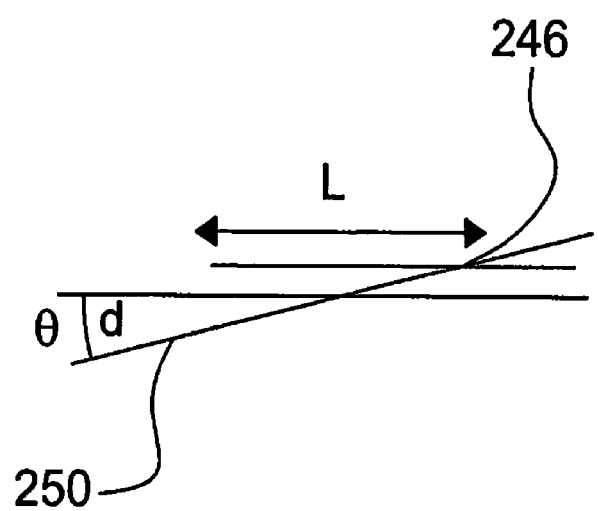
FIG. 38 illustrates a reference structure pipe with a length of 4.5 mm, in accordance with one embodiment of the present invention.

FIG. 38 is a schematic diagram of reference structure pipes 246 with a length of L, a width of d and an aperture angle θ. A ray 250 may travel through the pipe 246 off-axis up to an angle θ. For the example in FIG. 38 there are 100 micron pixels configured to detect over a θ=10 degree range, meaning that each ray covers 2.5 degrees.

Figure 39:
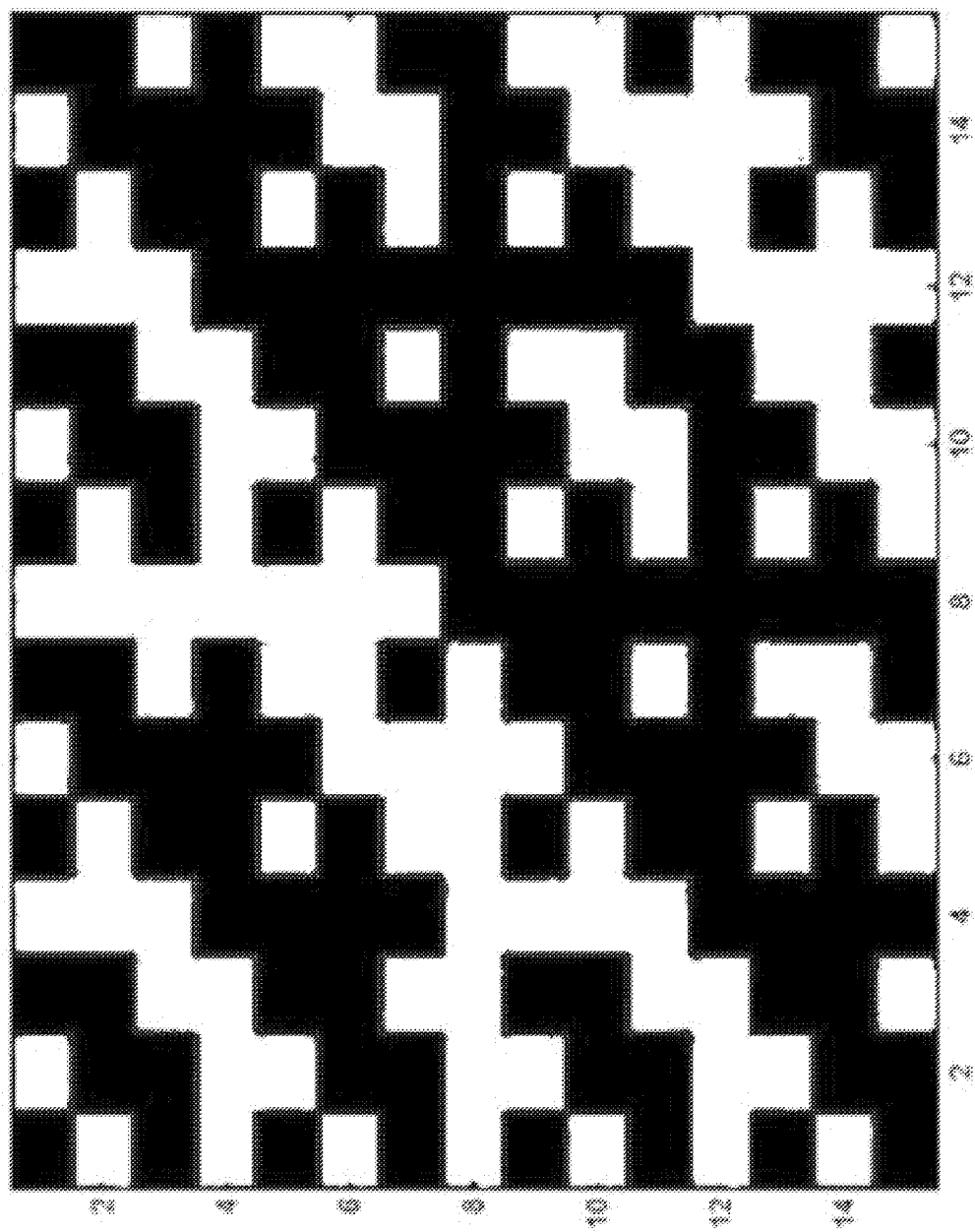
FIG. 39 illustrates a reduced S matrix for the configuration of FIG. 38.
Figure 41A:
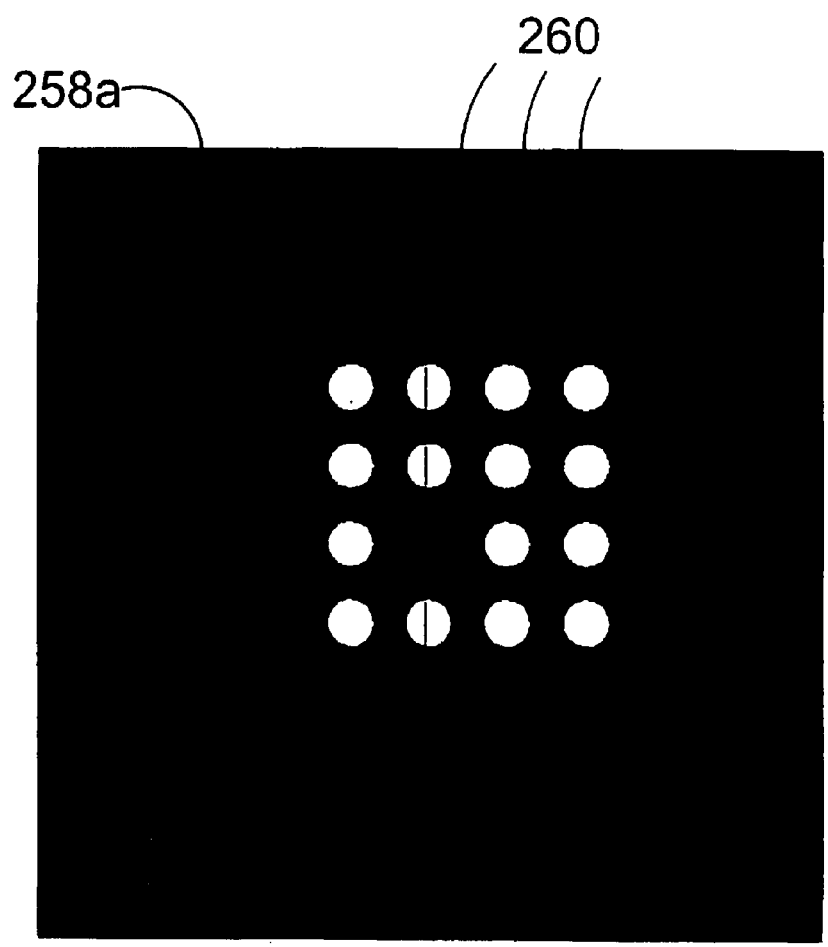
FIGS. 41a-41k are cross-sectional schematic views of a set of masks, in order from an input side to an output side, which may be stacked or layered to form a reference structure in accordance with an embodiment of the present invention.
Figure 41B:
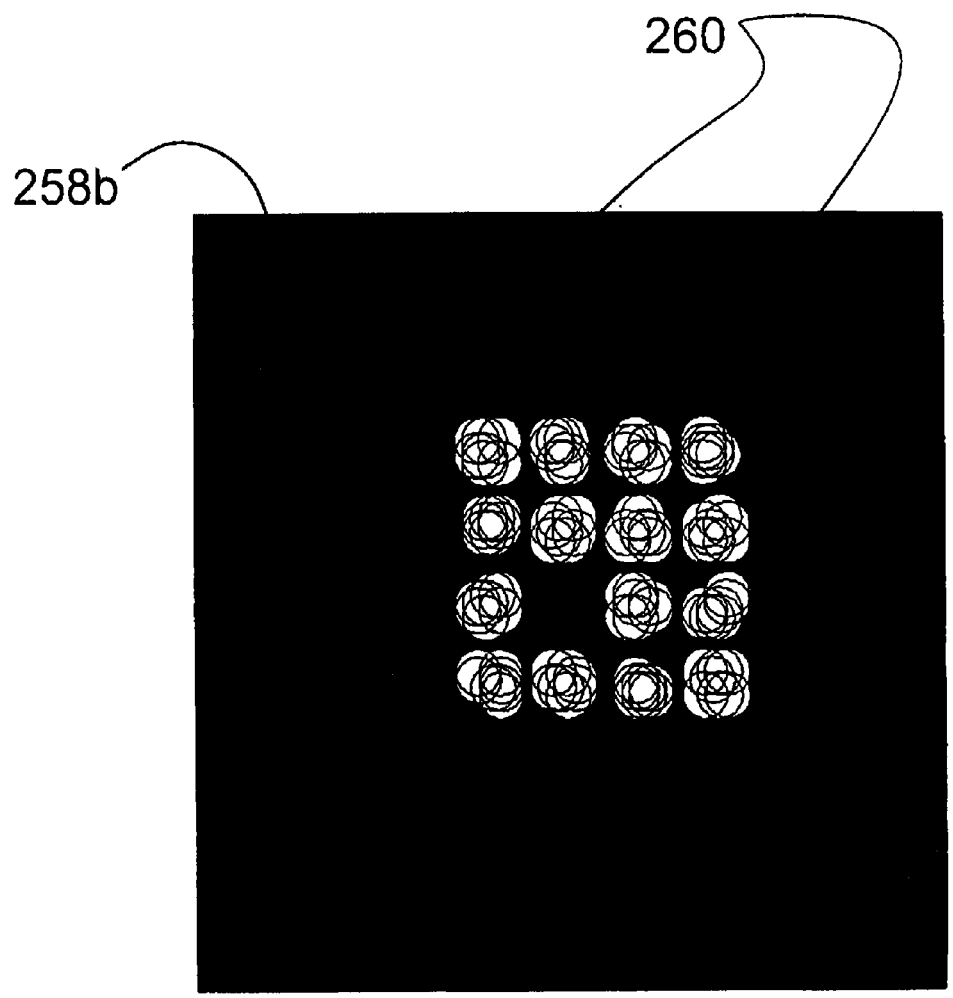
Figure 41C:
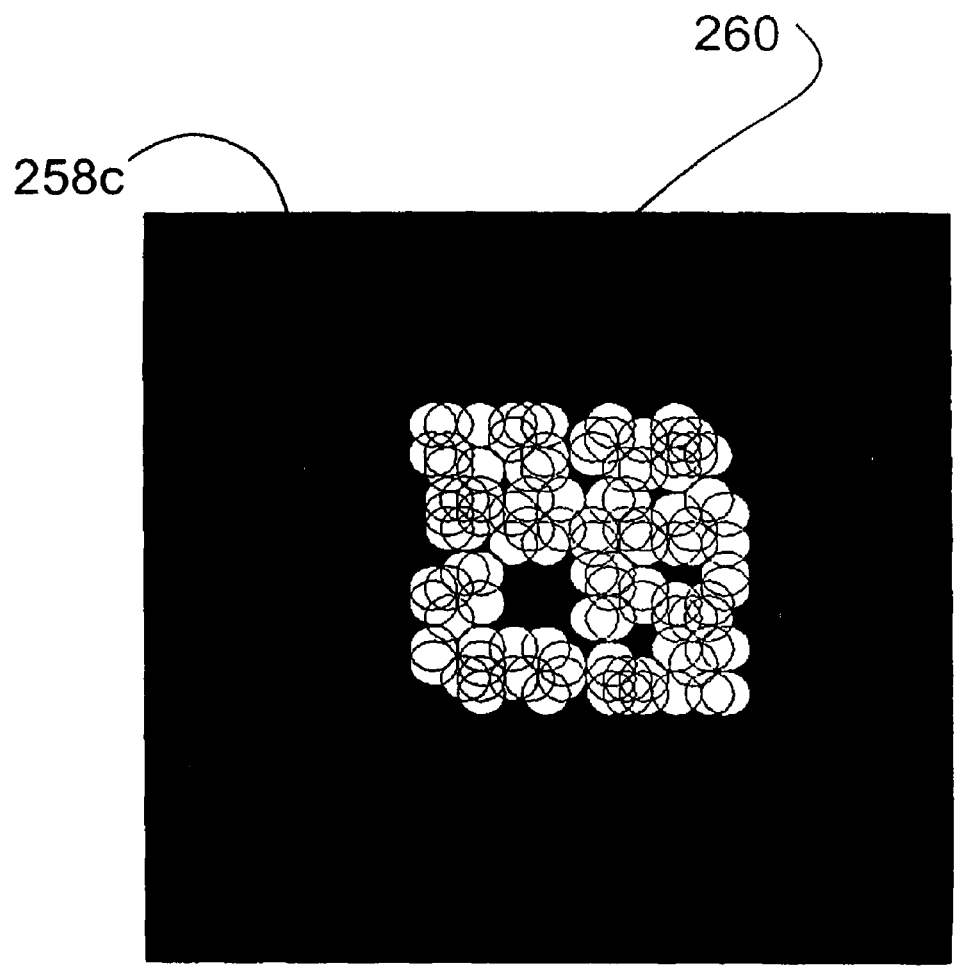
Figure 41D:
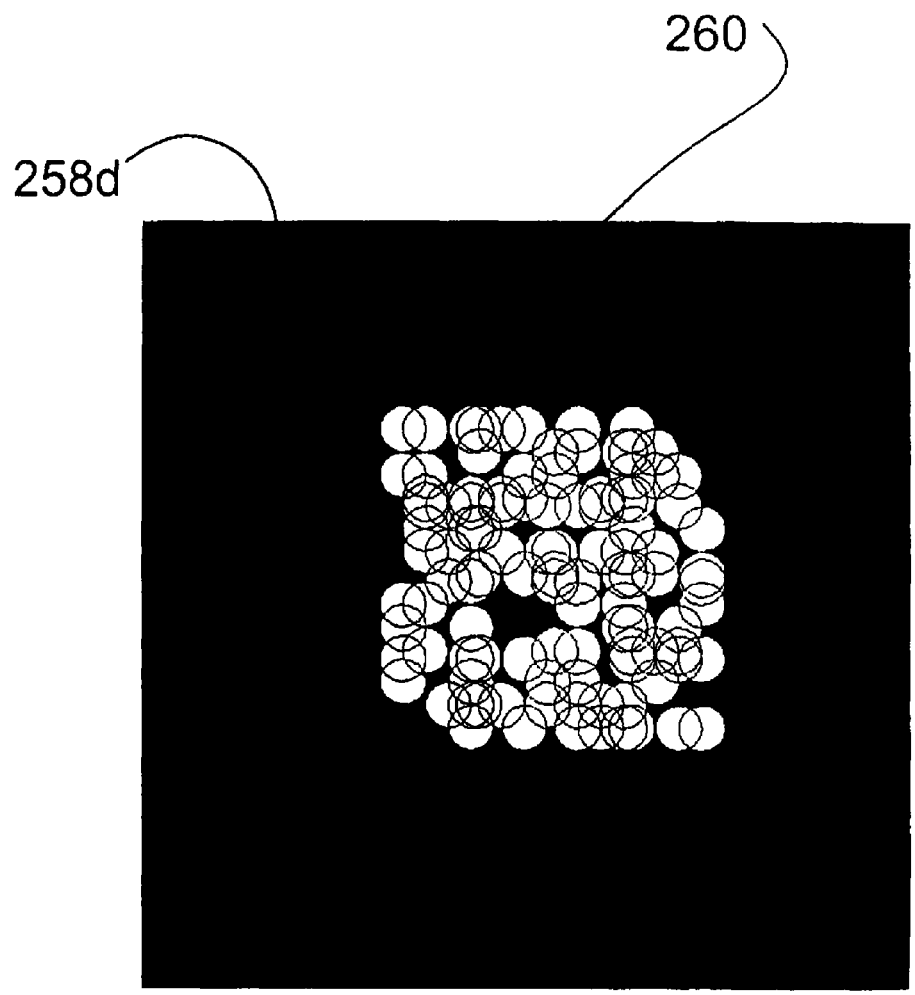
Figure 41E:
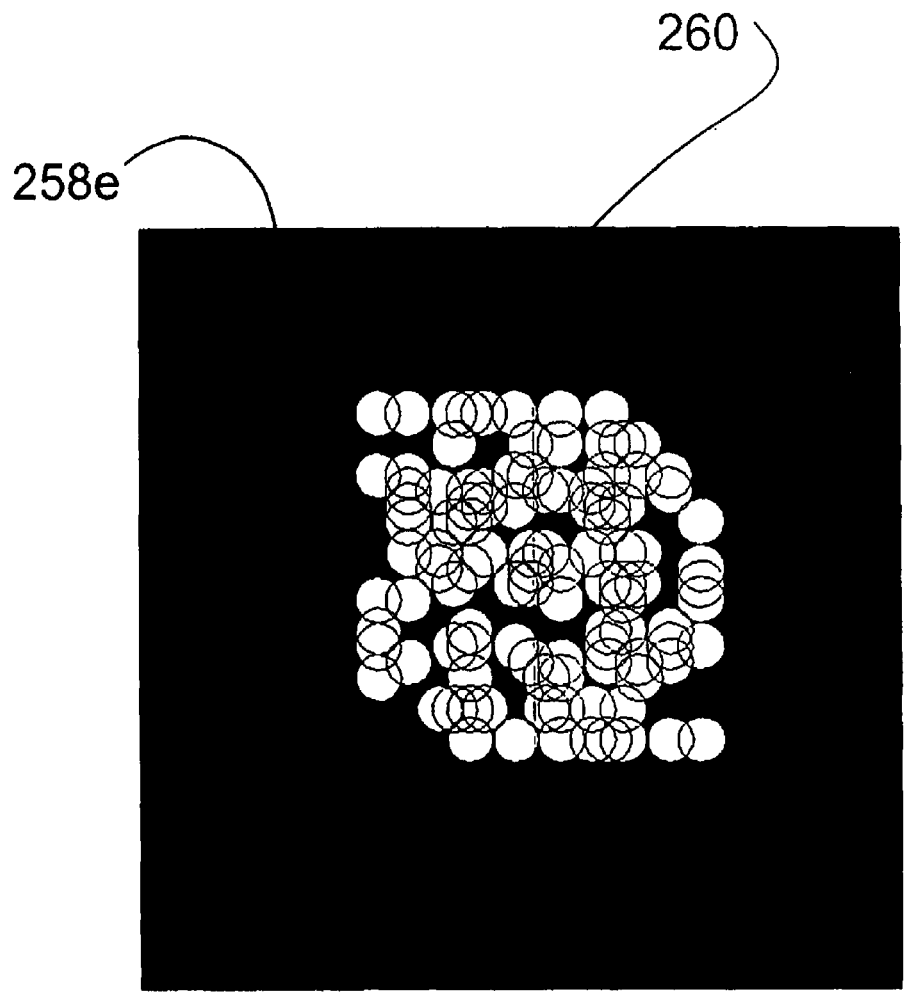
Figure 41F:
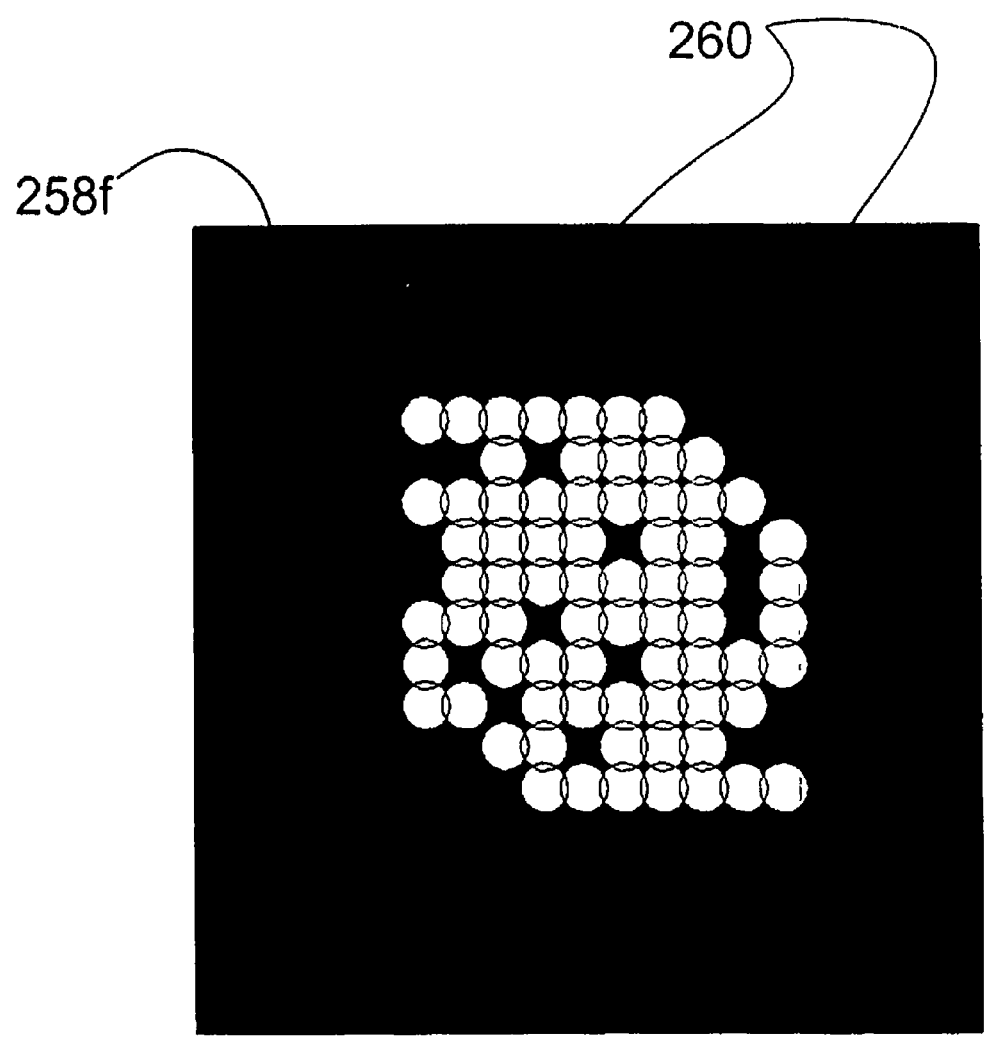
Figure 41G:
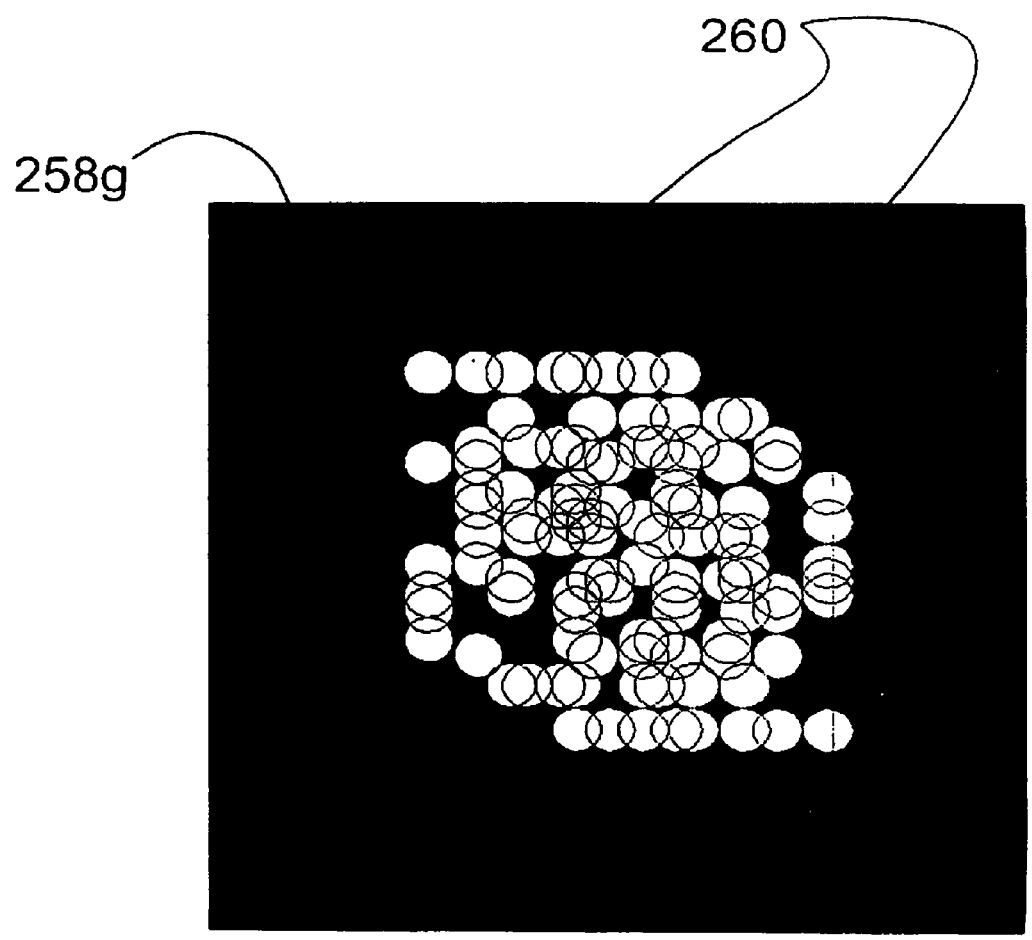
Figure 41H:
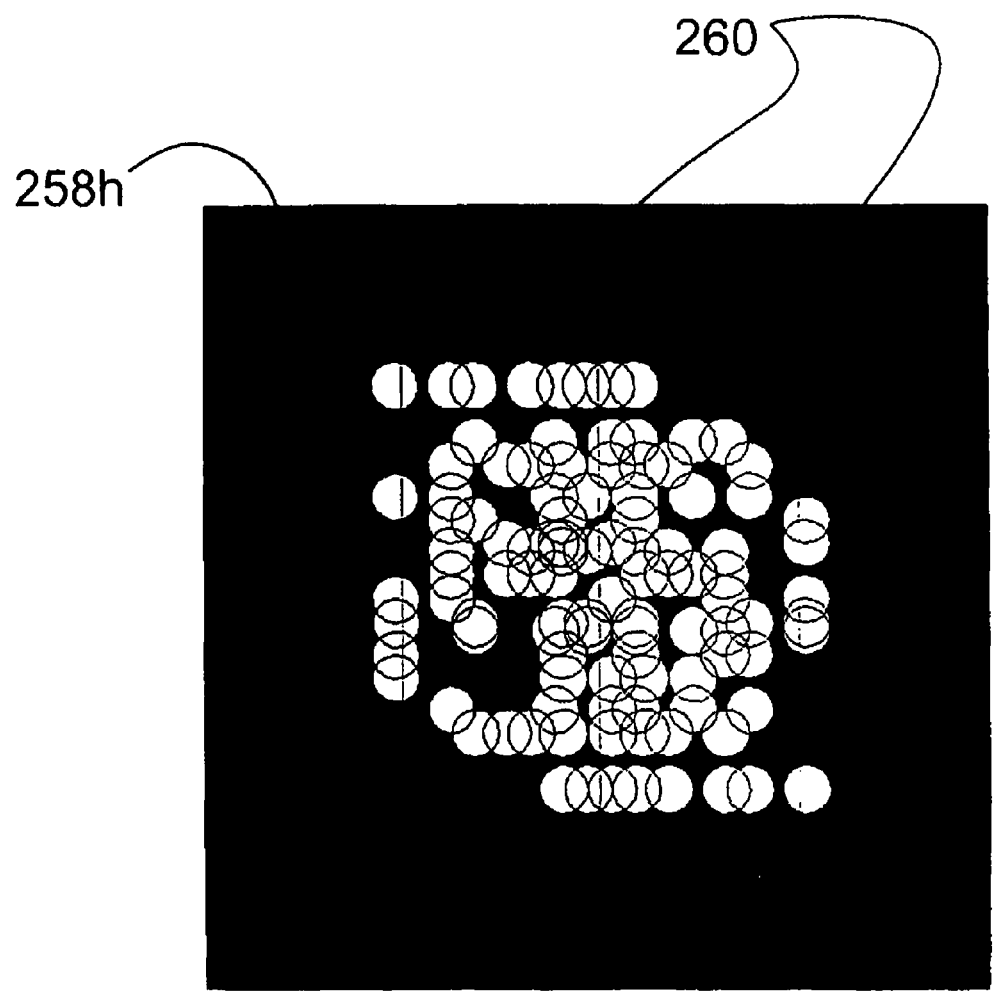
Figure 41I:
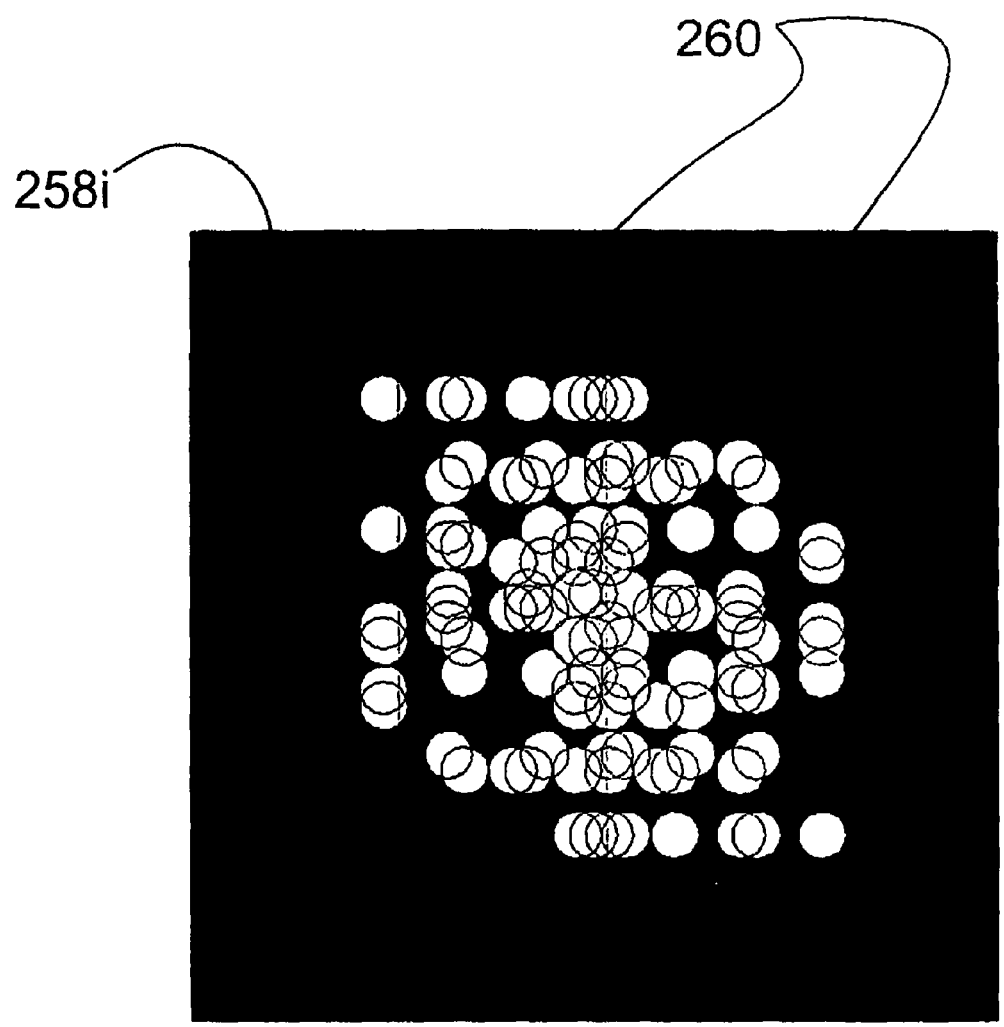
Figure 41J:
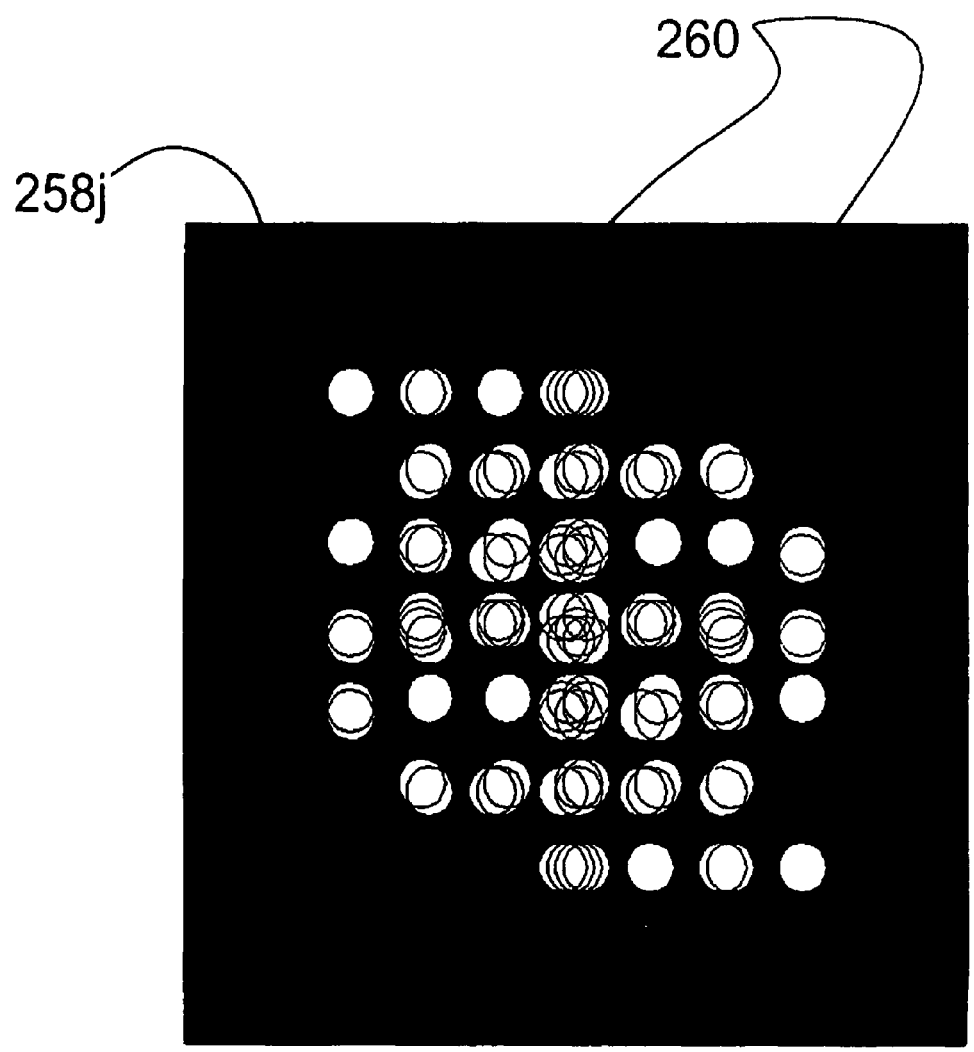
Figure 41K:
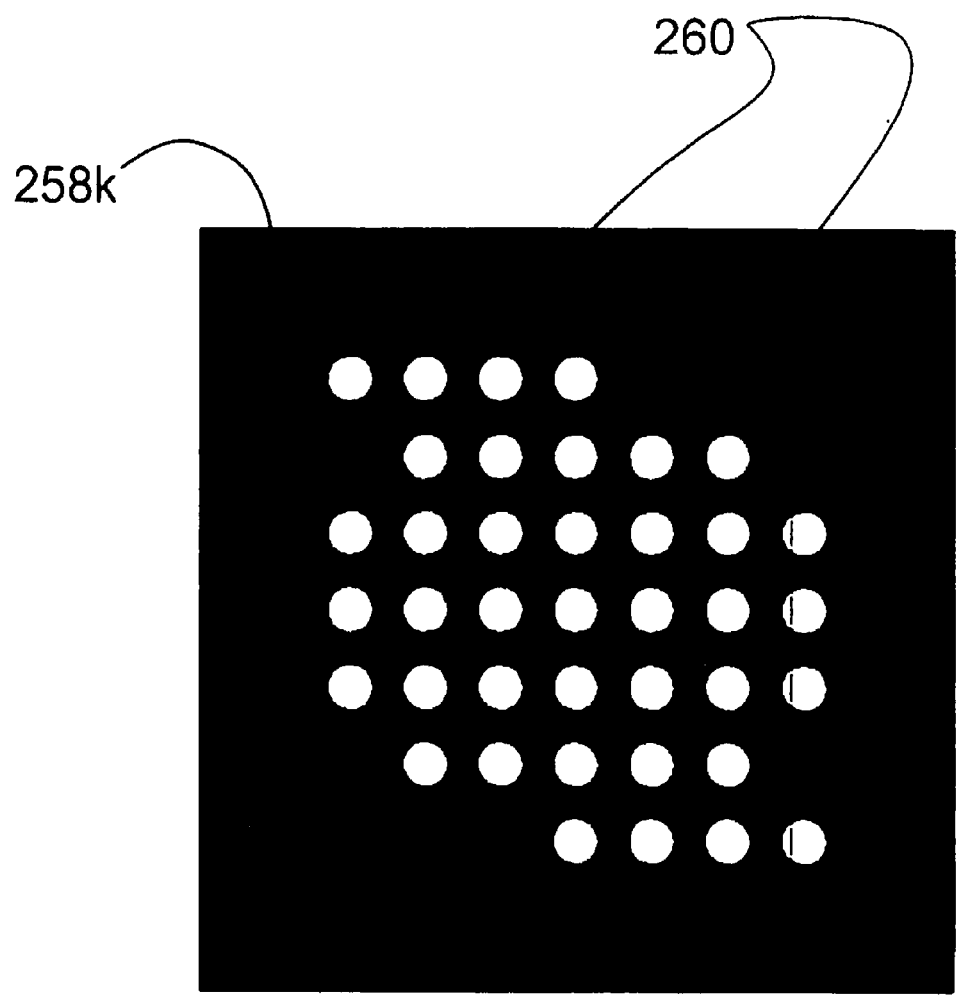

FIG. 39 is the reduced S matrix. FIG. 40 is the connectivity pattern for the configuration shown in FIG. 38. In FIG. 40, the connectivity paths 254 lie between the entrance 252 to the reference structure and the exit 256 to the reference structure. FIGS. 41a-41k are cross-sectional schematic views of a set of masks, in order from an input side to an output side where each mask 258a-258k has multiple apertures 260. Each mask 258a-258k may be stacked or layered to form the corresponding reference structure. As shown in FIGS. 41b-41i, the apertures 260 of masks 258b-258i may overlap other apertures 260.

Mask Thickness vs. Resolution

For a reference structure with a thickness L for each mask, and an opening of size S for each aperture in the mask, the angular resolution is $\Delta\theta = 2\delta/L$. The number of angular resolution elements along each transverse dimension is $N \leq A/\delta$, where A is the full transverse aperture. The transverse angular range observed is Ω. Using $N \leq \Omega/\Delta\theta$, $L \geq 2A/\Omega$ is obtained for the thickness of the reference structure for a given aperture size and angular range.

FIG. 42 is a schematic of a system for imaging a 4×1 LED array using a reference structure. In FIG. 42, the reference structure 263 consisting of a solid opaque block with transparent paths or pipes 264 therethrough. The transparent pipes 264 run from the input aperture 262 of the reference structure 263 to the exit aperture 266. Such a reference structure 263 can be made by fabrication techniques including selective laser sintering, stereolitograph and holography. In the example of FIG. 42, the reference structure 263 is designed to accept plane waves at the reference structure input aperture 262 at 4 angles of approximately −10°, −5°, 5°, 10°. The reference structure 263 consists of 10 of the transparent pipes 264 of 1 mm diameter, each oriented at the aforementioned angles at the input 267 of the reference structure 263. Each of these pipes 264 goes to one of the four sensors in a sensor array space close to the reference structure 263. Each sensor may receive a combination of these pipes 264 as shown in FIG. 42.

Referring to FIG. 43, a schematic of an experiment is shown, where a sensor array 272 receives light from LEDs 267 of an LED array 268 through a reference structure 270. The LED array 268 was used as the source to characterize the matrix representing the reference structure 270. The LED array 268 consisted of 4 LEDs 267 spaced 5 cm apart, and was placed 50 cm from the reference structure 270. A 12 bit cooled CCD camera was used as a sensor array 272. Each sensor was chosen to be a group of 60×50 pixels (pixel size 4.65×4.65) on the cameras imaging surface.

Figure 44B:
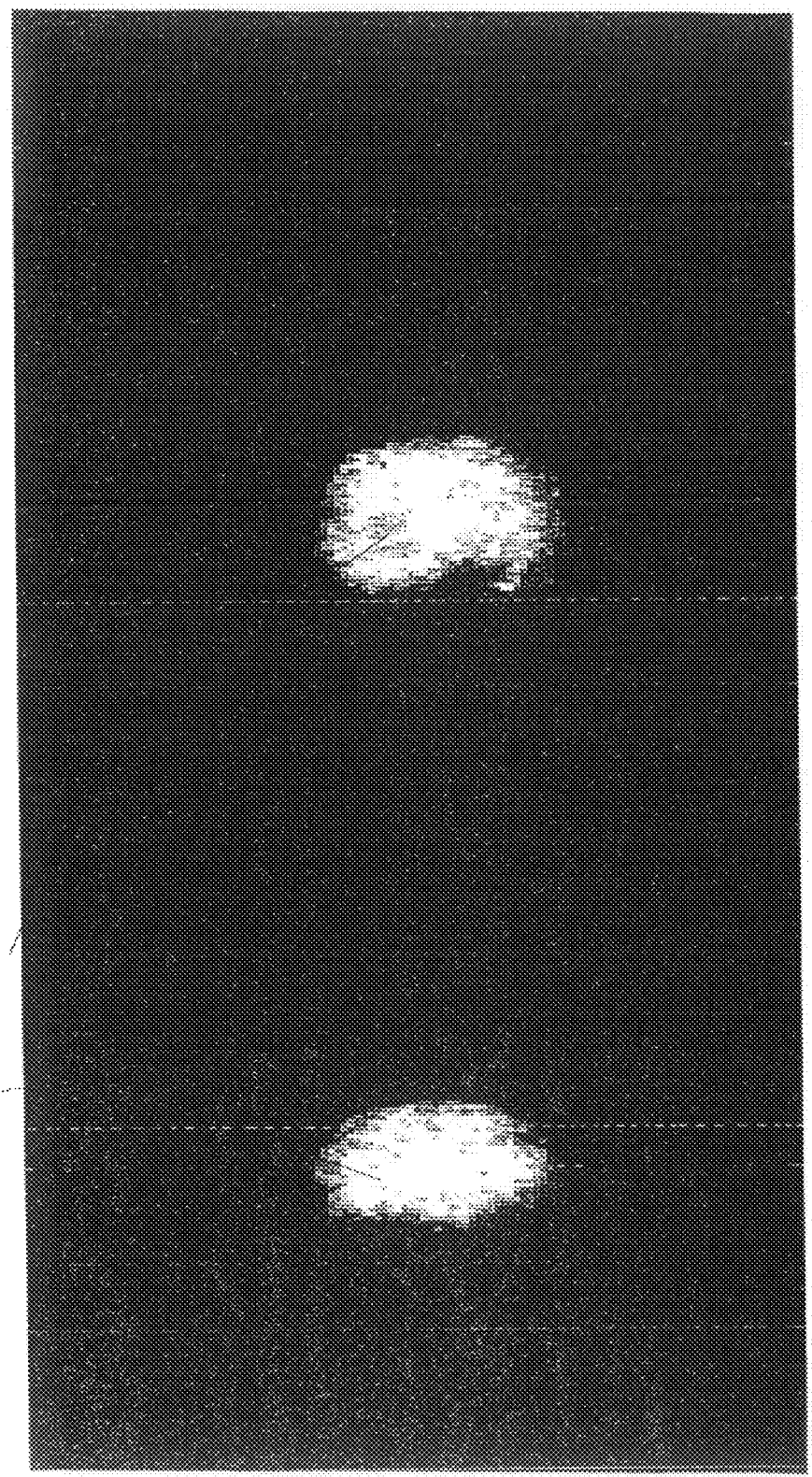
FIGS. 44a-44o illustrate reference structure output patterns, in accordance with an embodiment of the present invention.
Figure 44C:
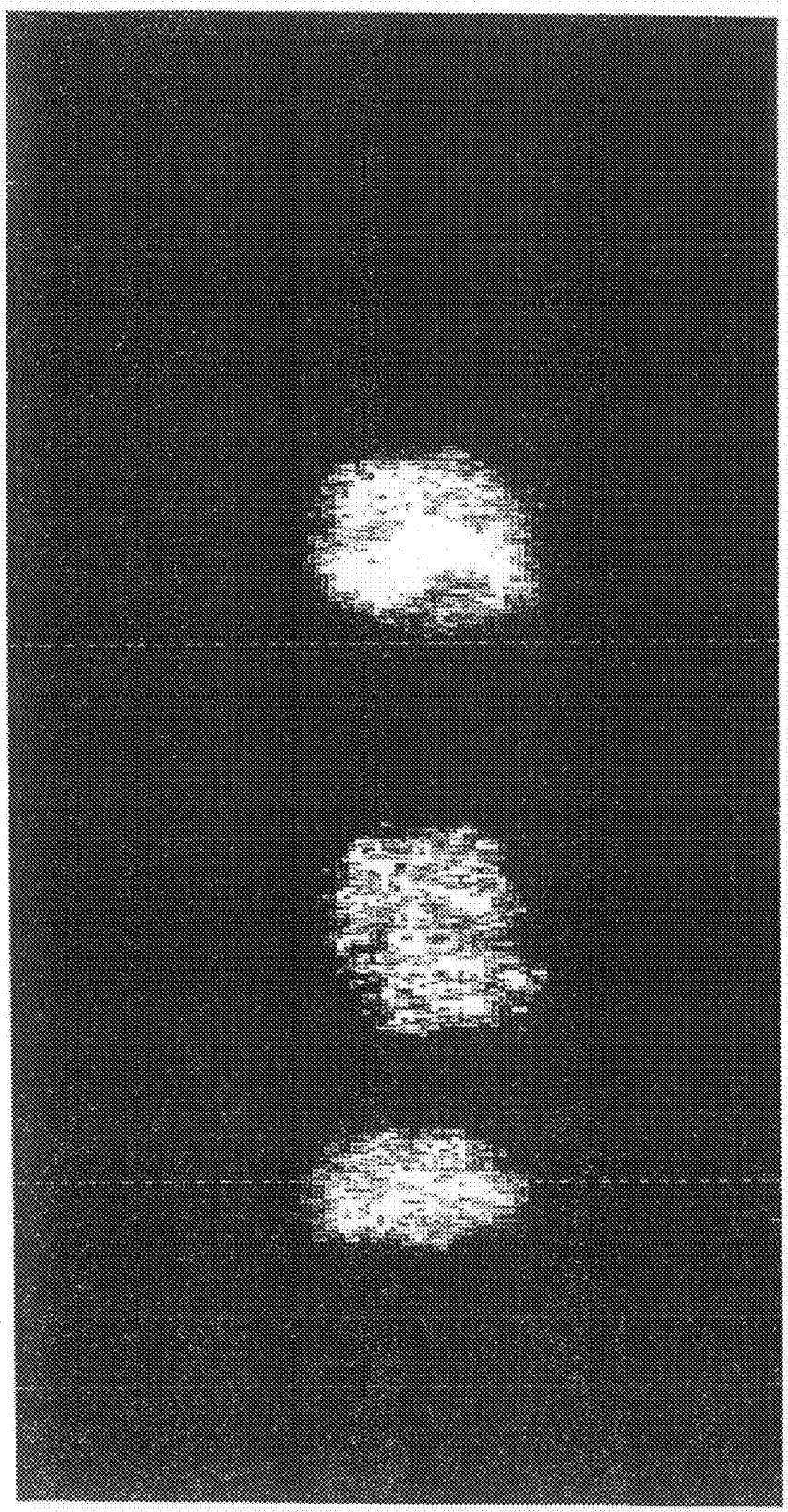
Figure 44E:
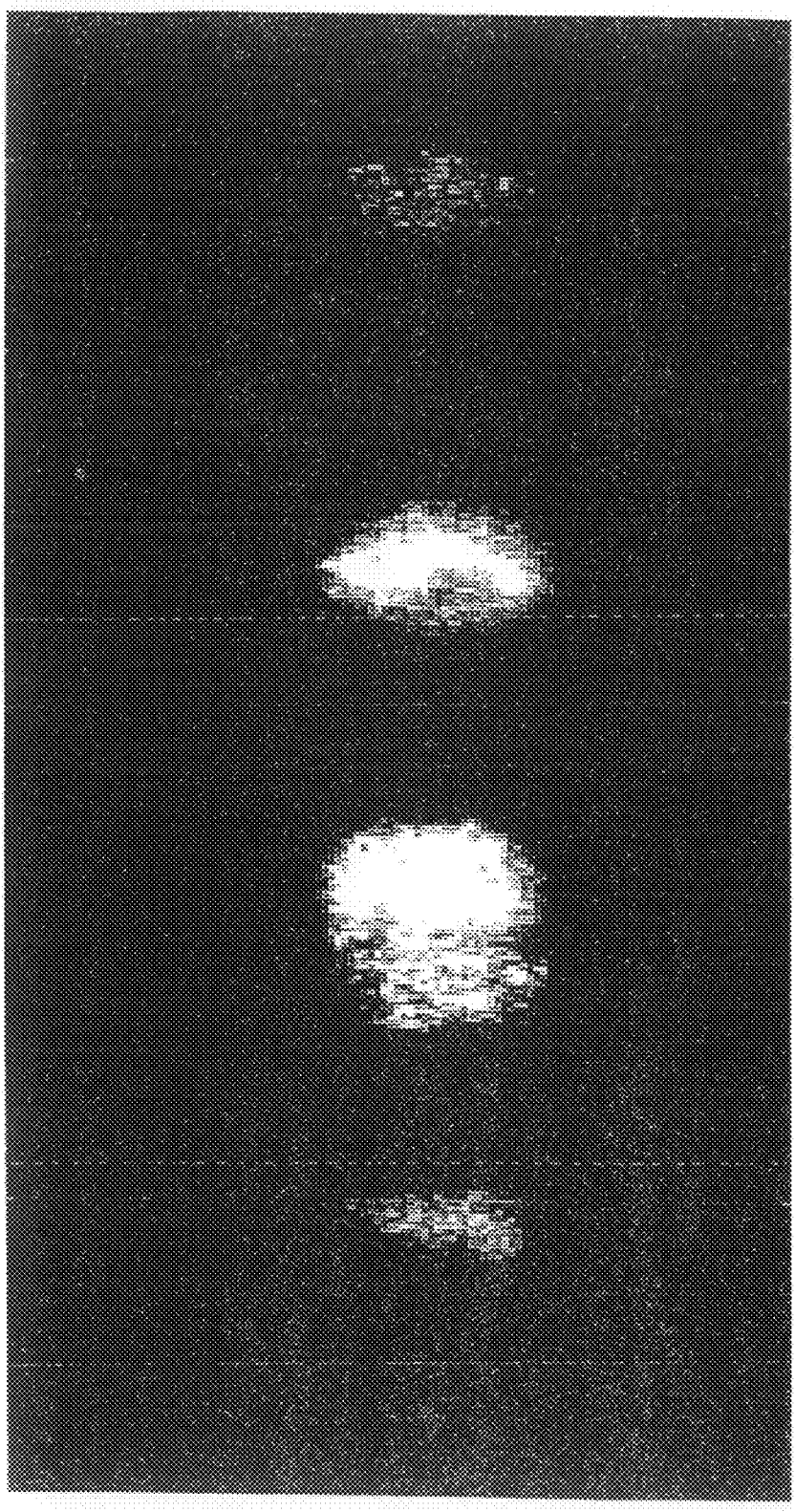
Figure 44F:
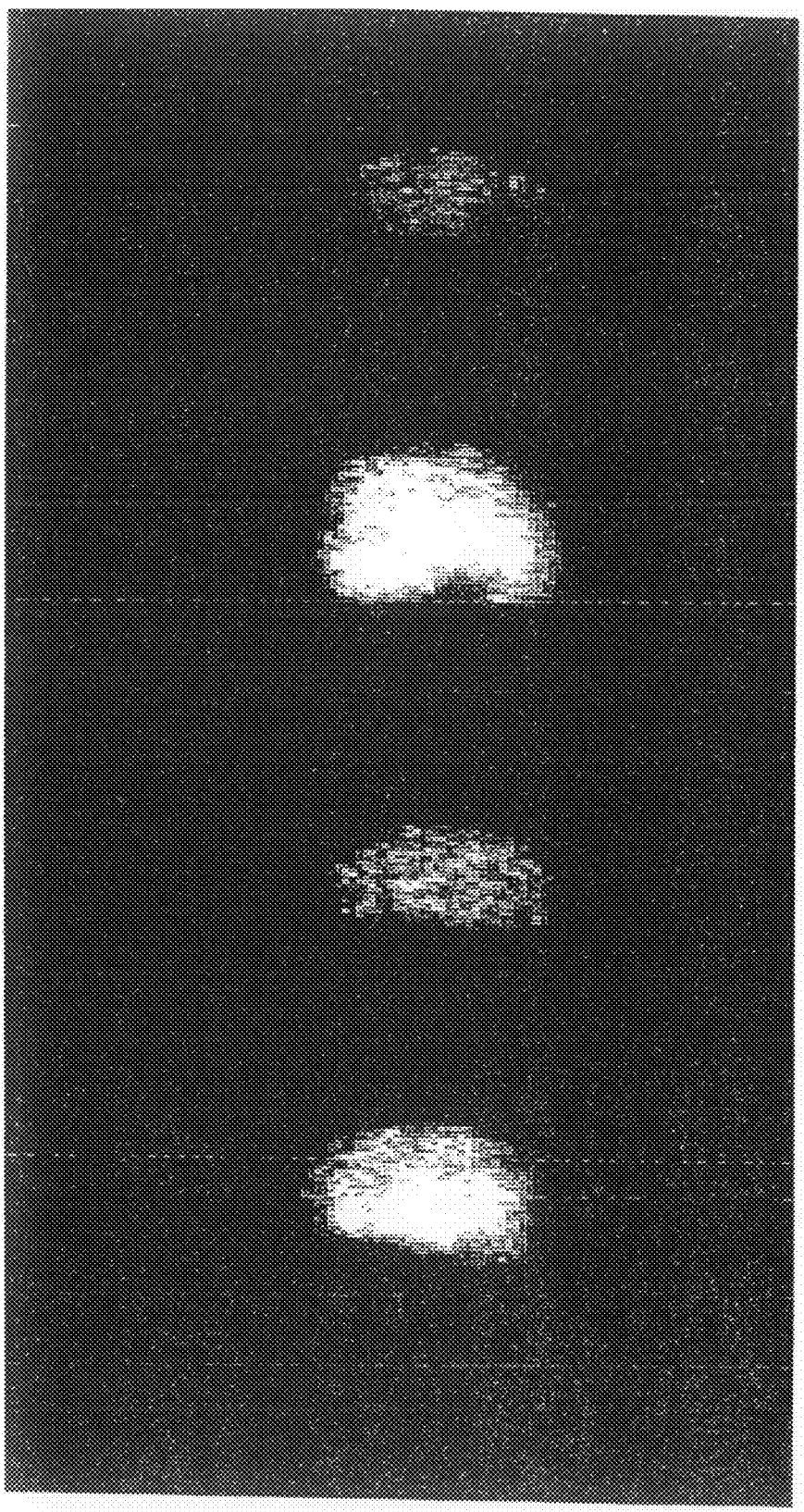
Figure 44G:
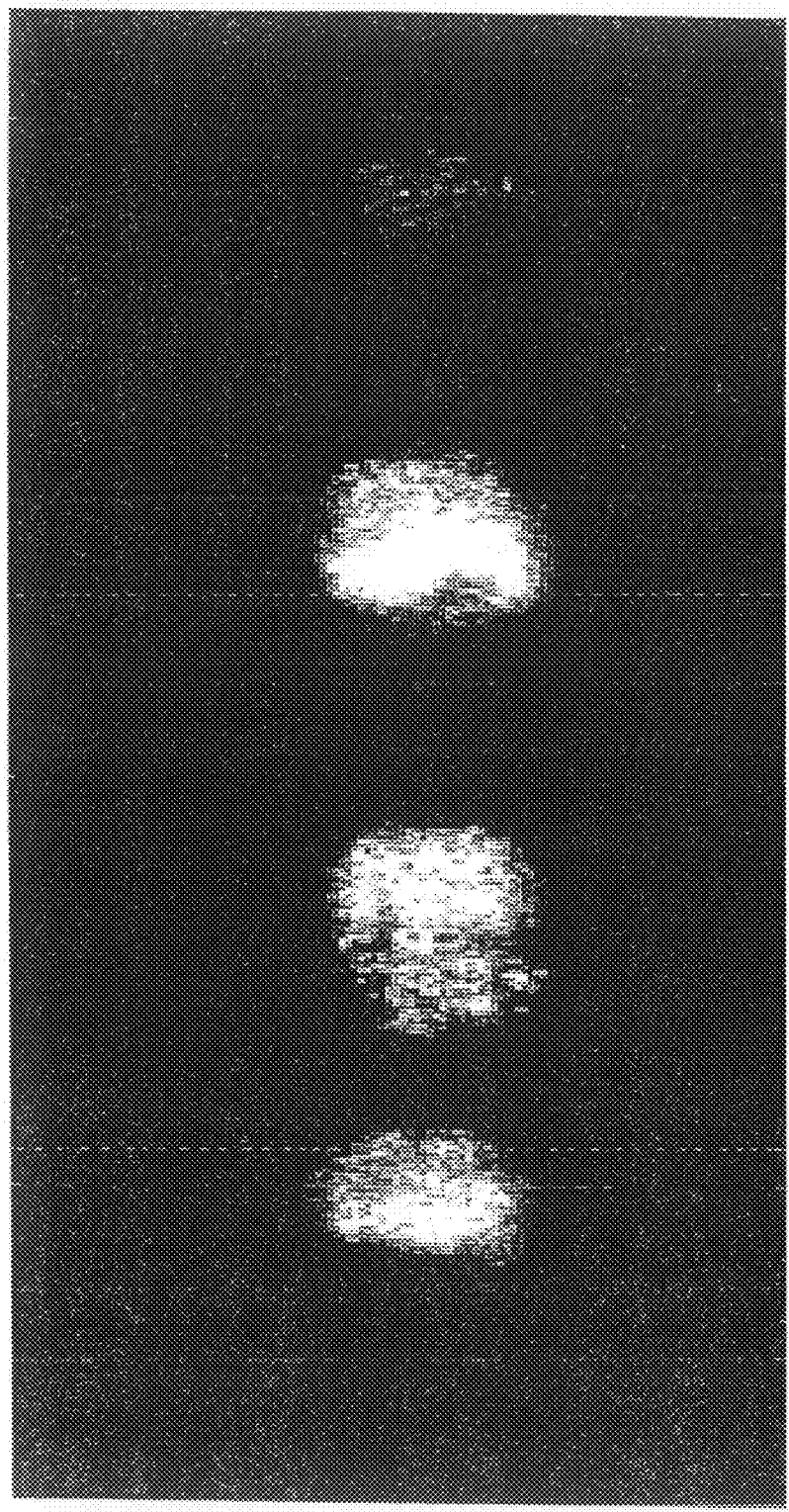
Figure 44H:
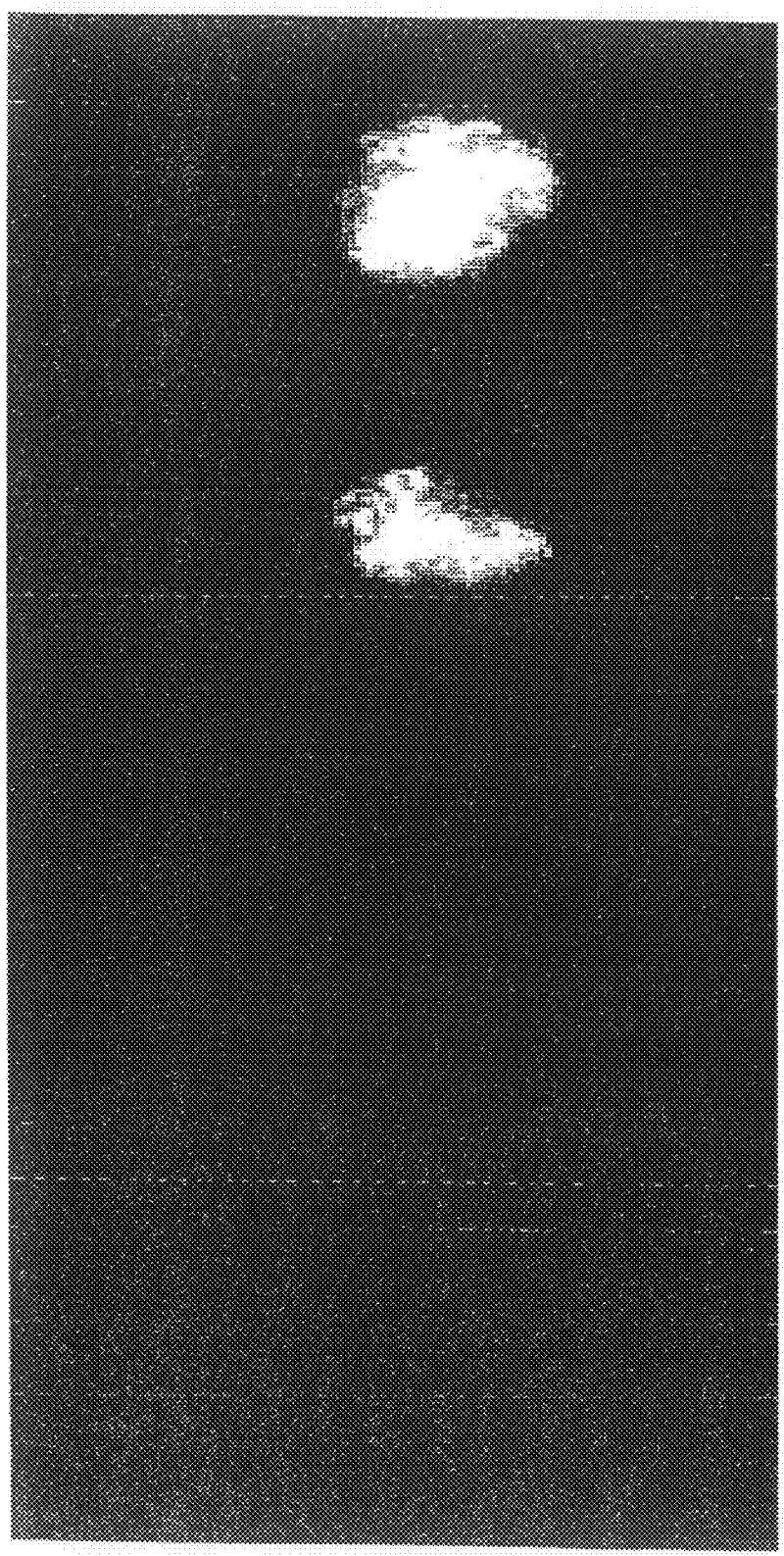
Figure 44C:
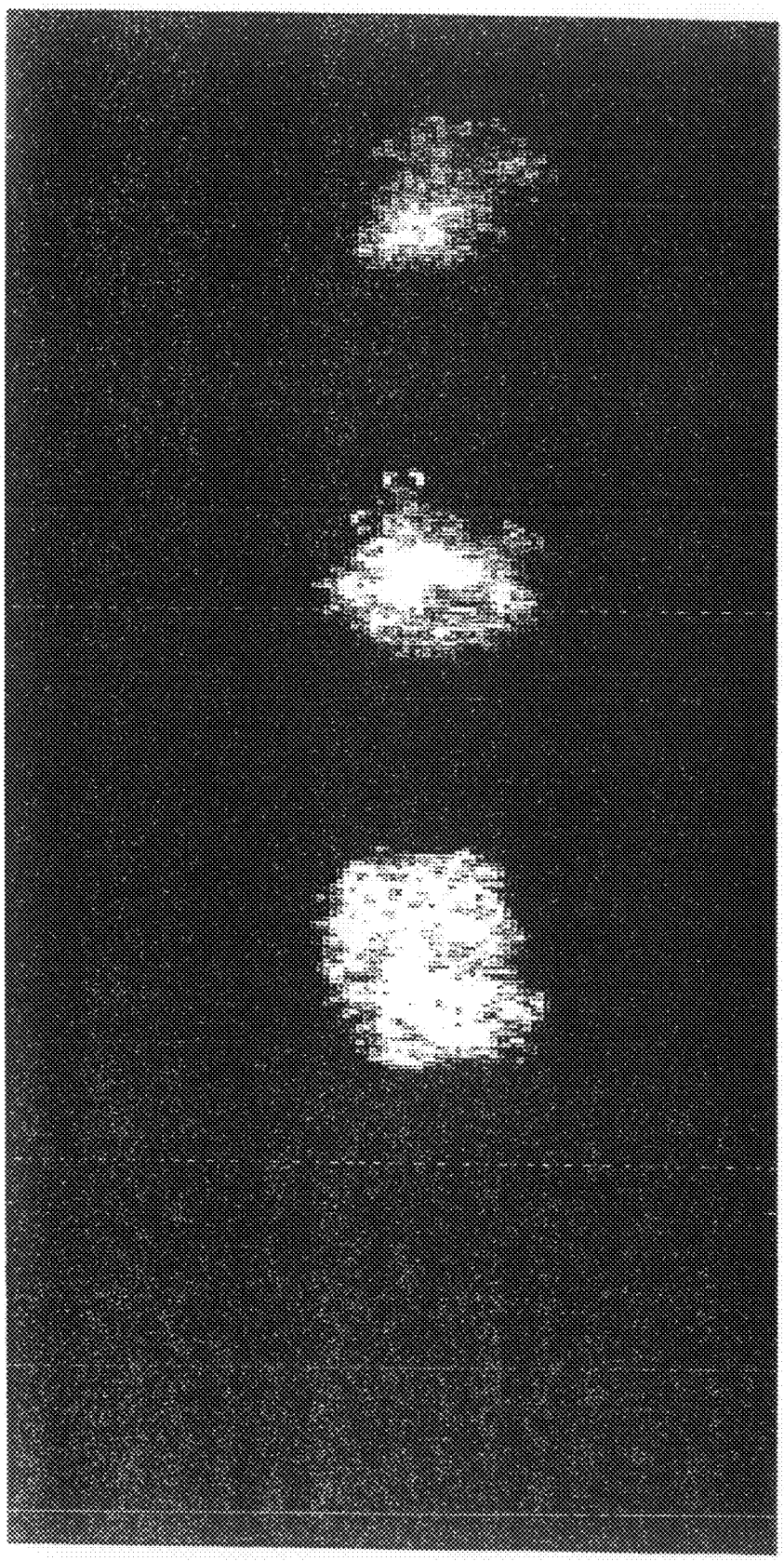
Figure 44I:
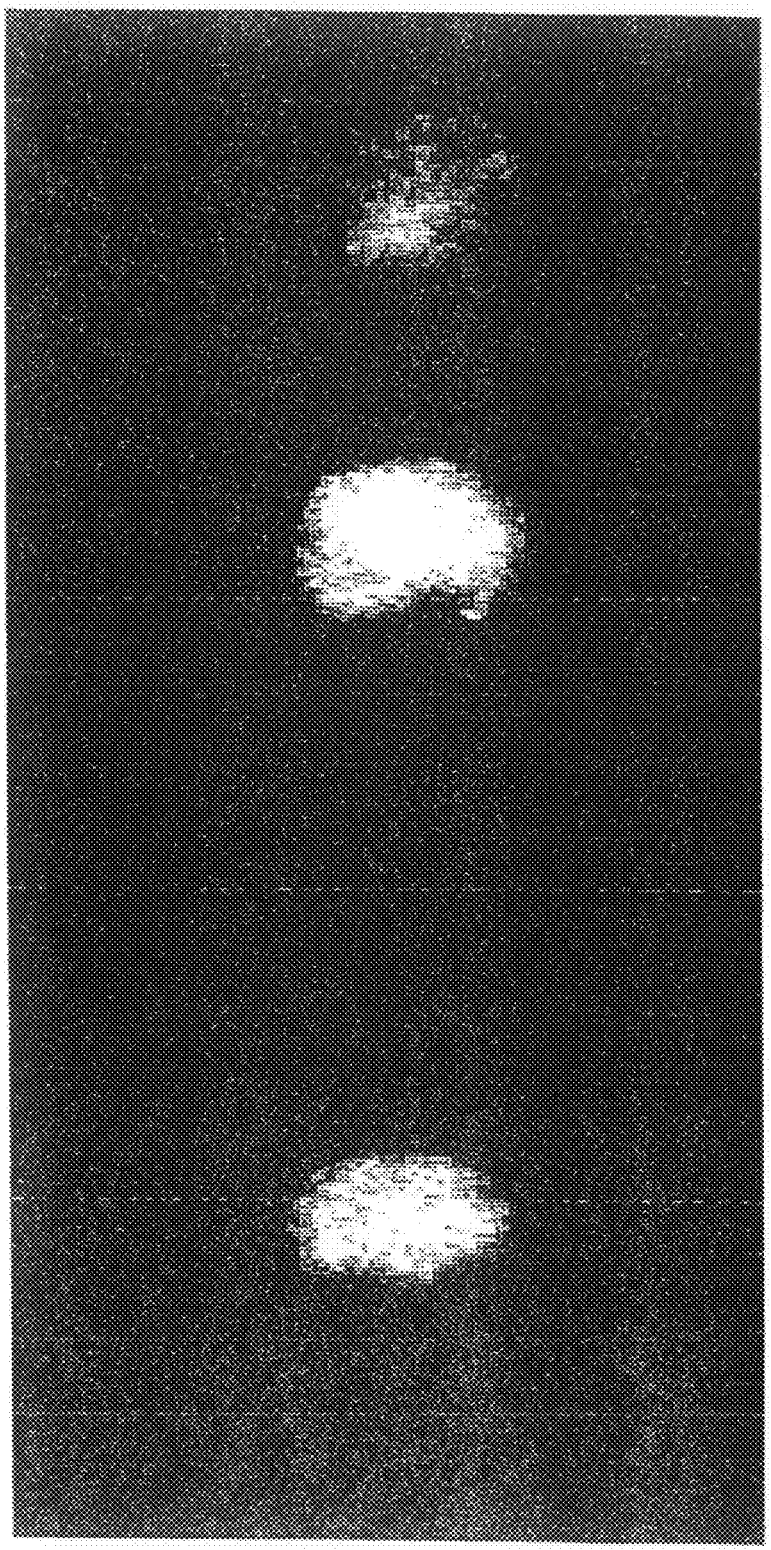
Figure 44K:
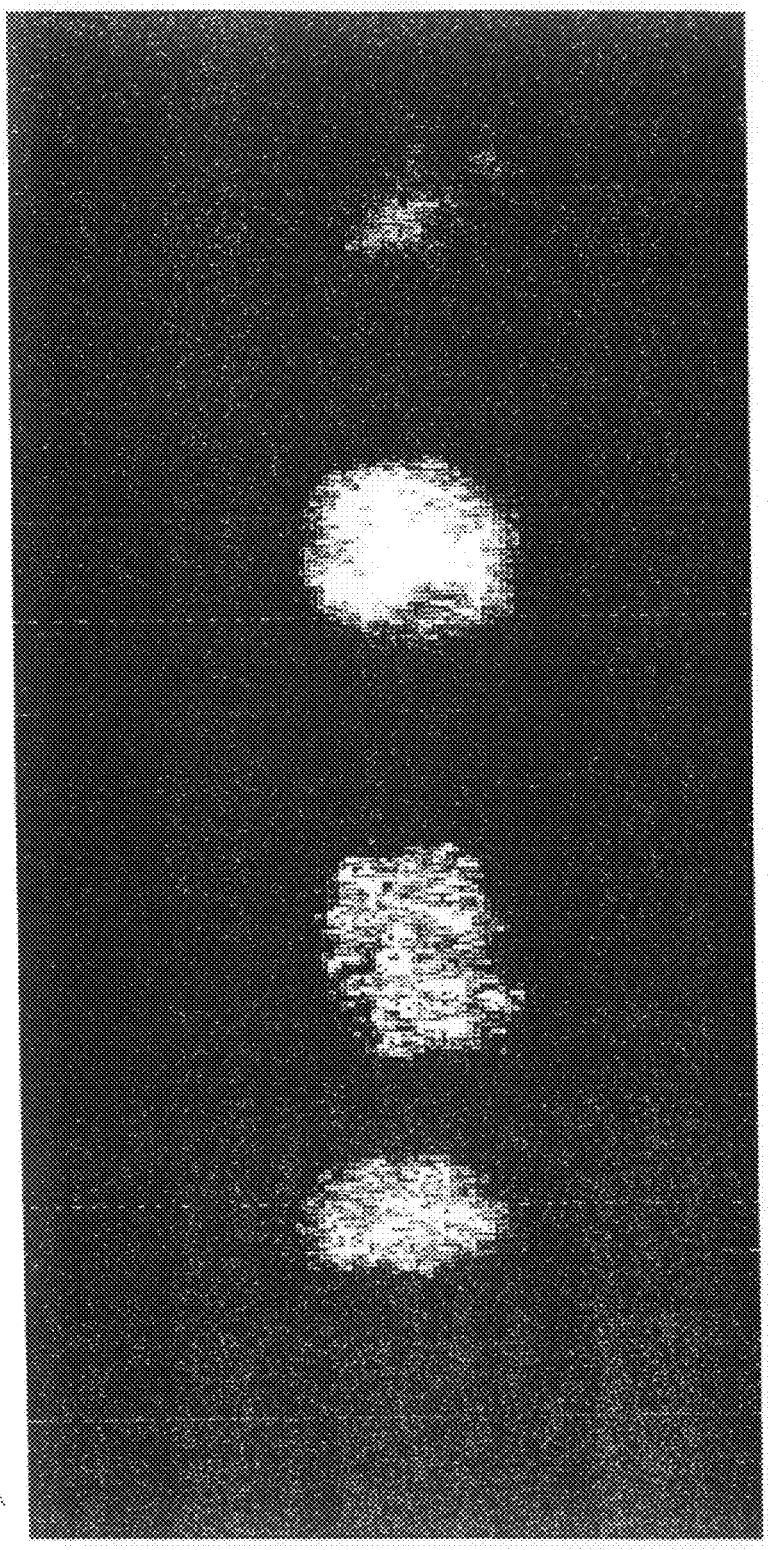
Figure 44L:
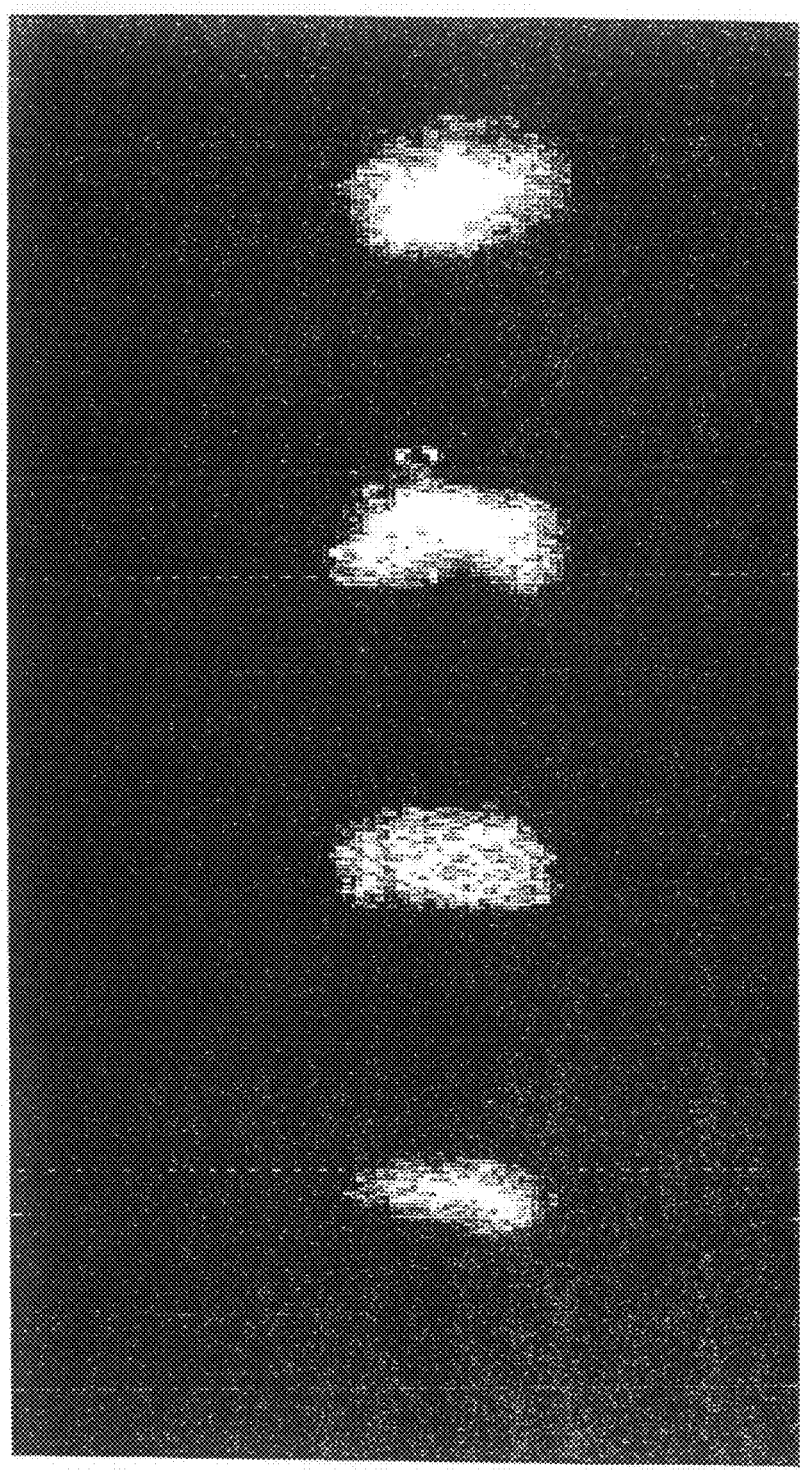
Figure 444M:
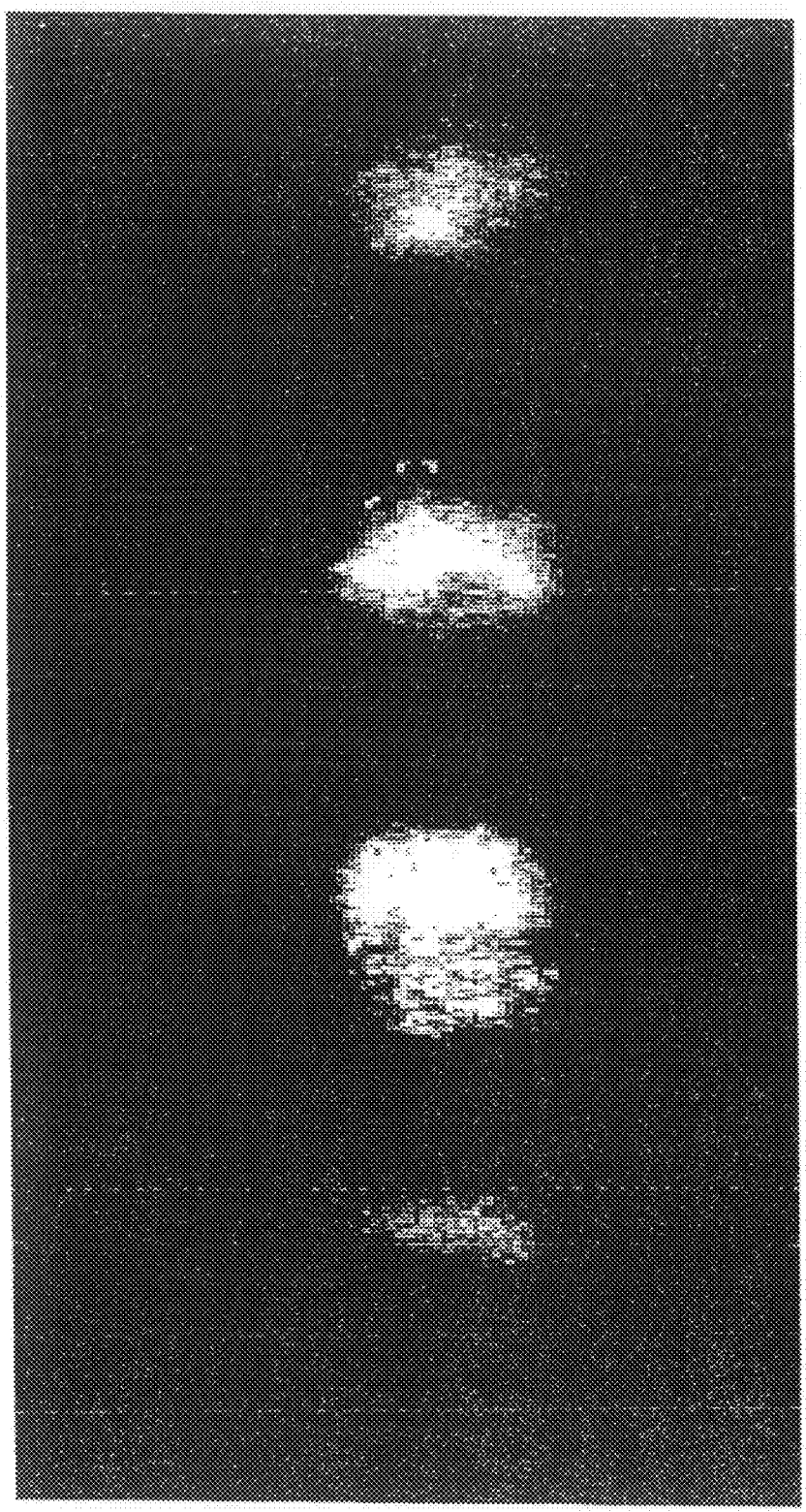
Figure 44N:
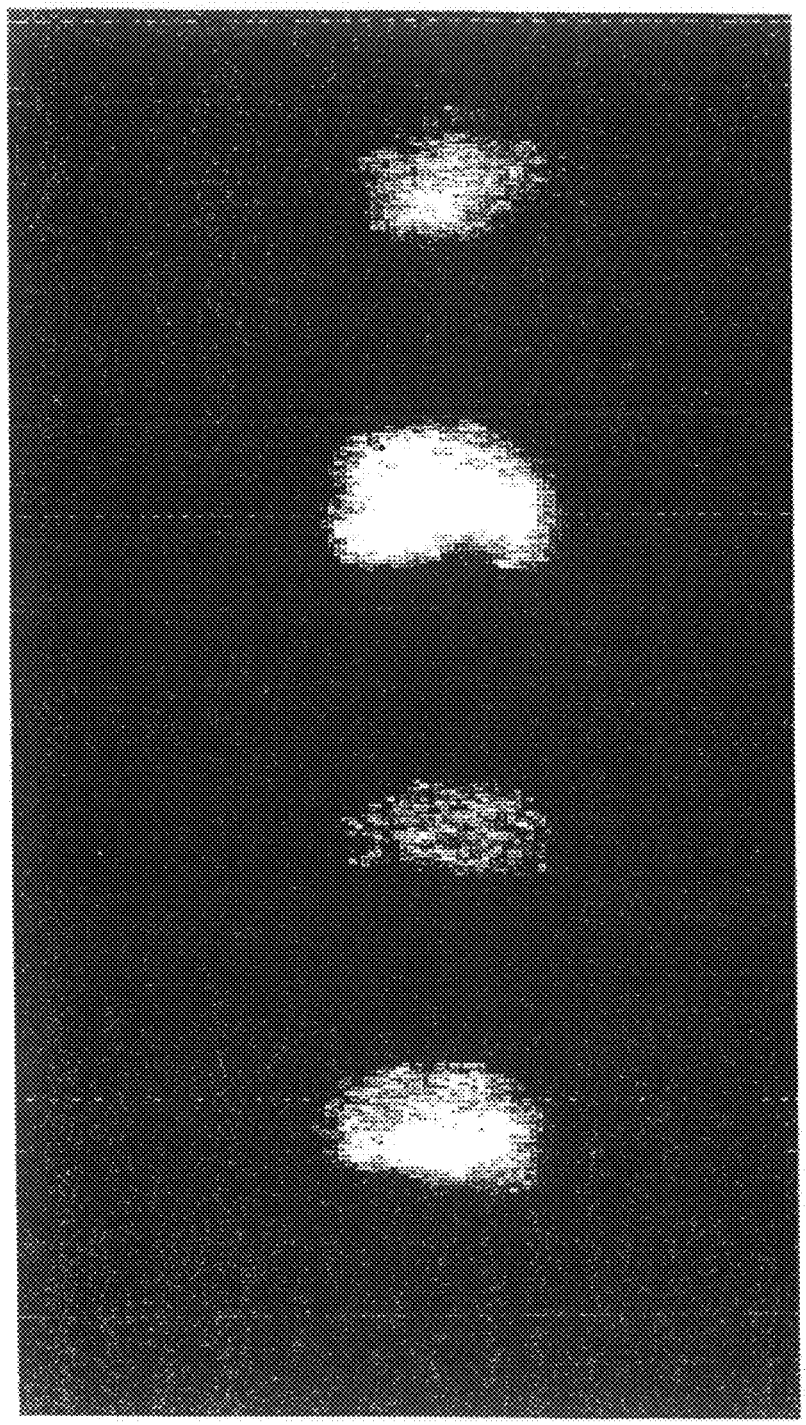
Figure 44O:
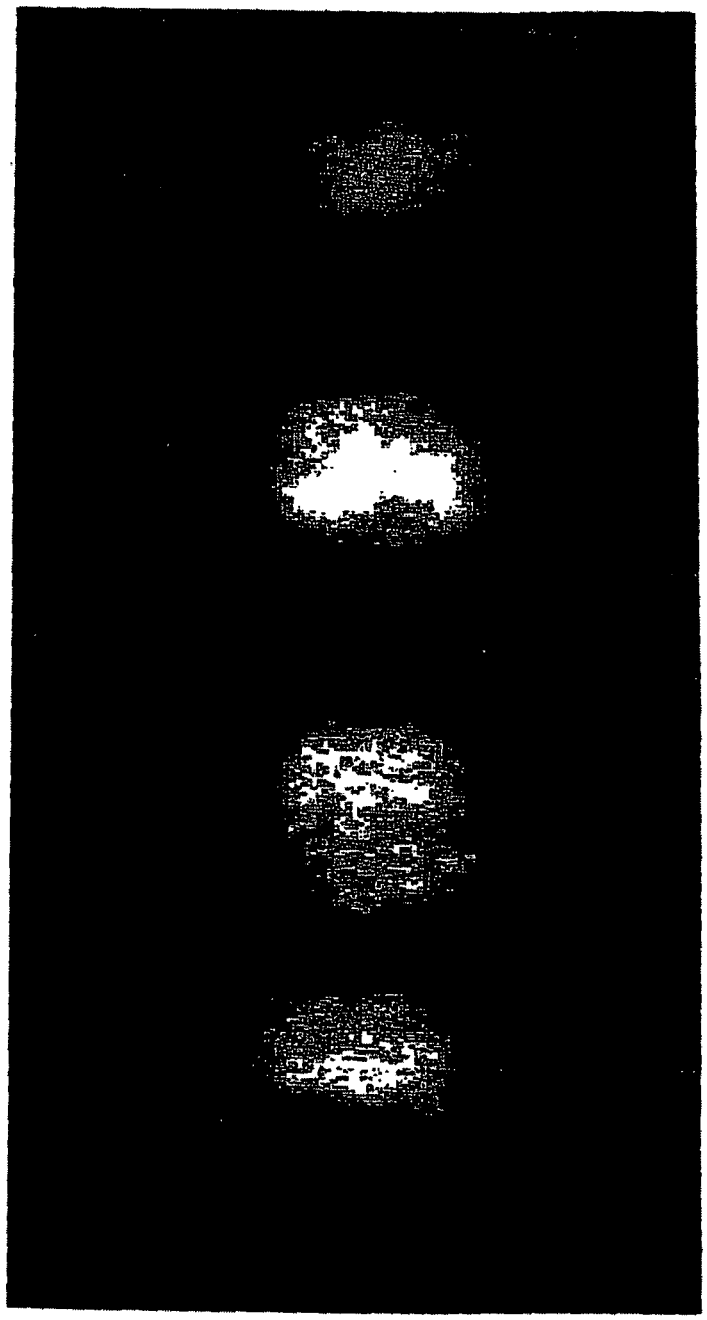

FIGS. 44a-44o show the patterns 274a-274o transmitted to the camera by the reference structure 270 for different combinations of lighted LEDs 267.

The pixel intensities which exceed a pre-selected threshold are added together to get a total intensity value for each sensor of the sensor array 272. The sensor intensity map for different combinations of lighted LEDs 267 in the LED array 268 is shown in Table 1 below.

TABLE 1

| LED pattern | Sensor intensity pattern (S1, S2, S3, S4) | | | |
| --- | --- | --- | --- | --- |
| 0001 | 0 | 881874 | 330926 | 0 |
| 0010 | 1197105 | 0 | 1743120 | 0 |
| 0011 | 1194541 | 887534 | 2080042 | 0 |

TABLE 1-continued

| LED pattern | Sensor intensity pattern (S1, S2, S3, S4) | | | |
| --- | --- | --- | --- | --- |
| 0100 | 538590 | 733136 | 623103 | 257955 |
| 0101 | 537086 | 1638702 | 967603 | 254241 |
| 0110 | 1723678 | 730187 | 2347902 | 256039 |
| 0111 | 1515366 | 1441309 | 2353960 | 217363 |
| 1000 | 0 | 0 | 301831 | 487603 |
| 1001 | 0 | 894262 | 663928 | 481717 |
| 1010 | 1197316 | 0 | 2070979 | 484394 |
| 1011 | 1201341 | 907061 | 2410049 | 486254 |
| 1100 | 546877 | 735763 | 953365 | 777133 |
| 1101 | 550028 | 1656286 | 1303013 | 779551 |
| 1110 | 1611061 | 683155 | 2483884 | 719698 |
| 1111 | 1405834 | 1332357 | 2432880 | 617232 |

The intensity values corresponding to the LED pattern 1000, 0100, 0010, 0001 constitute the columns of the matrix, which characterize the reference structure 270 represented by the matrix.

$$H = \begin{bmatrix} 0 & 538590 & 1197105 & 0 \\ 0 & 733136 & 0 & 881874 \\ 301831 & 623103 & 1743120 & 330926 \\ 487603 & 257955 & 0 & 0 \end{bmatrix}$$

The inverse of this matrix is used to invert the sensor intensities to get the source pattern comprising whether each LED 267 is "on" or "off." The inverted values obtained are shown in Table 2 below.

TABLE 2

| LED pattern | Inverted values |
| --- | --- |
| 0001 | 0, 0, 0, 1.0 |
| 0010 | 0, 0, 1.0, 0 |
| 0011 | 0, 0, 1.0, 1.0 |
| 0100 | 0, 1.0, 0, 0 |
| 0101 | 0, 1.0, 0, 1 |
| 0110 | 0, 1, 1, 0 |
| 0111 | 0, 0.9, 0.9, 0.9 |
| 1000 | 1.0, 0, 0, 0 |
| 1001 | 1.0, 0, 0, 1.0 |
| 1010 | 1.0, 0, 1.0, 0 |
| 1011 | 1.0, 0, 1.0, 1.1 |
| 1100 | 1.0, 1.0, 0, 0 |
| 1101 | 1.0, 1.0, 0, 1.0 |
| 1110 | 1.0, 0.9, 0.9, 0 |
| 1111 | 0.8, 0.8, 0.8, 0.8 |

The values are corrected to one decimal place.

3D Reference Structures for Motion and Tracking Sensors

Infrared motion sensors are widely used in security and control applications and can be improved with the addition of a reference structure. Conventional motion sensors consist of two or more detectors operating in differential mode, where the measurement of each detector is referenced against the other. As a source moves through the receiver pattern of these detectors, changes in the states of the detectors relative to one another occur. The receiver pattern of such a detector is a 3D density map of the probability that a photon emitted at a point in space hits the detector.

Figure 45:
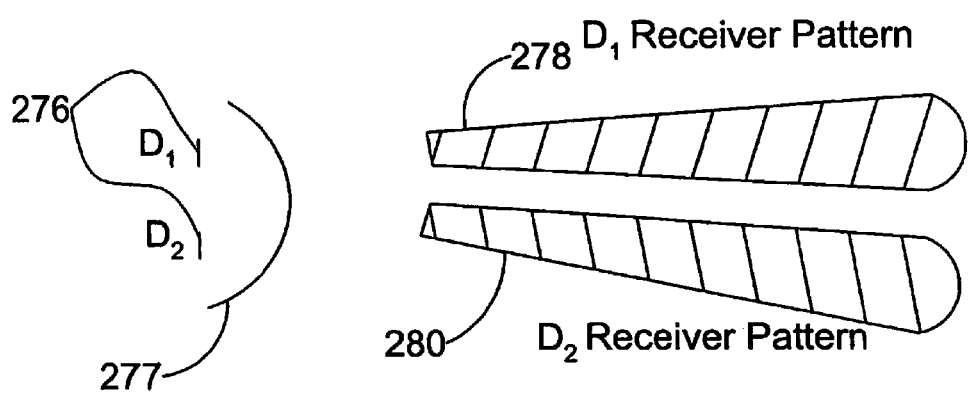
FIG. 45 illustrates a receiver pattern for a conventional motion sensor.
Figure 46:
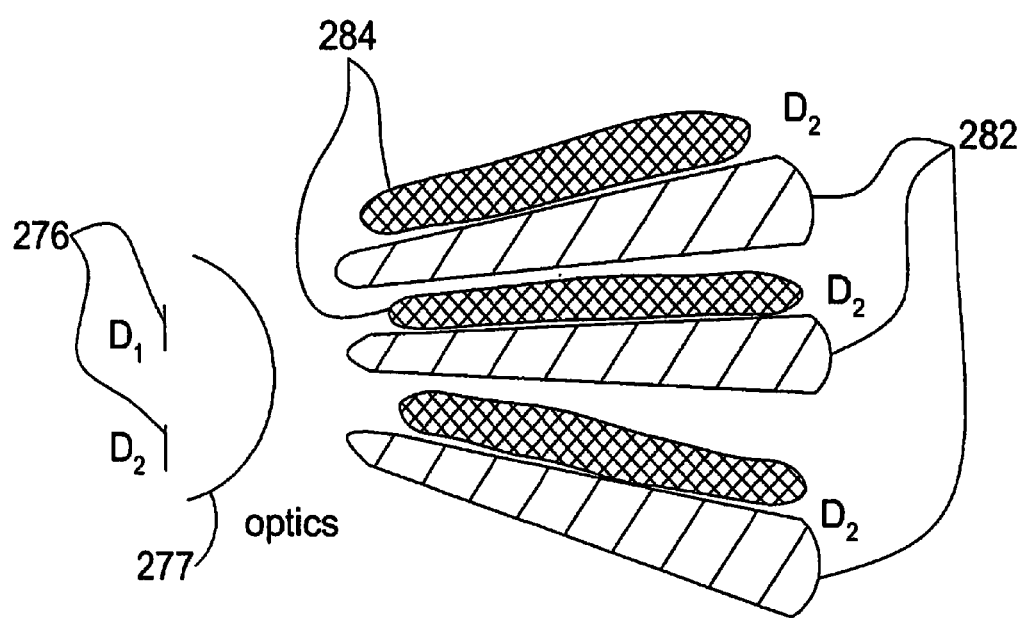
FIG. 46 illustrates a receiver pattern for a motion sensor with a reference structure, in accordance with an embodiment of the present invention.

Referring to FIG. 45, a schematic of an example of a receiver pattern for a conventional 2-element motion sensor is shown. In FIG. 45, two detectors 276, with optics 277 exhibit a receiver pattern with two detection areas 278 and 280. FIG. 46 is a schematic in which the two detectors 276 with optics 277 have a receiver pattern with three detection areas 282 interposed between 3 non-detection areas 284.

An embodiment of the invention expands the utility of motion sensors to include object recognition and tracking capabilities by making receiver patterns more complex. Receiver patterns of conventional motion detectors are shaped to discriminate, for example, between people and animals or vehicles. These patterns are convex, however, meaning that the receiver pattern is a beam, shaped mostly like the target.

For a motion sensor, the receiver patterns are structured such that the temporal signature on the detectors as the source moves through the field of view corresponds to the range to the source. Since the receiver patterns will vary with wavelength of the radiation emitted by or which otherwise propagates from the source, the temporal pattern may also give a spectral signature for the source, allowing for source identification as well as tracking. Complex receiver patterns are particularly attractive as embedded processors and wireless communications ports are added to motion sensors.

Figure 47:
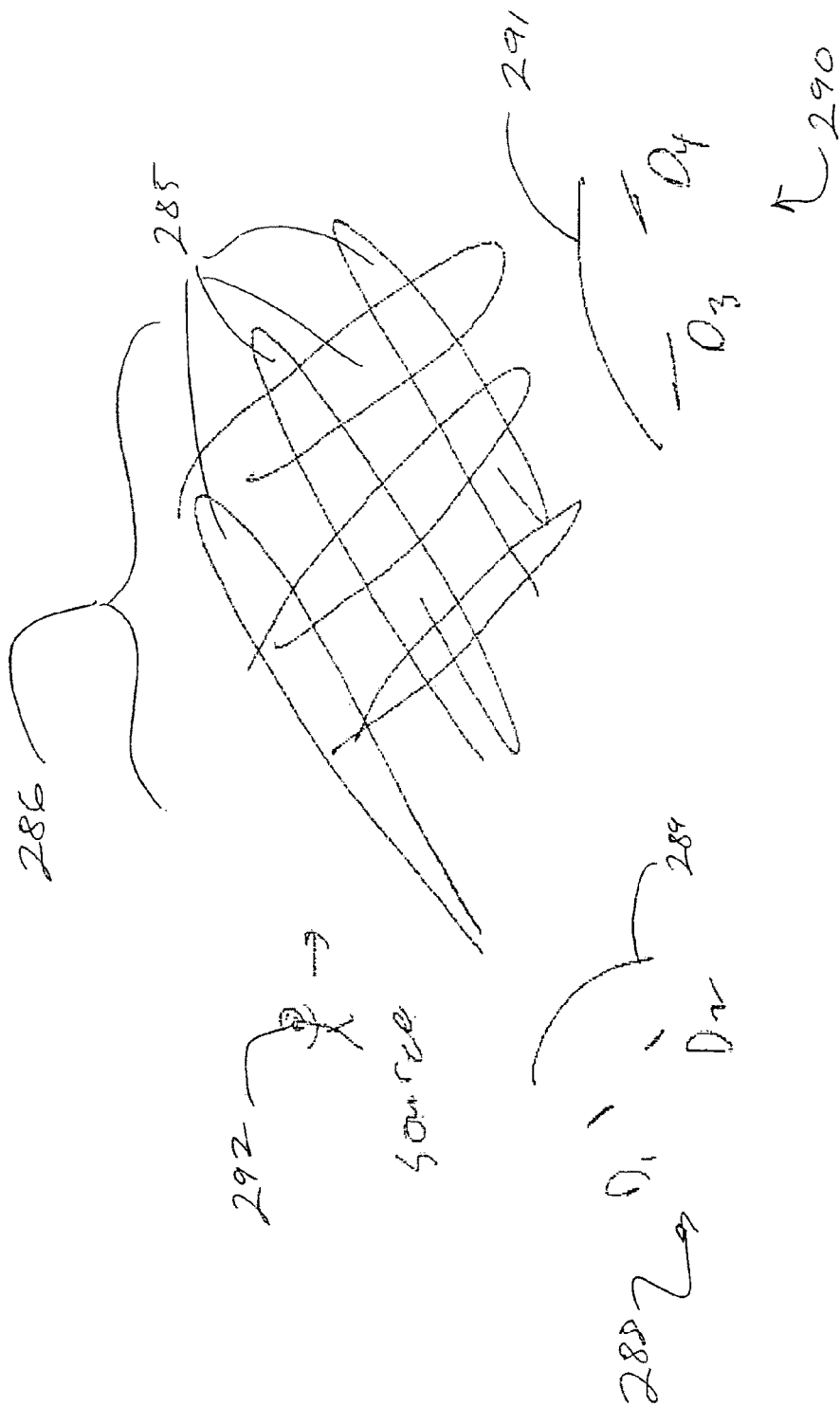
FIG. 47 illustrates a receiver pattern for a motion detector with multiple reference structures, in accordance with an embodiment of the present invention.

FIG. 47 is an example of a receiver pattern on a wireless array. In FIG. 47, two detector arrays 288 and 290 with corresponding optics 289 and 291 provide a receiver pattern forming a spatio-spectral grid 286 with intersecting detection areas 285 to detect the presence and motion of a source 292. The spatio-spectral grid 286, which the source 292 moves through on the array, will produce a temporal signal on the array of detectors 288 and 291 which allows for the determination of a characteristic of the source, and its position and velocity. An embodiment of the invention in which the motion sensor is enclosed within a reference structure may be used as a densely deployed and integrated component of a heterogeneous environment of sensors such as acoustic motion sensors, seismic sensors, video and IR cameras, etc.

Preferred embodiments of reference structures include 3D and 2D non-monotonic structures. As discussed above, such example structures may have transmittance functions based on Hadamard transforms (i.e., Hadamard matrices). Furthermore, reference structures may be implemented using materials that modulate absorption, permittivity, impedance, florescence or other field propagation properties.

Another example of a beneficial use of RST is for phase sensitive crystallography. For phase sensitive crystallography, RST can be used to sense the phase of multi-dimensional scattered fields. This sensitivity may be useful in macromolecule structure analysis. It may be preferable to implement RST by binding a well-characterized reference molecule to an unknown source molecule in a crystal structure. The reference scattering enables the phase sensitive Fourier representation of the unknown molecule to be determined.

Figure 48:
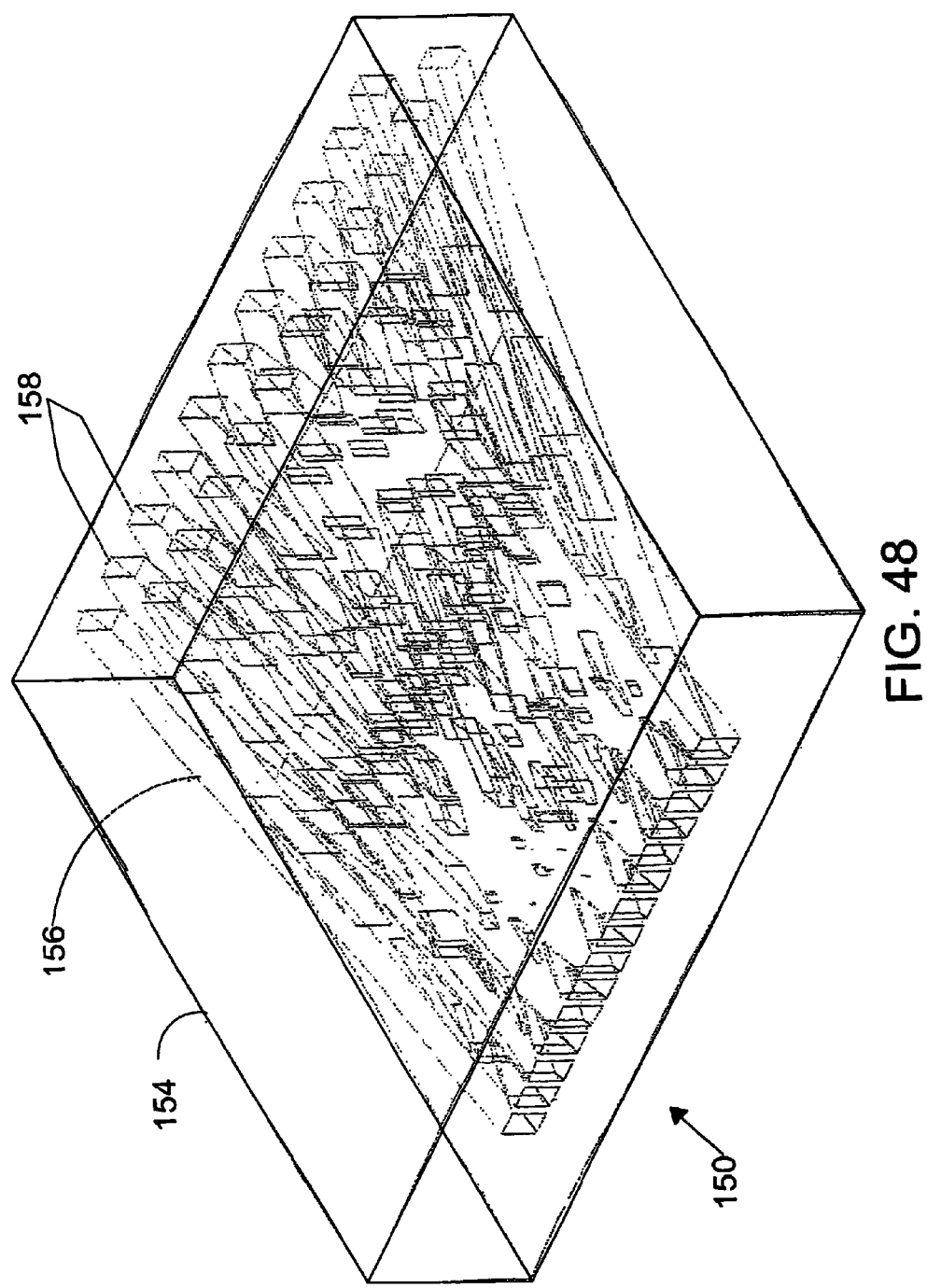
FIG. 48 is a perspective ghost view of a reference structure, in accordance with one embodiment of the present invention.
Figure 49:
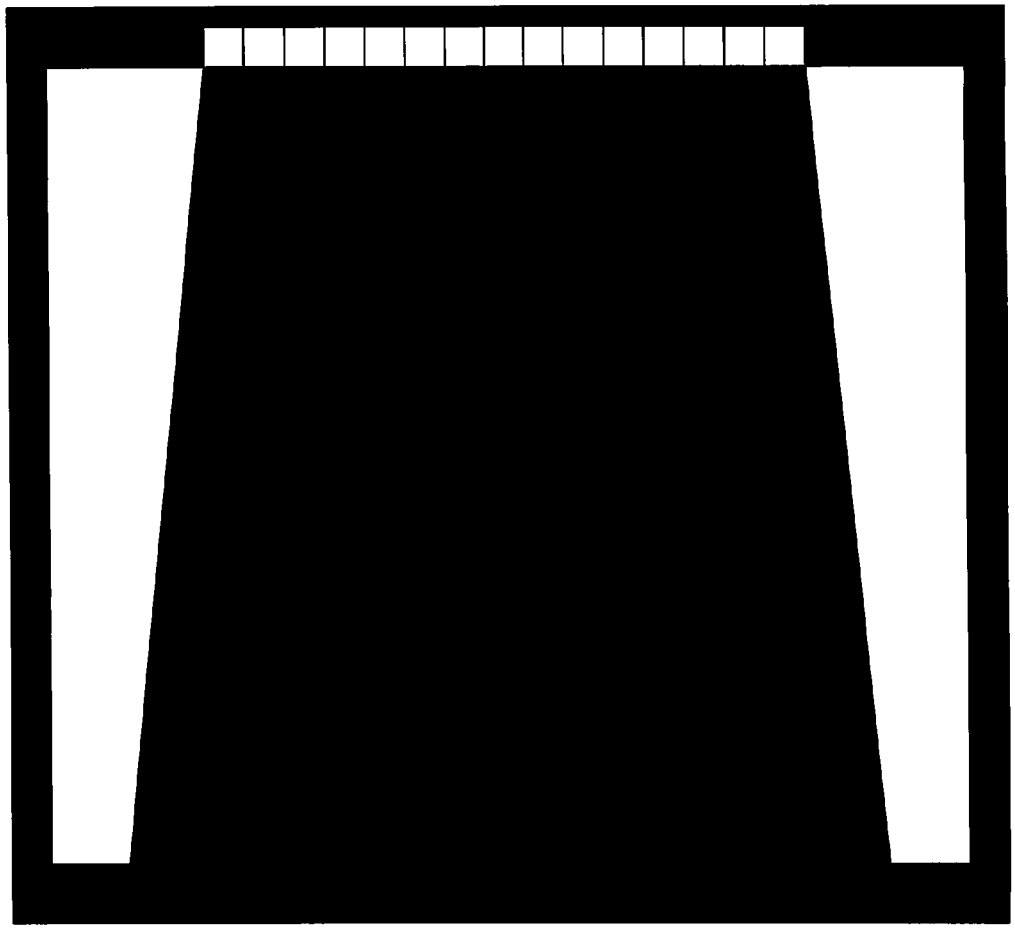
FIG. 49 is a photograph of a reference structure, in accordance with one embodiment of the present invention.

FIG. 48 is a perspective ghost view of a reference structure 154, in accordance with one embodiment of the present invention. The reference structure 154 has an input side 160 and an output side 150. The input side 160 includes multiple input windows 158. The output side includes multiple output windows 152. In this embodiment, each output window 152 is connected to multiple input windows 158 via transparent pathways 156 through the reference structure 154, while the remainder of the reference structure 154 body is opaque. A prototype version of reference structure 154 has been constructed using a stereolithographic printer. A photograph of the sensor is shown in FIG. 49.

Figure 50:
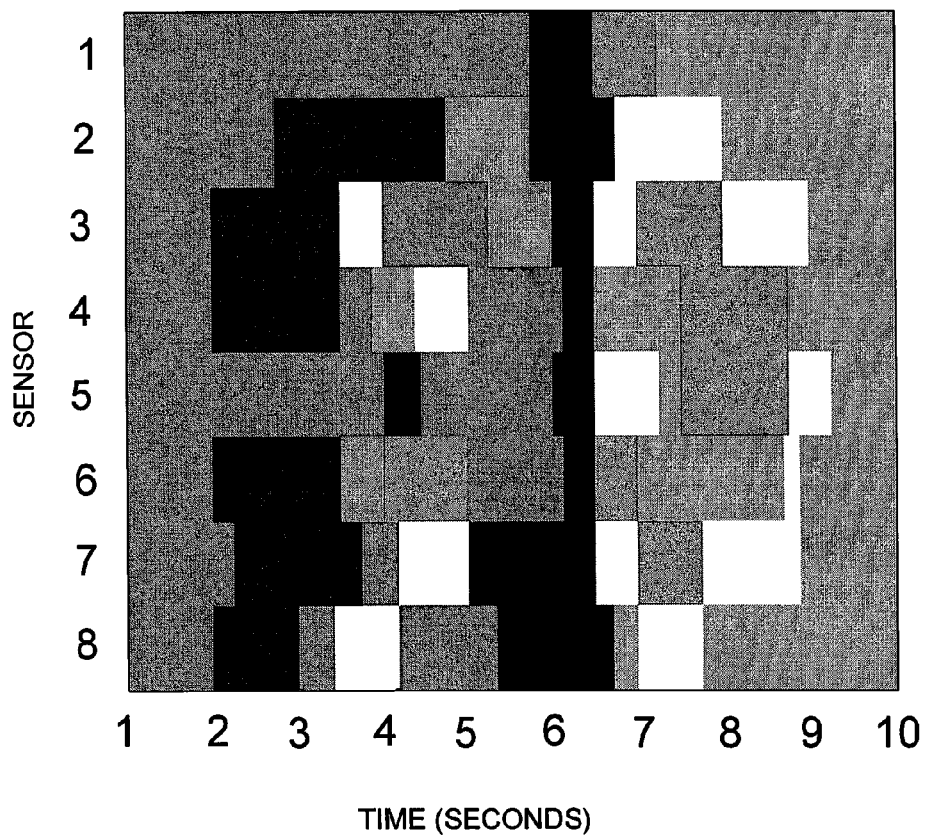
FIGS. 50-51 are photographs of output signals for the reference structure of FIG. 49.
Figure 51:
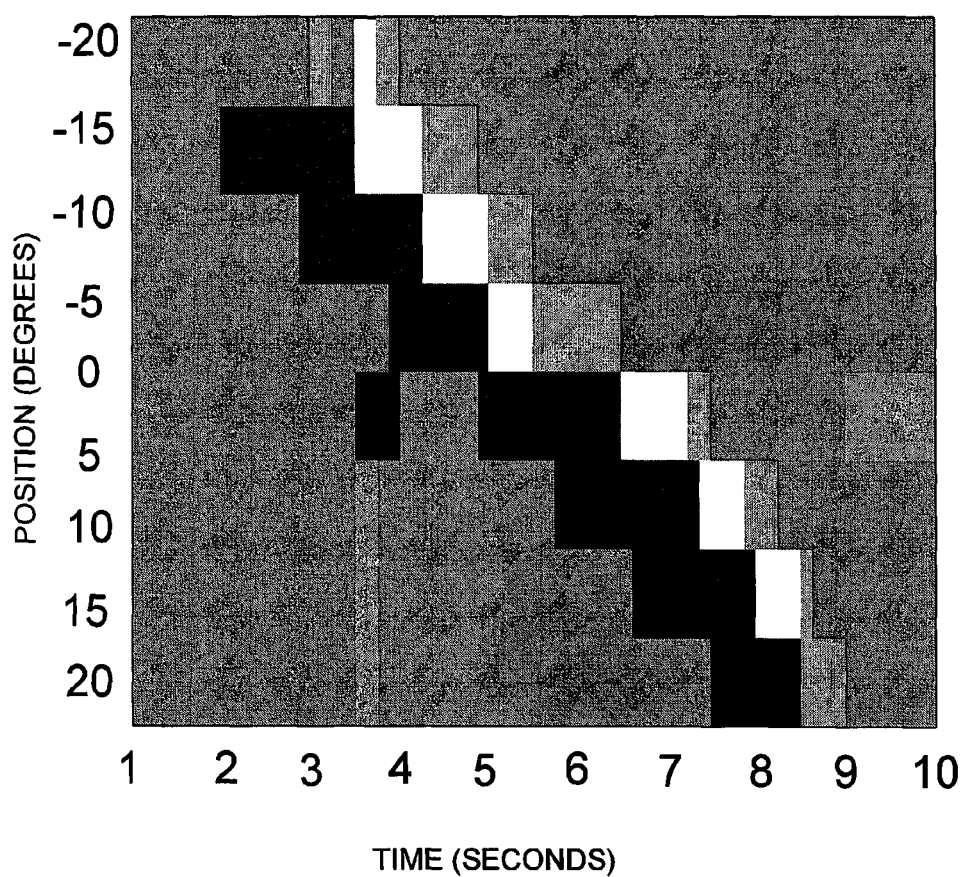

This reference structure has been used to track motion. Data from the sensor is shown in FIGS. 50 and 51. FIG. 50 shows the reference structure signal as a function of time and channel number, and FIG. 51 shows the inverse transform for source position (a car going by) as a function of time.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

$N = orderOfGrid(NbyNgrid)$ $$p_1 = \begin{cases} [N/2, N/2] & N\,even \\ [(N+1)/2, (N+1)/2] & N\,odd \end{cases}$$

$p_2 = p_1 + [0, 1]$ $p_3 = p_1 + [1, 1]$ $p_4 = p_1 + [1, 0]$ $p_{EvenSquares} = p_1 + [N/2, 1 - N/2]$ $p_{OddSquares} = p_1 - [(N-1)/2, (N-1)/2]$ $$dvec(m) = (-1)^{chop(\sqrt{m})+1} \begin{cases} [0, 1] & m - chop(\sqrt{m})^2 = 1 \\ [m-1, 1] & 1 < m - chop(\sqrt{m})^2 \leq chop(\sqrt{m})^2 + chop(\sqrt{m}) + 1 \\ [chop(\sqrt{m}), chop(\sqrt{m})(chop(\sqrt{m})+1) - m] & m - chop(\sqrt{m})^2 > chop(\sqrt{m})^2 + chop(\sqrt{m}) + 1 \end{cases}$$

$p_m = p_{chop(\sqrt{m})} + dvec(m)$

What is claimed is:

1. A source resolver, comprising:
   a multi-dimensional reference structure configured to modulate source radiation in a predetermined manner to produce a reference structure modulated signal comprising a plurality of source space projections, the multi-dimensional reference structure comprises a longitudinal dimension and a transverse dimension, the multi-dimensional reference structure comprises at least two obscuring structures or apertures distributed in a longitudinal direction in a non-linear manner, and the multi-dimensional reference structure modulates the source radiation along the longitudinal direction; and an analyzer configured in accordance with said reference structure for resolving a source state from the reference structure modulated signal.

2. The source resolver of claim 1, wherein the source radiation comprises radiation generated by a source.

3. The source resolver of claim 1, wherein the source radiation comprises radiation scattered by a source.

4. The source resolver of claim 1, wherein the source radiation comprises a radiation reflected by a source.

5. The source resolver of claim 1, wherein the source radiation propagates through a source.

6. The source resolver of claim 1, wherein the multi-dimensional reference structure modulates the source radiation by attenuating a portion of the source radiation.

7. The source resolver of claim 1, wherein the multi-dimensional reference structure modulates the source radiation by diffracting a portion of the source radiation.

8. The source resolver of claim 1, wherein the multi-dimensional reference structure modulates the source radiation by scattering a portion of the source radiation.

9. The source resolver of claim 1, wherein the multi-dimensional reference structure modulates the source radiation by refracting a portion of the source radiation.

10. The source wave resolver of claim 1, wherein the multi-dimensional reference structure modulates the source radiation by obscuring a portion of the source radiation.

11. The source resolver of claim 10, wherein the multi-dimensional reference structure comprises at least one aperture in a substantially opaque material, wherein the aperture is configured to pass a portion of the source radiation and the substantially opaque material is configured to obscure the source radiation.

12. The source resolver of claim 11, wherein the multi-dimensional reference structure comprises multiple apertures in a substantially opaque material, wherein at least two of the apertures overlap.

13. The source resolver of claim 12, wherein the multiple apertures comprise a first aperture defining a first plane and a second aperture defining a second plane, wherein the first and second planes are different.

14. The source resolver of claim 10, wherein the multi-dimensional reference structure comprises at least one channel in a substantially opaque material, wherein the channel is configured to pass a portion of the source radiation and the substantially opaque material is configured to substantially obscure a portion of the source radiation.

15. The source resolver of claim 1, wherein the multi-dimensional reference structure modulates the source radiation by absorbing a portion of source radiation.

16. The source resolver of claim 1, wherein the multi-dimensional reference structure modulates the source radiation by shifting a frequency of a portion of source radiation.

17. The source resolver of claim 1, wherein the multi-dimensional reference structure modulates the source radiation by diffusing a portion of source radiation.

18. The source resolver of claim 1, wherein the multi-dimensional reference structure modulates the source radiation by reflecting a portion of source radiation.

19. The source resolver of claim 18, wherein the multi-dimensional reference structure comprises at least one mirror.

20. The source resolver of claim 19, wherein the multi-dimensional reference structure comprises at least one moveable mirror.

21. The source resolver of claim 20, wherein the multi-dimensional reference structure comprises an array of moveable mirrors.

22. The source resolver of claim 1, wherein the multi-dimensional reference structure comprises at least one sensor.

23. The source resolver of claim 1, wherein the multi-dimensional reference structure comprises a three-dimensional structure.

24. The source resolver of claim 1, wherein the analyzer comprises a sensor.

25. The source resolver of claim 24, wherein the sensor comprises a plurality of sensors.

26. The source resolver of claim 24, wherein the sensor comprises an array of sensors.

27. The source resolver of claim 26, wherein the array of sensors is substantially periodic.

28. The source resolver of claim 24, wherein the sensor comprises at least one sensor configured to detect at least one reference structure modulated signal parameter.

29. The source resolver of claim 28, wherein the at least one reference structure modulated signal parameter comprises amplitude.

30. The source resolver of claim 28, wherein the reference structure modulated signal parameter comprises phase.

31. The source resolver of claim 28, wherein the reference structure modulated signal parameter comprises frequency.

32. The source resolver of claim 28, wherein the reference structure modulated signal parameter comprises polarity.

33. The source resolver of claim 28, wherein the reference structure modulated signal parameter comprises dispersion.

34. The source resolver of claim 28, wherein the reference structure modulated signal parameter comprises carrier frequency.

35. The source resolver of claim 33, wherein the source radiation comprises wave packets and the at least one reference structure modulated signal parameter comprises a wavelength of an envelope of the wave packet.

36. The source resolver of claim 1, wherein the analyzer comprises a processor.

37. The source resolver of claim 1, wherein the multi-dimensional reference structure comprises an active reference structure coupled to a reference structure driver.

38. The source resolver of claim 37, wherein the reference structure driver is in communication with the analyzer.

39. The source resolver of claim 37, wherein the reference structure driver is in communication with the source.

40. The source resolver of claim 38, wherein the reference structure driver is configured to receive a feedback signal from the analyzer and output a control signal to the active reference structure.

41. The source resolver of claim 40, wherein the modulation of the source radiation by the active reference structure is variable in accordance with the control signal from the reference structure driver.

42. A tomography machine configured to image an object, comprising the source resolver of claim 1.

43. The source resolver of claim 1, wherein the plurality of source space projections are produced by the multi-dimensional reference structure in a single time step.

44. The source resolver of claim 1, wherein the plurality of source space projections are produced by the multi-dimensional reference structure without scanning of the multi-dimensional reference structure.

45. A source imager, comprising:
a multi-dimensional reference structure configured to modulate source radiation to produce a reference structure modulated signal comprising a plurality of source space projections, the multi-dimensional reference structure comprises a longitudinal dimension and a transverse dimension, the multi-dimensional reference structure comprises at least two obscuring structures or apertures distributed in a longitudinal direction in a non-linear manner, and the multi-dimensional reference structure modulates the source radiation along the longitudinal direction;

a sensor array configured to detect the reference structure modulated signal; and a processor coupled to the sensor array and configured to derive source information from the detected reference structure modulated signal.

46. The source imager of claim 45, wherein the source information comprises a state of the source.

47. The source imager of claim 45, wherein the source information comprises an image of the source.

48. The source imager of claim 45, wherein the plurality of source space projections are produced by the multi-dimensional reference structure in a single time step.

49. The source imager of claim 45, wherein the plurality of source space projections are produced by the multi-dimensional reference structure without scanning of the multi-dimensional reference structure.

50. The source imager of claim 45, wherein the multi-dimensional reference structure comprises a three-dimensional reference structure.

51. A tomographic apparatus, comprising:
a source;
a sensor;
a multi-dimensional reference structure between the source and the sensor for producing modulated radiation from source radiation, wherein the modulated radiation is received by the sensor and comprises a plurality of source space projections, the multi-dimensional reference structure comprises a longitudinal dimension and a transverse dimension, the multi-dimensional reference structure comprises at least two obscuring structures or apertures distributed in a longitudinal direction in a non-linear manner, and the multi-dimensional reference structure modulates the source radiation along the longitudinal direction; and
an analyzer coupled to the sensor for analyzing the modulated radiation.

52. The apparatus of claim 51, wherein the plurality of source space projections are produced by the multi-dimensional reference structure in a single time step.

53. The apparatus of claim 51, wherein the plurality of source space projections are produced by the multi-dimensional reference structure without scanning of the multi-dimensional reference structure.

54. The apparatus of claim 51, wherein the multi-dimensional reference structure comprises a three-dimensional reference structure.

55. A method of enhancing a sensor, comprising:
altering radiation received by the sensor by inserting a multi-dimensional reference structure into a path of the radiation, wherein the altered radiation comprises a plurality of source space projections, the multi-dimensional reference structure comprises a longitudinal dimension and a transverse dimension, the multi-dimensional reference structure comprises at least two obscuring structures or apertures distributed in a longitudinal direction in a non-linear manner, and the multi-dimensional reference structure modulates the source radiation along the longitudinal direction; and
analyzing the sensor's response to the altered radiation.

56. The method of claim 55, wherein the plurality of source space projections are produced by the multi-dimensional reference structure in a single time step.

57. The method of claim 55, wherein the plurality of source space projections are produced by the multi-dimensional reference structure without scanning of the multi-dimensional reference structure.

58. The method of claim 55, wherein the multi-dimensional reference structure comprises a three-dimensional reference structure.

59. A sensor system, comprising:
a multi-dimensional reference structure configured to receive unconditioned data radiated from a source and to produce conditioned data comprising a plurality of source space projections, multi-dimensional reference structure comprises a longitudinal dimension and a transverse dimension, the multi-dimensional reference structure comprises at least two obscuring structures or apertures distributed in a longitudinal direction in a non-linear manner, and the multi-dimensional reference structure receives unconditioned data radiated from the source and produces the conditioned data along the longitudinal direction;
a sensor configured to receive the conditioned data; and
an analyzer configured to invert the conditioned data received by the sensor.

60. The sensor system of claim 59, wherein producing conditioned data comprises creating a linear transformation between the unconditioned data and the conditioned data with the multi-dimensional reference structure.

61. The sensor system of claim 60, wherein the reference structure is configured to create a well-conditioned linear transformation.

62. The sensor system of claim 59, wherein the unconditioned data comprises space-time coding.

63. The sensor system of claim 59, wherein the multi-dimensional reference structure comprises a non-monotonic multi-dimensional object.

64. The sensor system of claim 59, wherein the plurality of source space projections are produced by the multi-dimensional reference structure in a single time step.

65. The sensor system of claim 59, wherein the plurality of source space projections are produced by the multi-dimensional reference structure without scanning of the multi-dimensional reference structure.

66. The sensor system of claim 59, wherein the multi-dimensional reference structure comprises a three-dimensional reference structure.

67. A measurement system, comprising:
a source configured to produce source modulated radiation;
a multi-dimensional reference structure comprising a longitudinal dimension and a transverse dimension for receiving the source modulated radiation and producing reference modulated wave radiation comprising a plurality of source space projections, the multi-dimensional reference structure comprises at least two obscuring structures or apertures distributed in a longitudinal direction in a non-linear manner, and the multi-dimensional reference structure receives the source modulated radiation and produces the reference modulated wave radiation along the longitudinal direction; and
an analyzer in communication with the reference modulated radiation for analyzing the reference modulated radiation.

68. The system of claim 67, wherein the source modulated radiation is time modulated.

69. The system of claim 67, wherein the source modulated radiation is space modulated.

70. The system of claim 67, wherein the source modulated radiation is space-time modulated.

71. The system of claim 67, wherein the source modulated radiation comprises a controllably variable pattern.

72. The system of claim 67, wherein the source comprises a controllably variable filter.

73. The system of claim 72, wherein the controllably variable filter comprises an LCD (liquid crystal display).

74. The system of claim 67, wherein the plurality of source space projections are produced by the multi-dimensional reference structure in a single time step.

75. The system of claim 67, wherein the plurality of source space projections are produced by the multi-dimensional reference structure without scanning of the multi-dimensional reference structure.

76. The system of claim 67, wherein the multi-dimensional reference structure comprises a three-dimensional reference structure.

77. A method of resolving a source state, comprising:
modulating source radiation such that a plurality of source space projections are created in a parallel fashion using a multi-dimensional reference structure that comprises a longitudinal dimension and a transverse dimension, the multi-dimensional reference structure comprises at least two obscuring structures or apertures distributed in a longitudinal direction in a non-linear manner, and wherein the source radiation is modulated along the longitudinal direction; and
resolving the source state using the plurality of source space projections.

78. The method of claim 77, wherein resolving the source state comprises reconstructing a source distribution.

79. The method of claim 77, wherein resolving the source state comprises determining a spatial position of the source.

80. The method of claim 77, wherein the source radiation is also modulated along a transverse direction.

81. The method of claim 80, wherein the source radiation is modulated with a multi-dimensional reference structure.

82. The method of claim 80, wherein the source radiation is modulated with a volumetric reference structure.

83. The method of claim 77, wherein the source radiation comprises electromagnetic radiation.

84. The method of claim 70, wherein the source radiation comprises acoustic radiation.

85. The method of claim 77, wherein does source radiation comprises optical radiation.

* * * * *